(12) United States Patent  (10) Patent No.: US 7,808,505 B2
Deering et al.  (45) Date of Patent: *Oct. 5, 2010

(54) SCALABLE HIGH PERFORMANCE 3D GRAPHICS

(75) Inventors: Michael F. Deering, Los Altos, CA (US); Michael G. Lavelle, Saratoga, CA (US)

(73) Assignee: Michael Deering, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/127,737

(22) Filed: May 27, 2008

(65) Prior Publication Data

US 2008/0266300 A1 Oct. 30, 2008

Related U.S. Application Data

(63) Continuation of application No. 11/305,474, filed on Dec. 15, 2005, now Pat. No. 7,379,067, which is a continuation of application No. 10/394,418, filed on Mar. 21, 2003, now abandoned.

(60) Provisional application No. 60/367,064, filed on Mar. 22, 2002.

(51) Int. Cl.
*G06F 13/14* (2006.01)
*G06F 12/02* (2006.01)
*G06T 1/20* (2006.01)

(52) U.S. Cl. .................. 345/520; 345/544; 345/506

(58) Field of Classification Search ......... 345/501–506, 345/519, 520, 522, 530, 536, 541, 544, 545, 345/552, 581, 582; 709/251
See application file for complete search history.

(56) References Cited

U.S. PATENT DOCUMENTS

| | | | | |
|---|---|---|---|---|
| 5,241,625 A * | 8/1993 | Epard et al. ................. | 345/502 |
| 5,821,950 A * | 10/1998 | Rentschler et al. .......... | 345/505 |
| 5,911,056 A | 6/1999 | Faget et al. | |
| 5,977,997 A * | 11/1999 | Vainsencher ................ | 345/519 |
| 5,995,121 A * | 11/1999 | Alcorn et al. ............... | 345/520 |
| 6,509,902 B1 * | 1/2003 | Pfister et al. ................ | 345/582 |

(Continued)

FOREIGN PATENT DOCUMENTS

EP 0367183 5/1990

(Continued)

OTHER PUBLICATIONS

Supplemental European Search Report, EP 03726100.5, Oct. 21, 2008, 5 pages.

(Continued)

*Primary Examiner*—Joni Hsu
(74) *Attorney, Agent, or Firm*—Fenwick & West LLP

(57) ABSTRACT

A high-speed ring topology. In one embodiment, two base chip types are required: a "drawing" chip, LoopDraw, and an "interface" chip, LoopInterface. Each of these chips have a set of pins that supports an identical high speed point to point unidirectional input and output ring interconnect interface: the LoopLink. The LoopDraw chip uses additional pins to connect to several standard memories that form a high bandwidth local memory sub-system. The LoopInterface chip uses additional pins to support a high speed host computer host interface, at least one video output interface, and possibly also additional non-local interconnects to other LoopInterface chip(s).

31 Claims, 18 Drawing Sheets

Texture and Frame Buffer
Memory Allocation and Partitioning

U.S. PATENT DOCUMENTS 6,753,878 B1 * 6/2004 Heirich et al. ............... 345/629
6,801,202 B2 * 10/2004 Nelson et al. ................ 345/505
7,136,081 B2 * 11/2006 Gritz et al. .................. 345/619

FOREIGN PATENT DOCUMENTS

EP 0646875 4/1995
FR 2680026 2/1993

OTHER PUBLICATIONS

European Examination Report, EP 03726100.5, Feb. 5, 2009, 6 pages.

Burger, D., "Memory Systems," ACM Computing Surveys, ACM Mar. 1996, pp. 63-65, vol. 28, No. 1.

* cited by examiner

Basic Loop Architecture Interconnect

Texture and Frame Buffer
Memory Allocation and Partitioning

Longest and Shortest Path of Unicast GraphicsCommand Loop Packets from a LoopInterface Chip to Possible Destination LoopDraw chips Longest and Shortest Path of a DrawPixel Loop Packet from a LoopDraw Chip to Possible Destination LoopDraw Chips Path of VideoPixel Loop Packet from a LoopInterface Chip through all the LoopDraw Chips, and Back to the Original LoopInterface Chip All the Pixels in a Sixteen LoopDraw chip System Owned by LoopDraw chip #6 (of 0-15)

All Sixteen VideoPixel Loop Packets Whose 4x4 Convolution Windows Require include Processing of one Specific Pixel from LoopDraw chip #6

Six LoopDraw Chip Layout

Six LoopDraw Chip Printed Circuit Daughter Board Layout

16 LoopDraw, 2 LoopInterface Chip Printed Circuit Daughter Board on Edge Layout

16 LoopDraw, 2 LoopInterface Chip Printed Circuit Daughter Board on Edge 'V' Layout 16 LoopDraw, 2 LoopInterface Chip Printed Circuit Daughter Board Radial on Edge Layout Positions of Pads on Bottom Side of Chip Package for Flipped Back-to-back LoopLink Connections
FIG. 13(a)

Positions of Pads on Top Side of Chip Package for Flipped Back-to-back LoopLink Connections
FIG. 13(b)

Single Ring Schematic

Double Ring Schematic

Different Shortcut Connections, and Different Ways of Drawing the Same Connections.

1602
1604

Redrawing of Fig. 16: a Double Simple Ring

SCALABLE HIGH PERFORMANCE 3D GRAPHICS

RELATED APPLICATIONS

This application is a continuation of U.S. application Ser. No.: 11/305,474, filed Dec. 15, 2005 entitled "Scalable High Performance 3D Graphics," by Michael Deering et al., which is a continuation of U.S. application Ser. No. 10/394,418 filed Mar. 21, 2003 also entitled "Scalable High Performance 3D Graphics", by Michael Deering, et al. which application claims priority under 35 U.S.C. § 119(e) from U.S. Provisional Application Ser. No. 60/367,064, filed Mar. 22, 2002, which is herein incorporated by reference in its entirety.

BACKGROUND OF THE INVENTION

1. Field of the Invention

This invention relates to the field of computer graphics, specifically 3d graphics hardware accelerators.

2. Description of the Related Art

Most conventional general purpose computers have some form of hardware sub-system that can couple information stored or computed within the computer to some form of physical image display devices as interactive visual feedback to the human user(s). While decades ago these physical image display devices and the special electronics that coupled the computer to them were very primitive, e.g., blinking lights, "glass ttys", or oscilloscopes, over time the sophistication has grown to the point where the hardware sub-system, or graphics system dedicated to driving the physical image display devices are quite complex, specialized computational systems in their own right. Indeed, many of current "graphics chips" that are used to build conventional graphics systems contain more transistors than the powerful single chip CPUs in the general purpose computers themselves.

Specifically, a graphics system does more than connect a host computer to a physical image display device. It also offloads from the host computer more and more complex rendering operations, including both 2d rendering 3d rendering. A hardware accelerator dedicated to a specialized task will usually have a performance and/or price advantage over performing the same task entirely in software on a general purpose computer. This, of course, assumes that there is sufficient customer demand for frequently performing the specialized task, which is the case for 2d and 3d computer graphics in many market segments, including both industrial and consumer home entertainment.

While early graphics systems might only take on the simple job of drawing 2d lines or text, more advanced high performance graphics systems are responsible for taking high level representations of three dimensional objects from the host computer, and performing much of the job of approximately computing a simulation of how photons in the real world would illuminate the group of objects, and how images of these objects would be formed within the image plane of a physical camera, or the physical human eye. In other words, modern graphics systems are capable of performing 3d rendering. Thus, rather than the generic term "graphics systems" they will be referred to as "3d graphics hardware accelerators". A final synthetic "image plane" becomes the video output signal that is sent from the 3d graphics hardware accelerator to various physical image display devices for viewing by the human user(s). These physical image display devices include, but are not restricted to: direct view CRTs, direct view LCD panels, direct view plasma panels, direct view electroluminescent displays, LED based displays, CRT based projectors, LCD based projectors, LCOS based projectors, DMD based projectors, laser based projectors, as well as head mounted displays (HMDs).

The recent pace of development of more and more powerful 3d graphics hardware accelerators has spurred the need to continuously develop new architectural concepts to build 3d graphics hardware accelerators capable of generating much richer images of 3d objects than was possible with previous architectural concepts. The architectural concepts that were used to build the then highest performance 3d graphics hardware accelerators may no longer apply when new building blocks based on ever more powerful semiconductor chips are to be used even a few years later. At the same time, given the also increasing costs of developing individual chips, it is also desirable to find 3d graphics hardware accelerator architectures that are highly scalable, that is, architectures that allow a wide range of commercially viable products at many different price/performance points to be constructed from the same small set of chips.

Two features in particular that it are highly desirable to support in the next decades worth of high performance 3d graphics hardware accelerator products are fully programmable shading and high quality antialiasing. High quality antialiasing produces more realistic looking images by reducing or eliminating so-called "jaggies" produced by most current 3d graphics hardware accelerators. To achieve this high quality, the 3d graphics hardware accelerator must be able to support more complex frame buffers, in which a large number of samples must be kept for each pixel in an image that is being rendered. The architecture must also support powerful antialiasing filtering of these samples at some point before the video output signal is generated.

Most conventional 3d graphics hardware accelerators for real-time interaction either provide no support for keeping multiple samples per pixel, or support only very limited sample densities, e.g., 2 or 4, and occasionally 8. These systems also support only the most limited forms of antialiasing filtering of these samples during video output signal generation. For example, generally the antialiasing filter is limited to only a one pixel by one pixel box filter. For future systems, it is highly beneficial to support 16 samples per pixel, and 32, 48, or even 64 samples per pixel or more in advanced cases. These sample densities must be supported not only for low resolution video signal formats, e.g., NTSC, but also for high definition resolution formats, e.g., HDTV and 2 megapixel computer video signal formats. The desired signal processing is to support at least four pixel by four pixel cubic filter antialiasing filters with negative lobes, and larger area antialiasing filters, e.g., eight by eight pixels or more, in advanced cases.

Programmable shading is a technique used for decades by 3d software rendering systems, where a general purpose computer works for hours or days at a time to produce a single final rendered image. These are the systems that produce the most realistic 3d computer graphics images, and whose use is now essential in the creation of special effects of many movies. The idea is that while much of the so-called "graphics pipeline" has fixed functionality that cannot be modified, at certain "key" points in the pipeline there is the option for application specific graphics algorithms to be used. This supports more realism in the final rendered image. For example, for disaster training of police, firefighters, and paramedics, it can be very important to accurately model the effects of smoke and dust in reducing visibility for emergency workers during training scenarios. Programmable shaders have emerged as a good technique for customizing the visual output of 3d graphics hardware accelerators.

Conventional 3d graphics hardware accelerators for real-time interaction have only just started to provide very limited support for programmable shading. The most sophisticated 3d graphics hardware accelerator chip on the market today can only support eight instruction steps at the most important point in the graphics pipeline, the pixel shader, and do not allow any conditional instruction steps. This is nowhere near sufficient to give end-users the flexibility and quality they want. For future systems, it is highly desirable to be able to support much more general programmable shaders, e.g., on the order of hundreds to thousands of instructions steps, as well as conditional steps.

In conventional low-end 3d graphics hardware accelerators, e.g., those mostly aimed at the consumer home gaming market, issues of system architecture are simplified by confining most of the 3d graphics hardware accelerator to a single chip. Within a chip, issues of buses and bandwidth are less critical than they are between multiple chips, and the overall algorithms used are kept simple. As a result, it has been possible to construct reasonably powerful systems at consumer market prices, albeit limited to only the processing power of a single low cost chip.

In mid range and high end 3d graphics hardware accelerators, e.g., those aimed at the professional markets of automobile and aircraft design, medical visualizations, petrochemical visualization, general scientific visualization, flight simulation and training, digital content creation (animation and film editing), video broadcasting, etc., the customer requirements can only be met by building more complex 3d graphics hardware accelerators than will fit on a single chip, e.g., they have to use the computational power of large numbers of chips together in a system. Most all conventional systems for this market have required a large number of different custom chip types to be built, and generally use multiple different custom interconnects or buses to connect these chips together to build a functioning system. These multiple interconnects or busses are expensive to build, both in the cost of incremental pins on the chip's package, the cost of wires and connectors on the printed circuit boards, and in the cost of designing and testing several different custom crafted interconnect bus protocols. Under normal operating conditions, only a few of these interconnects or busses are operating at their peak rate; the other buses are under utilized. Thus, much of the full aggregate bandwidth of these interconnects or buses is rarely if ever used, and potentially represents wasted product engineering and/or product costs.

The current low end of the 3d graphics hardware accelerator market is very price driven, as most of the market is for home consumer 3d video game applications. These 3d graphics hardware accelerators are either sold as sub $500 PC ad-in cards, or as integral parts of sub $400 game consoles. To achieve the low parts costs implied by these prices points, most of the 3d graphics hardware accelerator architectures for these markets consist of a single graphics accelerator ASIC, to which is attached a small number of DRAM chips. Other chips, if present, are general purpose processors or audio acceleration chips, and do not directly interface to the DRAM chips containing the frame buffer and texture memory. The best case 3d rendering performance of these single graphics accelerator ASIC based systems is constrained as described before by the limits of how much bandwidth is available for 3d rendering given the limits of the number of pins that can be attached to ASICs in this price range, and the bandwidth of DRAM chips that use no more than this number of pins to attach to the ASIC. In these systems, the same attached DRAMs are used for fetching 2d textures, rendering pixels (or samples), and fetching pixels to generate the video output signal through separate analog and/or digital video output interface pins on the same graphics accelerator ASIC.

The current middle range of the 3d graphics accelerator market is still somewhat price sensitive, but is also more feature and performance sensitive. The prices for just the 3d graphics hardware accelerator add-in cards for professional PC's or workstations is in the $1800 to $6000 range. To achieve higher performance, the architecture of these 3d graphics hardware accelerators usually separates the set of DRAM chips used to store 2d and 3d textures from the set of DRAM chips that comprise the frame buffer proper. Because of the limits of how much bandwidth is available for graphics operations between the DRAMs used to store the 2d and 3d textures and a single 3d rendering ASIC, it is common in the mid range to duplicate the entire sub-system of the 3d rendering ASIC and the attached DRAMs. If this sub-system is duplicated n times, then n times more bandwidth to and from the textures is needed for rendering. Here, clearly, the trade off of higher cost was accepted in order to obtain higher performance. The bandwidth to and from the frame buffer itself also may need to be higher than that which is supportable by the pins attached to a single ASIC. Several techniques to distribute the frame buffer access across several ASIC have been developed, so that no one ASIC needs to support more than a fraction of the total bandwidth to and from the frame buffer. Varied and complex techniques have been developed to make such multiple ASIC and memory sub-system all work together to accelerate 3d rendering, and will not be covered in full detail here. The important point is that these architectures have all been driven by the need to distribute the bandwidth consumption of 3d rendering algorithms across multiple ASICs and DRAM local memory sub-systems. The resulting systems usually require several different expensive ASICs to be designed and fabricated. These systems also generally produce just one product configuration; typically it is not possible to take the same ASICs (with no changes) and build a more expensive but faster product, or a slower but less expensive product.

The current high end of the 3d graphics hardware accelerator market is much more performance and feature driven than price driven. The prices can range from $6000 (the top of the mid-range) to several hundred thousand dollars for the most powerful 3d graphics hardware accelerators. The architectures of the high end systems are related to those of the mid range systems. The same techniques of applying more ASICs and DRAMs in parallel are used, but in more extreme ways. Given the similarity, there is no need to explicitly describe existing high end systems in any more detail here.

While many measures of performance still need to improve in 3d graphics, the desired rendering frame rates are maxing out at 76 Hz, the desired resolution are maxing out at 1920× 1200, depth complexity is only slowly growing past 6, and sample densities will likely stop growing at 16. What this means is that pixel fill rate is only slowly growing past 1 billion pixels per second (with a sample fill rate at 16 billion samples per second). So a scalable graphics architecture can treat pixel fill rate as a constant, rather than something to be scaled.

Additionally, while frame buffer storage that can't be written into with a pixel fill rate of 6× the video output signal video format pixel rate and read out at the same 6× rate is still unusable as storage, it is not unusable for texture storage. Applications want all sorts of texture to be available for immediate use during rendering, but on any given frame only a small sub-set of the texture is actually accessed. So if a high end architecture can do what happened by coincidence in low end architectures, e.g., arrange to have both the texture storage and frame buffer storage in the same memory bank, DRAM could be efficiently used.

SUMMARY OF THE INVENTION

In one embodiment, what in prior art graphics systems have been two, three, or four or more different chip to chip dedicated data interconnects, can be folded into a single high speed ring topology. To achieve this folding, some of the graphics tasks have to be portioned in a slightly different, but fully functional, ways than they have in conventional systems.

In one embodiment, two base chip types are required: a "drawing" chip: LoopDraw, and an "interface" chip: LoopInterface. Each of these chips have a set of pins that supports an identical high speed point to point unidirectional input and output ring interconnect interface: the LoopLink. The LoopDraw chip uses additional pins to connect to several standard memories (e.g., DRAMs) that form a high bandwidth local memory sub-system. The LoopInterface chip uses additional pins to support a high speed host computer host interface, at least one video output interface, and possibly also additional non-local interconnects to other LoopInterface chip(s).

The storage for the frame buffer is distributed across the LoopDraw chips; the local memory sub-system attached to each LoopDraw chip has storage for all the samples within a particular two dimensional interleave of pixels. The storage of the texture maps is preferably replicated in the local memory sub-system of every LoopDraw chip.

In one embodiment, to form a functioning system, at least one LoopInterface chip, and at least four LoopDraw chips are connected together via their LoopLink interfaces to form a simple ring. Different type of Loop packets can flow over the LoopLinks from chip to chip around this ring, until a termination condition is met.

Graphics driver commands arrive from the host computer over the host interface on the LoopInterface chip, which will either consume the command itself, or will process and convert the command into Loop packet(s) to be sent down the ring. Some commands are sent to most of the LoopDraw chips along the ring. Other commands are sent to a specific subset of LoopDraw chips within the ring. One way in which this subset is chosen is via a load balancing mechanism implemented by the LoopInterface chip to smooth out the processing between the different LoopDraw chips.

When a Loop packet enters a LoopDraw chip, it decides if it is a destination of the Loop packet (there may be other destinations), and if the Loop packet transmission termination condition has been met. If the termination condition has not been met, the Loop packet will be forwarded out of this LoopDraw chip, otherwise it will not be forwarded. If a LoopDraw chip is a destination of the Loop packet, the LoopDraw chip applies the appropriate processing to the Loop packet data. This processing may result in pixels and other data that need to be sent to the (distributed) frame buffer. If so, for each pixel generated, the LoopDraw chip sends out a DrawPixel Loop packet along the ring. When a LoopDraw chip receives a DrawPixel Loop packet meant for it, it takes the pixel data in the DrawPixel Loop packet and checks to see which (if any) of the samples of the appropriate pixel in its local memory sub-system are also inside the boundaries of the geometric graphics primitive, updating the sample values by the semantics of the graphics pipeline. In different embodiments, these tests may include combinations of testing for inclusion within the boundaries of the geometric graphics primitive currently being rendered, tests of z values of samples already in the frame buffer against computed or passed z values for the samples within the pixel, testing of frame buffer stencil planes, test for different pixel blending modes, etc.

The feature of full screen antialiasing preferably is achieved by distributing the antialiasing filtering function out among the LoopDraw chips that contain the distributed frame buffer. To start the flow of video, a LoopInterface chip sends a blank VideoPixel Loop packet out into the ring of LoopDraw chips. Each LoopDraw chip in turns adds the antialiasing contribution of the samples it owns to a running sum within the VideoPixel Loop packet. When the VideoPixel Loop packet emerges out of the last LoopDraw chip, and then enters a LoopInterface chip, the running sum now contains the completed filtered pixel components, and after normalization and optional gamma correction, the stream of pixels emerges out of the LoopInterface chip's video output interface as a final rendered image in a video output signal in a video signal format for transmission and display on a physical image display device.

The new Loop topology has several other advantages. One is that high performance graphics systems can now be built from only two custom chip types. This minimizes the cost and risk of designing and fabricating custom chips. Another advantage is that the ring interconnect scales well. Commercially viable products at different price and performance points can be built from many different amounts and combinations of the same two base chip types.

The new architecture inherently provides high speed support of general programmable shaders, as well as very high quality antialiasing. The programmable shader and antialiasing power both scale with the number of LoopDraw chips in the system. Thus, graphics system configurations that use more LoopDraw chips obtain both more powerful programmable shading support and more antialiasing capability. These two computationally demanding tasks are fully efficiently distributed across large numbers of (identical) chips, literally allowing more than an order of magnitude more dedicated silicon support for these important functions than is possible in single chip graphics systems architectures built from the same chip technology generation.

The folding of the different memory requirements of graphics systems, frame buffer storage, texture memory storage, and display list storage into one distributed memory system makes efficient use of both the inherent bandwidth as well as storage capacity of inexpensive standard (e.g., commodity DRAM) memory chips. The high speed LoopLink interconnect means that not only (potentially replicated) local working copies of textures and display lists can be efficiently transmitted to and stored in these memories, but that next level of memory hierarchy non-replicated textures and display lists can take advantage of the distributed store, and still be readily available for fast efficient copying into replicated storage working memory when needed.

In one embodiment, the LoopDraw chip and the local DRAM attached to it can be built as a simple daughter card. A range of high performance graphics system products would then be easily constructed by populating one of several different simple mother boards with multiple instances of these identical daughter cards. This factorization of printed circuit boards reduces design costs, manufacturing costs, manufacturing test costs, as well as inventory and spares costs, and could also simplify system repairs and upgrades.

BRIEF DESCRIPTION OF THE DRAWINGS

FIG. 13(a) and FIG. 13(b) shows positions of pads on bottom and top sides respectively of chip package for flipped back-to-back LoopLink connections.

DETAILED DESCRIPTION OF SEVERAL EMBODIMENTS

A. General Discussion

General Purpose Computer

Figure 1:
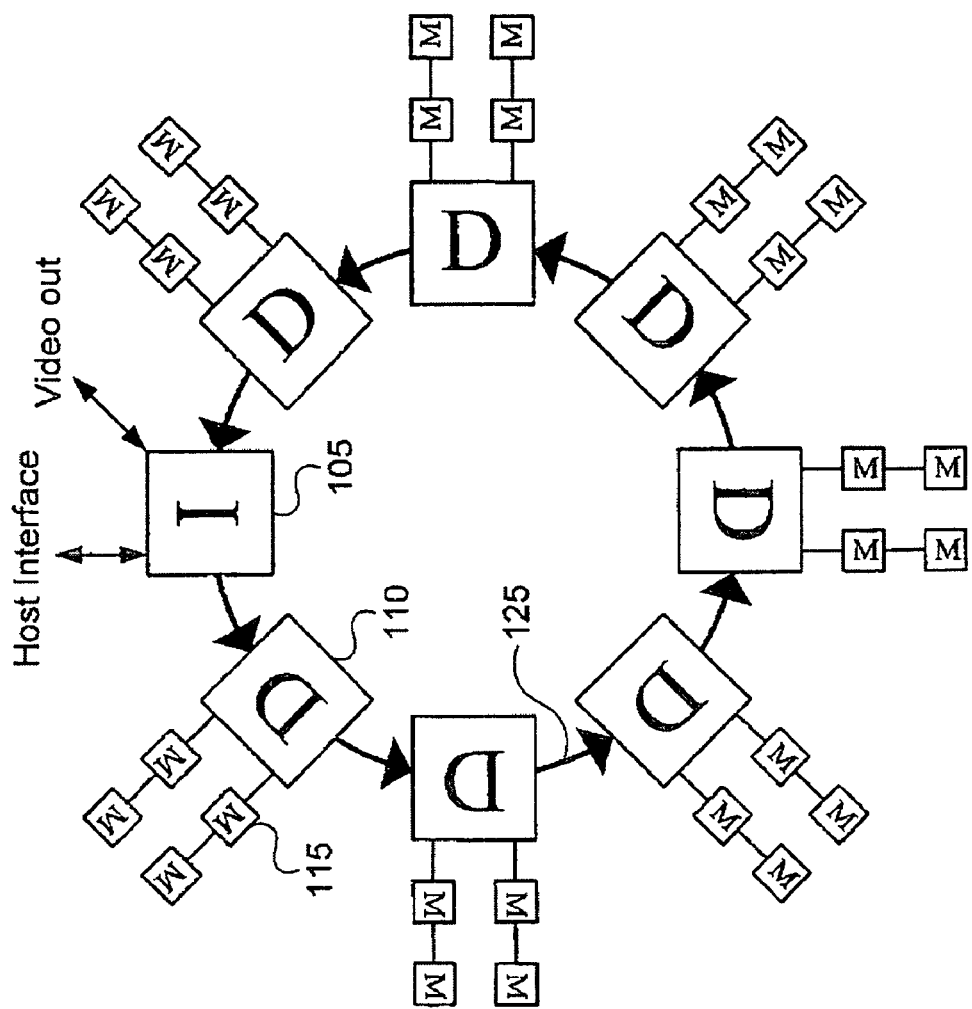
FIG. 1 shows an embodiment having a basic Loop architecture interconnect.

One embodiment of a general purpose computer is shown and discussed. A general purpose computer is a complete system that contains one or more general purpose processor elements, attached main memory, and one or more external I/O processors. These external I/O processors in turn are connected to one or more external I/O devices. A general purpose computer is capable of running a wide range of programs performing a wide range of functions. It has not been optimized to perform any narrow range of specific functionality to the detriment of the performance of other functions.

General Purpose Processor Element

The general purpose processor element is the computational heart of a general purpose computer. A general purpose processor element generally does not contain any external I/O devices or main memory, though it can contain large amounts of cache memory. A general purpose processor element, when part of a general purpose computer, is capable of executing a wide range of programs performing a wide range of functions. A general purpose processor element has not been optimized to perform any narrow range of specific functionality to the detriment of performance of large numbers of other functions. Another common term with a similar meaning for the purposes of this invention is central processor unit, or CPU.

The ever continuing march of technology constantly changes how we must interpret terms. Many years ago, it was impossible to fit an entire general purpose processor element on a single chip. Later, it was only impossible to fit a high performance general purpose processor element on a single chip. Now even that restriction no longer applies. Now it is possible to fit more than one general purpose processor element on a single chip. Soon technology will make it possible for one single general purpose processor element to run multiple "threads" at the same time, and thus appear to be multiple general purpose processor elements. Further refinement of the details of these concepts will not be necessary for the purposes of describing this invention.

Main Memory

The term main memory refers to the general memory store on a general purpose computer.

Cache Memory

The term cache memory refers to the a special high speed memory store within a general purpose computer, usually, but not always each general purpose processor element, or small sub-group of general purpose processor elements will have their own cache memory.

External I/O Processor

One example of an external I/O processor is a hardware sub-system designed to communicate with an external I/O device. Thus, the external I/O processor acts as the interface between the rest of the general purpose computer and the external I/O device. In the simplest case, the external I/O processor may do little more than pass on data without any modifications to and/or from the rest of the general purpose computer and the external I/O device. In more complex cases, the external I/O processor is a special purpose hardware accelerator, capable of performing complex computations on data as it passes to and/or from the rest of the general purpose computer and the external I/O device. In the literature, an external I/O processor is sometimes also referred to as external I/O controllers or external I/O device controllers. Because nowadays most all of these devices contain powerful computational systems in their own right, the more descriptive term external I/O processor will be used to refer to these devices in the description of this invention.

Examples of external I/O processors include devices that can convert interactions with the rest of the general purpose computer system to properly formatted communications on any of a number of standard and custom computer interfaces. These interfaces include, but are not limited to, SCSI, ultra SCSI, ATA, ATA 2, IDE, RS232, RS422, 10 BaseT ethernet, 100 BaseT ethernet, 1000 BaseT ethernet, USB, USB2, bluetooth, Firewire, Fiberchannel, Infiband, analog and digital audio formats, analog video signal video signal formats, and digital video signal video signal formats.

This invention in particular relates to external I/O processors that are special purpose hardware accelerators that use analog and digital video signal format to connect to external I/O devices of the physical image display device class.

External I/O Device

Many different classes of embodiments of external I/O devices exist that can be connected into a general purpose computer via an external I/O processor.

One class of external I/O devices are storage devices. Devices in this class include, but are not limited to, hard disk drives, floppy disk drives, cdroms drives, cdram drives, dvdrom drives, dvdram drives, removable tape storage, and removable disk drive storage.

Another class of external I/O devices are networks and network devices. Devices in this class include, but are not limited to, network routers, network bridges, network firewalls, as well as the networks themselves.

Another class of external I/O devices are human interface devices. Devices in this class include, but are not limited to, lights, switches, keyboards, mice, tablets, joysticks, light pens, button boxes, slider boxes, cameras, microphones, telephones, PDAs, video conference devices, teleconference devices, motion tracking devices including gloves and bodysuits, audio equipment and speakers, physical image display devices, tactical and haptic (force feedback) output devices, motion platforms, and olfactory output devices.

Another class of external I/O devices are hardcopy display devices. Devices in this class include, but are not limited to, laser printers, inkjet printers, thermal transfer printers, impact printers, film printers, label makers, numerical machine tools, and sterolithography output devices.

Host Computer

An example of a host computer is discussed. From the point of view of the external I/O processor, the rest of the general purpose computer that the external I/O processor is a part of is called a host computer. The general purpose computer may have any number of other external I/O processors attached to it, and they in turn are attached to any number of external I/O devices One embodiment of a host computer that relates to this invention would include external I/O processors to connect to the external I/O devices of a keyboard and a mouse, application software, and a graphics hardware accelerator attached to a cathode ray tube (CRT), which is an instance of the class of physical image display devices which is a sub-class of the class of external I/O devices.

The application software would execute on the general purpose processor elements within the host computer, optionally take in input from a human user via the keyboard and/or mouse devices, and then cause the graphics hardware accelerator to compute a final rendered image and then send the image on as a video output signal to the CRT for display.

Host Interface

An Infiband interface is one example of a host interface.

When an external I/O processor of any kind is attached to a host computer, the term host interface is used to refer to the formal and/or physical interface between the host computer and the hardware accelerator. Quite commonly this interface has been an internal computer bus of some kind, so the host interface is sometimes referred to as a host bus. However, as higher and higher speed electrical and/or optical interfaces are needed to couple different computational sub-systems together, the host interface is less and less likely to be a bus with a large number of wires shared by different computational sub-systems plugged into the same host computer. It is more likely to be a point-to-point interface will little sharing of signals.

In the context of talking about a 3d graphics hardware accelerator, the term host interface implicitly refers to the particular host interface that connects the 3d graphics hardware accelerator to the host computer.

Application Software

People, companies, and organizations generally purchase general purpose computers to do useful work. This work is done in part by specific computer programs that have been purchased or written for this task. The term application software refers to such programs.

In the context of 3d graphics hardware accelerator, the application software communicates with the 3d graphics hardware accelerator through graphics APIs (Application Programmer Interfaces).

Message

A message is an object that is sent from one entity, the source or sender, to one or more potential destination or receiver entities. The message itself usually has some contents, the information that the source is sending to the destinations. Different embodiments of messages may explicitly separate out routing or destination information (also called the header) from the rest of the contents of the message (also called the payload). Indeed, in some embodiments the "type" of the message itself is separated out as yet another separated piece of information. Different system in computer science have defined separated pieces of message system in many different ways. The goal of this definition is to describe the more abstract higher level semantics shared by most message systems. When message systems are needed to be used to describe various embodiments of this invention, specific detailed instances of message systems will be defined first.

Unicast and Multicast

Consider an electronic system made up of multiple different sub-systems. Assume that a system of communications has been built into the electronic system such that at least some individual sub-system can send out messages from that sub-system over communication system that will get delivered to more than one other sub-system. Consider a message is sent from a sub-system. If the destination of the message is exactly one other sub-system, the message is referred to as a unicast message. If the destination more than one of the other sub-systems, the message is referred to as a multicast message. To be a multicast message, the message does not have to be sent to all the other sub-system, just potentially more than one other sub-system. Indeed if the system by which potential destinations doesn't allow the sender sub-system to know for sure which or how many sub-systems will actually be targeted by the multicast message, it is may be the case than only one or even none of the other sub-systems actually ends up being the destination of the multicast message, and it is still the case that the message would be considered a multicast message.

U

There exists a standardized rack mount systems used commercially by many telecommunication, computer, video, scientific and other products. There exists a standardized "rack", a set of spaced bolt holes on vertical rails approximately 19 inches apart. The holes on the rack rails are spaced so that products of a standardized width but a variable height can be bolted into any such rack leaving no vertical gaps. This is done by "quantizing" the variable equipment heights into integral number of a base unit. The base unit is one and three quarters of an inch height, this unit is called a U. Thus, one may specify the height of a particular piece of equipment in units of U. e.g., a 1 U piece of equipment, a 2 U piece of equipment, etc. The depth of rack mountable equipment is not fixed to any number, but there are a range of depths that most equipment fits under, generally less than 16 inches or 18 inches. There is no universal standard for where on the six sides of a rack mountable pieces of equipment air for cooling should come on or heated air leave. But within a particular market or industry segment there may some standardizations may exist. Similarly, while many markets assume that most cabling, including power cabling, comes in the back and/or up from the floor, this is not universally true. Because air conditioned protected power backed-up machine room space can be very expensive per square foot, some markets can be very insistent that their "informal" standards are followed to the letter.

Blade

The term Blade within the context of computer equipment has come to mean a small rack mountable device (e.g., no more than a small number of U in height) that from a physical volume point of view packs a considerable amount of power into the small box. Also, rather than being very complex devices, each separate box should be relatively simple; complex systems should be achievable by placing a large number of Blades into one or more standard racks.

Current examples of Blades in the computer space are one, two, or four or more PC compatible CPUs in a single motherboard with memory, possible a small number of low profile disk drives, one or more standard network connections, and perhaps a limited number of PCI slots, all within rack mountable chassis as short as only 2 U in height. Multiple such units are commonly racked mounted together to form web servers and other computational sub-systems which need large numbers of CPUs that don't need connectivity better than is achievable using standard network connections.

Graphics Slab

The term GraphicsSlab is meant to describe a new class of 3d graphics hardware accelerator products that are enabled by this invention. GraphicsSlab are meant to be short height (likely somewhere in the range of 2 to 4 U) separate boxes that can connect to host computers via industry standard interfaces such as Infiband, and send out high quality final rendered images over long line digital video signal channels via a cross bar switcher to individual offices, conference rooms, labs, and theaters within a medium to large size organization within a single physical building or multi-building campus.

Computer Graphics Terms

Because this invention relates to the field of computer graphics, specifically 3d graphics hardware accelerators, several technical terms from these fields should be discussed generally.

2d Computer Graphics and 3d Computer Graphics

Computer graphics is a well known term describing a sub-discipline of computer science generally focused on the direct and indirect use of electronics and computers in the generation of visual results of computations. Because of its well-known nature, a precise definition will not be given here. What does require some definition is the differentiated use of the three terms computer graphics, 2d computer graphics, and 3d computer graphics. In the description of this invention, the term 2d computer graphics will be used to refer to the sub-discipline focused on 2d effects: fonts, typesetting, photo editing, paint systems, 2d (or "cell") animation, etc. While term 3d computer graphics could be used to refer just to the sub-discipline focused on 3d effects: 3d rendering, lighting, 3d modeling, 3d animation, etc., in the context of hardware support, the term 3d computer graphics usually refers to the ability to support 3d techniques in addition to 2d techniques. Because the topic of this document involves hardware support for graphics, including both 2d and 3d techniques, in this document the term 3d computer graphics will be used to refer to graphics computations of all types, including both 2d and 3d techniques. In general, in this document, this convention that 3d refers to 3d and 2d techniques will be followed, except where explicitly stated otherwise. When no dimensionally is included as a prefix to a term, in this document the convention is that term will refer to both 3d and 2d meanings of the term, except where explicitly stated otherwise, or in cases where from context the term was left deliberately ambiguous, so that it could be referring to either/or the 3d and the 2d meanings of the term (e.g., "what forms of computer graphics might this technique support?"). Explicitly, usage of the term computer graphics follows these conventions. To refer to the subdiscipline of computer graphics that only involves 3d techniques, the term 3d graphics, defined next, explicitly limits its scope to only the 3d portion of the computer graphics field. Note that although some terms include the sequence of words "3d graphics"—these terms do not automatically inherent the exemption from included 2d techniques; the definition of each term must explicitly include an opt-out of the general rule.

A similar question of scope will come up in the definition of rendering, both 2d and 3d. This issue is not only the inclusiveness of 2d by 3d, but also that the hardware is commonly referred to as "rendering hardware", but the scope of which computer graphics techniques are supported is not just rendering techniques of any dimension; so-called "rendering hardware" may also include support of non-rendering computer graphics. Again, explicit definitions will remove this potential ambiguity.

3d Graphics 3d graphics is a sub-discipline of computer science focused on methods and techniques for using numerical computations to represent and simulate aspects of the physical world chiefly for the purposes of generating still and motion images of this simulated world. This covers a wider range of methods, from animation of living beings to better ways to construct synthetic mountains or real airplanes within a computer. For a given problem area usually a range of solutions are available, with higher quality solutions requiring a correspondingly larger amount of numerical computation.

The term 3d graphics as defined here usually excludes the techniques of 2d computer graphics. The combination of the techniques defined in 3d graphics and 2d computer graphics in this document is referred to as 3d computer graphics, or, in context, as simply computer graphics. (Note that the term "2d graphics" is not defined in this document.)

2d Rendering and 3d Rendering

In this document, the term 2d rendering will refer to techniques from computer graphics for drawing operations in the plane—line drawing, polygon fill algorithms, fonting (raster ops, one to n-bit expansion, outline font instantiation and rasterization, packed and raster representation of fonts and symbols, etc.), 2d paint systems, simulate the effects of layers of ink or paint on canvas, imaging techniques, etc.

The term 3d rendering will refer to all the techniques of 2d rendering, plus explicit 3d techniques. These explicitly 3d techniques are chiefly concerned with simulations to various degrees of approximations of how photons in the real world interact with surfaces and interiors of physical objects as part of the process that produces images in cameras and the human eye. In most cases, explicitly 3d rendering in the context of a simulated world involves taking in representations of the objects in the simulated world, including a simulated camera, and generating a rendered image (nearly always represented as an array of pixels) that is an approximation of what the simulated camera would "see" in that simulated world.

In this document, all three tenses of the word "render": render, rendering, and rendered, when they appear without a dimensional prefix, are defined to have the same meaning as the term 3d rendering, except where explicitly stated otherwise, or in cases where from context the term was left deliberately ambiguous, so that it could be referring to either/or the 3d and the 2d meanings of the term (e.g., "what forms of rendering might this technique support?").

Because the results of the process of rendering is nearly always an image, the default noun to the verb "rendering" is "image". The word "rendering" is a present tense verb, e.g., "The computer is rendering the image". The word "render" is a future or infinite tense verb, e.g., "The computer will render the image", or "How will the committee decide which image to render?". The word "rendered" is a past tense verb, e.g., "The computer has rendered the image."

Note—The word "rendering" when used as part of a larger term, may have additional term specific meaning. An important example in this document, is that when terms involving hardware that support rendering algorithms are defined, the hardware by explicit mention will support others algorithms from computer graphics besides rendering, even though the word "rendering" may be part of the term describing the hardware.

Rendered Image and Final Rendered Image

Usually, the primary results of performing rendering is an image, which is referred to as the rendered image. A complex rendering can produce intermediate rendered images, for example to performing rendering that includes reflection mapping, before the final image is rendered, a separate rendering is performed to produce a rendered image that will become the reflection map used in the next stage of rendering. Many other similar examples exist, including shadow mapping. To distinguish these different threads of meaning, the term rendered image will be used to refer to the image results of any rendering, specifically including intermediate rendered images. The term final rendered image will be used for the final image meant for human (or as in some cases, machine) consumption. Specifically, a rendered image that is converted into a video output signal and sent over a video output interface to a physical image display device in most all cases will be considered a final rendered image.

Rendering Process, Render Process, Graphics Render Process, and 3d Graphics Render Process Because rendering is a type of computational process, we can refer to the computational process of rendering as the rendering process, or the render process, when the other form of the verb is needed. (This is shorter than always saying "the computational process of rendering".)

In this document, the terms rendering process, render process, graphics render process, and 3d graphics render process, the rendering being referred to includes both 2d and 3d techniques unless explicitly stated otherwise. While purely 2d techniques do exist, no terms are defined here to explicitly refer to them. The terms with the prefix words "graphics" or "3d graphics" are used only to reemphasize that the render process being referred to also includes 3d techniques.

Render Process

The term "render process" does not make any assumptions as to whether the render process is performed by software rendering or by hardware rendering (defined below). The term also can be used to talk about the render process in the abstract where the software/hardware distinction is not needed. At other times whether it is hardware rendering or software rendering that is being referred to will be clear from context, and neither the term hardware or software needs to be added. As this document is primarily concerned with hardware rendering, if the term hardware is omitted, the render process being discussed could be either abstract or hardware. When the particular meaning may not be clear from context, the more explicit terms abstract render process, software render process, or hardware render process will be used. The terms 3d graphics abstract render process, 3d graphics software render process, and 3d graphics hardware render process are defined to have to the same meaning as the terms without the 3d prefix; they are used only to reemphasize that the particular form of render process being referred to also includes 3d techniques.

Rendering System

The concept of rendering in computer graphics is an abstract concept. To actually perform rendering and produce images, a graphics rendering system is needed. A physical component is needed, so a graphics software rendering system technically is a hardware/software system, consisting of the hardware: a general purpose computer, and the software, a software renderer, a program that can perform the rendering process when run on a general purpose computer. A graphics hardware rendering system is a system comprised of a host computer, its software, and a graphics hardware accelerator (a type of external I/O processor defined below). Sometimes in context, the term graphics hardware rendering system may be discussing only the special purpose graphics sub-system, e.g., the graphics hardware accelerator.

The usual dimensionality convention applies to these terms. As none of the terms include the prefix 2d, the systems referred to all include support of both 2d rendering and 3d rendering, unless explicitly stated otherwise. Specifically the term 3d software rendering system refers to systems that include both 2d rendering and 3d rendering.

Real-Time

In the context of presenting a sequence of images that give an illusion to the human eye of being continuous, sequential images in the sequence need to be presented at a time rate of on the order of 24 to 84 times a second. In this particular context, the term real-time means a process that can produce new image outputs at time rates compatible with this. In this document, the term real-time will always refer to this order of time rates, unless explicitly stated otherwise.

Software Rendering

Given the complexity of the real world, clearly rendering that produces high quality final rendered images is a very computationally demanding task. Rendering can be implemented as a purely software algorithm, e.g., a program that can run on one or more general purpose processor elements within a general purpose computer. This would be an instance of software rendering. Complex software renderings can literally take several days to produce a single final rendered image, e.g., well more than a million times slower than real-time. Less complex renderings can take only minutes or hours. In this document, the term software rendering will always refer to this definition. Sometimes the term batch rendering is used to refer to rendering that cannot occur fast enough to be considered anywhere near real-time.

Hardware Rendering

For many applications (both industrial and consumer) that use 3d rendering, it is very important that final rendered images be produced at a real-time rate, or at least close to a real-time rate. Because of this commercial importance, it has been possible to justify building dedicated computational hardware, an external I/O processor, that is specialized for performing rendering computations faster than is possible with software rendering (assuming the same technology time-frames). When rendering is performed not by a program that can run on one or more general purpose processor elements within a general purpose computer, but performed by hardware specifically designed for rendering, this is called "hardware rendering".

Accelerator

In computer science, an accelerator, or a hardware accelerator, or a special purpose hardware accelerator, is a physical device that is a computational sub-system that is designed to perform a particular computational process faster than it can be performed by a program run on one or more general purpose processor elements within a general purpose computer. (This "faster than" assumes the same technology timeframes.) This physical device is usually attached to a general purpose computer, but an accelerator is not necessarily a external I/O processor, as there have been many purely computational accelerators whose output is just data sent directly back to the general purpose computer, with ever involving an external I/O device.

Given our definition of rendering, the preposition "hardware" may seem redundant, but historically the word "hardware" is often added to make it completely clear that a separate physical piece of hardware is being discussed. Also given our definition of rendering, the preposition "special purpose" may seem redundant, but historically the term "special purpose" is often added to make it completely clear that hardware designed to excel at a narrow, special range of tasks is being discussed.

Graphics Accelerator

The terms graphics accelerator and graphics hardware accelerator refer to hardware accelerators whose dedicated computational process are some algorithms from computer graphics. Most such devices described in this document will explicitly include both 3d and 2d rendering algorithms, but the terms as defined here do not have to do so, following the in wider use convention where these terms have been used to describe accelerators that are concerned with other subsets of graphics algorithms. Terms with more explicit specification of the computer graphics algorithms to be supported are defined next, and in this document will more typically be used to insure specificity.

3d Graphics Hardware Accelerator

In this document, the term 3d graphics hardware accelerator will refer to a graphics hardware accelerator that is also an external I/O processor, and has been designed to perform a number of algorithms from computer graphics, explicitly including, but not limited to, 3d rendering (which was explicitly defined to also include techniques of 2d rendering).

Generally it is expected that a 3d graphics hardware accelerator was designed to perform some subset of the 3d graphics render process faster than 3d graphics software render process would take if executed on the general purpose computer that the 3d graphics hardware accelerator is attached to. It is perfectible acceptable if other portions of the 3d graphics render process are executed at the same speed or slower than the 3d graphics software render process. Indeed it is common for 3d graphics hardware accelerators to not be able to perform at all some subsets of the 3d graphics render process, and instead the missing functionality will be executed purely in software by the host computer.

Because the term 3d graphics hardware accelerator is the only term for a graphics hardware accelerator that is also defined to be a external I/O processor, and also defined to perform the 3d graphics hardware render process, this specific (if slightly long) term will be used in most cases to describe the class of graphics products that this invention relates to.

Graphics System

Sometimes, when in context, for brevity, the term graphics system will be used to refer to the sub-system of a general purpose computer that is the graphics hardware accelerator. Explicitly contrary to the usual convention in this document, the dimensionality of support of the graphics system explicitly is not defined. It could include either or both 2d or 3d techniques, as well as support for non-rendering computer graphics algorithms. In some cases the context will specify the dimensionality.

Sometimes, when in context, for brevity, the term 3d graphics system is used to refer to the sub-system of a general purpose computer that is the 3d graphics hardware accelerator. In this case, the 3d graphics system is explicitly defined to be able to perform all the rendering and non-rendering computer graphics algorithms as defined by the term 3d graphics hardware accelerator.

API (Application Programmer Interface)

The term Application programmer Interface, or API, refers to a programming language or system interface between a computer program (the application software) and some underlying piece of software and potentially hardware functionality that the computer is making available to the application software in a standardized way.

Graphics API and Computer Graphics API

The terms graphics API, and computer graphics API, both refer to the same concept, an API to some form of graphics functionality. Herein, the lack of any dimensional prefix does not usually imply support of both 2d and 3d graphical techniques. In this document the terms graphics API, and computer graphics API are both abstract, the exact nature and dimensionality of support are defined only by specific instances of graphics API.

Note also that any particular 3d graphics hardware accelerator will generally support more than one different computer graphics API, e.g., the hardware 2d and 3d functionality may be exposed through different APIs; 3d graphics hardware accelerator and APIs do not exist in a one-to-one relationship.

Rendering API

The term computer graphics rendering API refers to an API to some form of graphics rendering system. In the literature, sometimes the term computer graphics hardware rendering API is used to refer to an API to some form of graphics hardware rendering system. Because most computer graphics rendering APIs have pure software implementations as well as ones that make use of graphics accelerators, this overly specific term will not be used in this document. It must also be remembered that even when a powerful graphics accelerator is used as part of the implementation of a computer graphics rendering API, the API always has at least some component that is implemented as software on the host computer, e.g., a computer graphics rendering API is always a pure software system or a mixed hardware and software system.

The term 2d computer graphics rendering API will refer to computer graphics APIs that support only 2d rendering techniques.

The term 3d computer graphics rendering API will refer to computer graphics APIs that support only 3d rendering techniques, where in this case, contrary to the usual convention of this document, only rendering techniques may be either purely 3d or include both 2d and 3d techniques. This definition is used because many commercial computer graphics rendering APIs are purely 3d in nature, while others are mixed 2d and 3d in nature. Note also that any particular 3d graphics hardware accelerator will generally support more than one different computer graphics rendering API, e.g., the hardware 2d and 3d functionality may be exposed through different APIs.

Specific instances of 2d computer graphics rendering APIs include PostScript, Java 2d, HTML, and SVG.

Specific instances of 3d computer graphics rendering APIs include OpenGL, Microsoft's Direct3d, Java 3d, QuickDraw3d, RenderMan, and mental ray.

Rendering State

Rendering is usually a state-full process. This means that when application software uses a computer graphics rendering API to specify rendering to (eventually) happen, the computer graphics rendering API usually has explicit state information that define the context under which the next computer graphics rendering API call will be interpreted. This state context information is referred to as rendering state.

Examples of possible rendering state include the current drawing color, the current transformation matrices, the enablement of z-buffering, the currently defined light sources, the antialiasing filter for the current frame, etc.

Display List

Many graphics APIs support the concept of a display list. A display list is a way to refer to a previously recorded collection of formal API calls with bound parameters to the graphics API. In most cases, the API calls made during the recording of the collections are restricted to a specified sub-set of the API calls supported the graphics API. In many cases, the sub-set is restricted to only geometry specification and rendering state API calls.

After a display list has been created (by calls to the graphics API), at a later point in time an API call may be made that references that previously created display list, to invoke that display list. The semantics of that invocation are varied, but frequently the semantics are linear, e.g., the effect of invoking a display list is identical to in the place of the invocation having instead re-made all the API calls that were used to define the display list. Other more complex display list semantics do exist, specifically ones in which the display list contains conditional execution paths (e.g., branching), as well as display list semantics in which not all of the formal parameters of the API calls are bound at the point of creation, instead some of the parameters become formal parameters of the invocation of the display list itself.

An important property of display lists relevant to this document is that once created, most display lists are opaque, e.g., their contents cannot be directly examined or modified by the application software that created the display list. This means that once created, the display list can be sent once from the host computer over the host interface to the graphics accelerator, where it can be cached in some local memory on the graphics accelerator itself Then in the future whenever the application software invokes the same display list the contents of the display list are locally available for efficient access.

Graphics Driver

It is the job of the software half of a mixed software and hardware implementation of a computer graphics rendering API to break up the procedure calls, rendering state, defaults, values and data structures passed into the API from the application software into a form that the graphics hardware accelerator can process to help perform the rendering. The host computer software that sits between the rest of the software and the hardware is commonly called a driver. When the hardware in question is a graphics hardware accelerator, the driver is referred to as a graphics driver, or a graphics hardware driver.

Texture Map

In this document the term texture map refers to 2d arrays of pixel values that form an image, where these images are to be used during the rendering process. The term 2d texture is defined to means the same as texture map.

Voxel Map

In this document the term voxel map refers to 3d arrays of voxel values that form a solid image, where these solid images are to be used during the rendering process. The term 3d texture is defined to means the same as voxel map.

Texture

In this document, the term texture refers to either a texture map or a voxel map. The dimensionality may be clear from context, or may be at an abstract level where the dimensionality is irrelevant, or really may mean to refer to both dimensionalities.

Texture Element

Texel

The term texture element and the term texel refer to the individual pixels of a texture map or voxels of a voxel map. These terms are used to avoid any ambiguity that might arise if the term "pixel" was used to refer to both more traditional pixels located elsewhere in the graphics system as well as the specialized pixels in a texture.

Texture Store

Texture Memory

The terms texture store and texture memory refer to where within the actual memory sub-systems of a given design are the texture maps actually stored. E.g., "the texture store merged with the frame buffer memory", or "the texture store resides in a special memory sub-system built just for it".

Environment Map

An environment map is a texture map or set of texture map images of the background (usually at a far distance) surrounding a particular computer simulated world. In many cases, the environment map is images of clouds in the sky, and mountains at a far distance. In the literature, the terms environment map and reflection map do not have standardized meanings, and can sometimes mean the same thing. In this document, the term environment map will be used exclusively to describe images of distant backgrounds. In many cases, an environment map does not have to be re-rendered every render frame.

Reflection Map

A reflection map is a texture map or set of texture map images of the of a particular computer simulated world surrounding a specific set of objects, or a single object, or even a particular piece of a particular object. Reflection maps are used to simulate that property that high shinny or partially shinny objects have in the real-world—they "reflect" (perhaps dimly) the world surrounding them.

In the literature, the terms environment map and reflection map do not have standardized meanings, and can sometimes mean the same thing. In this document, the term reflection map will be used exclusively to describe images that contain the complete background as far as a point on a particular object is concerned—both the near background and the far background. In the vast majority of cases, an environment map does have to be re-rendered every render frame. (Imagine two chrome dinosaurs walking through a desert.)

Shadow Map

A shadow map is the z pixel component of a rendered image where the eyepoint is located at the center of a virtual light source that is to cast shadows in the final rendered image.

Before rendering starts on the final rendered image, an intermediate rendering is performed for each light source that is desired to cast shadows in the final rendered image. For each such rendering, an image containing only the z pixel component of the resultant intermediate rendered images is stored as a texture map within the 3d graphics hardware accelerator. These texture maps are referred to as shadow maps.

Note that for accuracy, the single component value of a shadow map, the z value, must usually be represented with high numeric accuracy, e.g., more than 16 bits of integer, fixed point, block floating point, or floating point accuracy in some implementations.

In the vast majority of cases, a shadow map for a particular light source does have to be re-rendered every render frame, if there is any motion of any objects that cast shadows from that particular light source, or if the light source itself is in motion.

Pixel

The well understood term pixel refers to individual "picture elements" that make up computer representations of images. When discussing graphics hardware accelerators, it must be remembered that it is common for extra specialized data and control information to be stored in with and considered part of the pixels, e.g., a pixel can contain a lot more than just red green blue color components.

Pixel Interleave

Most high performance memory systems for pixels usually gain their performance by supporting access to more than one pixel at a time. This simultaneous access usually comes with some restrictions on which pixels can be accessed at the same time. For many embodiments, these restrictions have to do with how the memory system is interleaved (made in parallel), the technical details of the organization of the memory is called the interleave of the memory. When the memory consists of pixels, this is also called the pixel interleave. A simple example might be a memory that has broken up the frame buffer into 16 parallel pixel memories, arranged in a 4 by 4 pixel interleave. This means that every fourth pixel in x on every fourth line of pixels in y are stored in a particular sub-memory, and only one pixel at a time can be accessed from this memory.

Subpixel.

The term "subpixel" qualifies the following noun as being an accurate specifier of locations or areas to more than integer pixel of measure. "subpixel" is not a noun, e.g., you can't compute a value for "sub-pixel", only for a "subpixel area". The common uses of subpixel for locations and areas are: "subpixel accurate position".

Another occasional use of subpixel is the meaning of less than a single pixel, e.g.: "the triangle has subpixel area" means that the triangles has an area of less than one pixel. A "subpixel triangle" means that the triangle is less than a pixel across in rectilinear measure, e.g., the bounding box of the triangle is less than a pixel both in width and height. Note that if the triangle in question may still straddle more than one pixel.

Pixel Depth.

The number of bits used to represent a single pixel is not standardized. When discussing graphics hardware accelerators, because of architecture specific extra specialized data and control information is stored in with and considered part of the pixel, the number of bits needed to represent a single pixel is not always apparent. It also is quite common for the representation (and thus number of bits) of a pixel to be different at different internal and external stages of the rendering process. And of course, many graphics hardware accelerators have the ability to dynamically support a range of different pixel formats and thus total size in number of bits. The term pixel depth is used to refer to the total size in bits (or occasionally in other well specified units of information) of a pixel, usually, but not always, in the context of discussing the size of the representation used to store pixels in frame buffers and texture buffers. Because pixels used in 3d graphics often contain a z "depth" component (or inverse "depth" component), it is important to understand that "z depth" is a different concept than pixel depth. The former refers to either the depth component of a pixel, or the value of the depth component of a pixel, the later refers to the total size in information units of all of the components of a pixel.

Pixel Format

The term pixel format refers to a specific structured representation of a pixel. Such structures are usually defined in terms of multiple pixel components, each of which may be specified by some number of bits, or by its own sub-structure. Some pixel formats are abstract, they may specify that the pixels "contain red, green, and blue components", without specifying any further details as to the bit-size or other sub-structure detail of the components.

Pixel Component

The term pixel component refers to a specific data component that makes up part of the internal structure of a pixel as defined by a specific pixel format.

Different 3d graphics hardware accelerators may choose to support different pixel components than other do. In nearly all cases nowadays, pixels would at least have the usual three valued color components, e.g., red, green, and blue numeric value. How many bits of storage these values would need each, or even the numerical format of the values may differ between different systems.

Beside the usual red, green, and blue pixel component values, it is also common to find a so-called "alpha" component value stored as part of each pixel. This alpha value can be used for a number of different well known rendering techniques.

And for 3d graphics hardware accelerators that support z-buffer based rendering algorithms, a very important pixel component is the z value (or any of a number of other distance based values).

Other common pixel components include stencil planes, as defined by the OpenGL™ specification. Yet other pixel components might be fast clear planes, overlay planes, cursor planes, window ID planes, and other similar components that have appeared in frame buffers for many years now.

One issue that has not been touched on yet relates to how double buffering is to be implemented. Do all pixels have both front and back buffers? Do then some pixel components, like z, only exist in the front buffer? Can individual windows switch buffers without affecting other window on the screen at the same time? Is there some ability to configure the 3d graphics hardware accelerator for different numbers of components to be included in each pixel, as well as configure which components are single vs. double buffered? Is their any support for triple or higher buffering? What about stereo video signal format, specifically field sequential stereo video signal formats: how is the frame buffer set up to support stereo if it does? In stereo, are some pixel components now quadruple buffered, or is another technique used? All these frame buffer architecture, pixel component architecture trade-offs are familiar to one skilled in the art, and the application of these requirements to the new Loop architecture should be understandable to one skilled in the art based on the description here.

Pixel Data

Sometimes the entire collection of all of a pixel's pixel components need to be referenced. While in context, the term pixel can carry this meaning, sometimes the term pixel data is used to be completely clear what is being described.

Voxel

While not as widely known as the term pixel, the term voxel refers to the 3d extension of a pixel—a "volume element". Voxels are the collection of components attributed to a small region of space (generally uniformly packed 3d cells). Just as 2d images are commonly represented digitally by 2d arrays of pixels, 3d "images" are commonly represented by 3d arrays of voxels. Analogously, a "voxel map" is a three dimensional array of voxels.

While four and higher dimensional representations are sometimes used in computer processing, the use is not common enough for any standardized terminology to be in use, e.g., few people use terms like "hyper-voxel" at present.

Voxel Format

The term voxel format refers to a specific structured representation of a voxel. Such structures are usually defined in terms of multiple voxel components, each of which may be specified by some number of bits, or by its own sub-structure. Some voxel formats are abstract, they may specify that the voxels "contain red, green, and blue components", without specifying any further details as to the bit-size or other sub-structure detail of the components.

Voxel Component

The term voxel component refers to a specific data component that makes up part of the internal structure of a voxel as defined by a specific voxel format. Typical voxel components can be red, green, and blue values, or they could be an index into a pseudo color table, or they could be a more complex multi-dimensional value that requires the application of a custom shader to convert into a simple color.

Underlying Image

In traditional signal processing, many times quite a bit is known about the underlying highest quality signal that is being processed. Indeed, in some cases, many mathematically exact properties of the signal are known. When the operation being performed is re-sampling and low pass filtering of a signal at some frequency of representation channel for representation on a lower frequency channel, this information about the underlying signal can be used to simplify and bracket the processing.

Technically, antialiasing of rendered images is just such a job with a two dimensional signal—the image. The problem is, the equivalent of the underlying signal, the underlying image, is very expensive to compute. Technically, in the context of rendering, the underlying image, is the 2d image that is the limit of the image formed by the array of samples as the sample density goes to infinity. This is because the way that most rendering algorithms are set-up, they can only tell us what the value of the underlying image is at a specific infinitesimal point; they can't tell us for sure what an average of the underlying image might be over some small 2d area, or say anything else about what frequencies of image components might be lurking in the underlying image. This is why antialiasing (and full screen antialiasing) is such a hard problem in computer graphics. Still, to correctly describe how various antialiasing algorithms attempt to solve the problem, the concept of the underlying image is necessary to put the discussion on a firm signal processing foundation.

Sample

The term sample comes from information theory, and specifically was first used to describe the individual discreet measurements (either analog or digital) made of some form of signal. The signal need not be one dimensional like a radio wave, it can be two dimensional like the pattern of light on a image sensing device. The use of the term "sample" in 3d graphics usually refers to discrete digital values that represent a point sample of the underlying image that is being rendered. Samples are closely related to pixels, and many times have similar or identical component values. The mathematics of signal processing states that to more correctly construct a digital images (e.g., a 2d array of pixels) and to avoid interference patterns due to the presence in the underlying image of spatial frequencies above that of the pixel array to be generated, you must first "sample" (probe) the underlying image at many different points within a single pixel. This is what most high quality computer graphics antialiasing algorithms do. The samples still need additional signal processing before their data can be used to generate the final pixels that are the output of the rendering process. (Several of the terms below describe other parts of this signal processing.)

It is of some importance to note that in simple graphics rendering pipelines that are not antialiasing (e.g., the way most graphics hardware accelerators have been built until quite recently) what are called pixels are actually samples, sampled at a sample density of one per pixel. This is because mathematically, a pixel should be a representation of some special average of the underlying image value in the two dimensional neighborhood of that pixel; a sample is the specific value (not an average value) of the underlying image taken at a single point in 2d space. Thus, without antialiasing processing, technically to be consistent to the various terms definitions given here, older graphics hardware accelerators computed and stored into their frame buffers samples, not pixels. They became by default approximations of pixels when they are passed unmodified to the video output signal, which by definition is a stream of pixels.

The particular definition of sample just given here is the one always used within this document, except where explicitly noted otherwise.

Sample Location

In the context of the 2d image being rendered, all samples are mathematical points on that image. As points, samples have a 2d location on the image being rendered. This location is called the sample location. The locations usually have some explicit quantization, specified by the number of bits of sub-pixel accuracy specified for samples. The function that assigns these sample locations is another concept, usually referred to as the sample pattern.

Sample Address

In the context of the 3d graphics hardware accelerator's frame buffer (or sample buffer), all samples implicitly have a frame buffer address identifying where within the frame buffer their sample components are stored. This address is referred to as the sample address. This address may be assigned in a variety of different ways, but one common one is to base the sample address on the address of the pixel that the sample is located within, and then also include address information derived from the linear sequence number of the sample. This linear sequence number is a from a linear ordering of all the samples contained in that same pixel as the sample in question.

Sample Format

The term sample format refers to a specific structured representation of a sample. Such structures are usually defined in terms of multiple sample components, each of which may be specified by some number of bits, or by its own sub-structure. Some sample formats are abstract, they may specify that the samples "contain red, green, and blue components", without specifying any further details as to the bit-size or other sub-structure detail of the components.

Sample Component

The term sample component refers to a specific data component that makes up part of the internal structure of a sample as defined by a specific sample format.

In the high quality 3d graphics hardware accelerators being described here, samples effectively replaces pixels in the frame buffer. Thus, the components of a sample, the sample component, should be quite similar to the components of a pixel.

Different 3d graphics hardware accelerators may choose to support different sample components than other do. In nearly all cases nowadays, samples would at least have the usual three valued color components, e.g., red, green, and blue numeric value. How many bits of storage these values would need each, or even the numerical format of the values may differ between different systems.

Beside the usual red, green, and blue sample component values, it is also common to find a so-called "alpha" component value stored as part of each sample. This alpha value can be used for a number of different well known rendering techniques. For 3d graphics hardware accelerators that support z-buffer based rendering algorithms, a very important sample component is the z value (or any of a number of other distance based values).

Other common sample components include stencil planes, as defined by the OpenGL™ specification. Yet other sample components might be fast clear planes, overlay planes, cursor planes, window ID planes, and other similar components that have appeared in frame buffers for many years now.

One issue that has not been touched on yet relates to how double buffering is to be implemented. Do all samples have both front and back buffers? Do then some sample components, like z, only exist in the front buffer? Can individual windows switch buffers without affecting other window on the screen at the same time? Is there some ability to configure the 3d graphics hardware accelerator for different numbers of components to be included in each sample, as well as configure which components are single vs. double buffered? Is their any support for triple or higher buffering? What about stereo video signal format, specifically field sequential stereo video signal formats: how is the frame buffer set up to support stereo if it does? In stereo, are some sample components now quadruple buffered, or is another technique used? All these frame buffer architecture, pixel component and sample component architecture trade-offs are familiar to one skilled in the art, and the application of these requirements to the new Loop architecture should be understandable to one skilled in the art based on the description here.

RGB

The term RGB refers to the red, green, and blue sample components of a sample, or a pixel, depending on the context. This definition places no restrictions on the numeric representation of these sample components or pixel components. In different embodiments, they could be single bits, integers, fixed point numbers, block floating point numbers (in which the exponent is quantized coarser than a simple sequential integer range), floating point numbers, shared exponent floating point numbers (in which a single exponent value applies to all three components), or other more complex numeric representations.

The term RGB refers more generally to spectral component representations of color. In such embodiments, four, five, eight, twenty five, or even 128 separate spectral components might be employed to more accurately represent colors of light and its interaction with material objects in the physical world.

Sometimes, in context, the term RGB can be used to refer to the pixel format or the sample format of a pixel or a sample.

RGBA

As described in the definition of the terms pixel component and sample component, sometimes in addition to color components, pixels or samples can have alpha components, sometime referred to by the Greek letter a. The term RGBA refers to the rgb components of a pixel or a sample, as well as an alpha component.

While the tradition in hardware is to have a single alpha component even when three or more color components are present, the semantics is that the single alpha component is to be associated with and applied to all the color components. But in the field of software rendering, it is quite common when algorithms requiring alpha to be stored in to the frame buffer, for a separate alpha component to exist specifically bound to each color component. Specifically if the three color components red, green, and blue are being used, then three separate alpha components, alpha-red, alpha-green, and alpha-blue exist as well. In at least one embodiment of the present invention, the term RGBA will refer to this six alpha and color component structure. Sometimes, in context, the term RGBA can be used to refer to the pixel format or the sample format of a pixel or a sample.

Sometimes, the more general term RGBA will be used to describe pixel formats or sample formats in which at least one embodiment in addition to color components actually uses an alpha component as well, but other embodiments might not have an explicit alpha component.

Sometimes the presence of an alpha component is a place holder for any additional components beyond color components and z components, and thus some embodiments may include additional components for uses that go far beyond the traditional ones described for alpha components.

RGBZ

The term RGBZ refers to the rgb components of a pixel or a sample, as well as a z component. The concept of storing a z value with a pixel so as to perform z-buffered rendering is well known in computer graphics. But different embodiments may use different formulas for computing a z distance related value. Different embodiments may use different numeric representations to represent these z values, including, but not limited to, integer, fixed point, block floating point, and floating point.

Sometimes, in context, the term RGBZ can be used to refer to the pixel format or the sample format of a pixel or a sample.

RGBAZ

The term RGBAZ refers to the RGBA components of a pixel or a sample, as well as a z component, as described in the definition of the term RGBZ.

Sometimes, in context, the term RGBAZ can be used to refer to the pixel format or the sample format of a pixel or a sample.

Sometimes, the more general term RGBAZ will be used to describe pixel formats or sample formats in which at least one embodiment in addition to color and z components actually uses an alpha component as well, but other embodiments might not have an explicit alpha component.

Sometimes the presence of an alpha component is a place holder for any additional components beyond color components and z components, and thus some embodiments may include additional components for uses that go far beyond the traditional ones described for alpha components.

Sample Buffer

As defined elsewhere, a frame buffer is a digital memory store for an image comprised of pixels. However, we are now talking about hardware in which explicit pixels may not be actually stored, but will be created from a stream of samples coming out of a digital memory store for an image comprised of samples. Technically the memory store can still be called a frame buffer, as it holds information describing one or more frames of video output signals. But as the term frame buffer already has two different meanings in the context of computer graphics, e.g., the entire graphics hardware accelerator vs. just the memory store of pixels, in this document the term sample buffer will sometimes be used to describe memory stores of images represented as samples.

Sample Density

The term sample density is used to describe some of the relationship between pixels and samples within some context, e.g., when discussing a frame buffer or a sample buffer. Specifically the term sample density refers to the number of samples contained within one pixel. The number could be fractional if discussing the average number of samples in a pixel in the context of a large number of pixels. The sample density may not even be constant spatially. And finally, because the size of pixels as defined by the graphics rendering pipeline before the video output signal is generated are not necessarily the same in area as the pixels defined in the video output signal stage, thus the rest of the graphics rendering pipeline and the video output signal stage could have different sample densities, as they use different definitions of pixels. When necessary for clarity, these two different types of pixels will be called render pixels and video pixels. The plural of sample density is sample densities.

Conditional Sample Update Function

The most basic function of a frame buffer is to read or write the contents of a pixel or a sample. (In the rest of this definition, the term sample will be used for simplicity, but in all cases the definitions apply to pixels as well.) But several more layers of more complex operations on samples have been defined. In general, these operations have a new sample value, and a destination sample address. In general, a sample update function takes these as parameters, fetches the corresponding sample value from the destination sample address, performs some function on the new sample value and the one fetched from the sample address, and then writes back into the frame buffer the sample value that was the results of performing the function.

Simple examples of sample update functions include various Boolean functions, e.g., and, or, exclusive or, etc. But in 3d rendering, a very important function is the conditional update of a sample based on a comparison of the z sample component of the new sample value and the one fetched from the sample address. While most systems allow the particular comparison function to take on a wide range (e.g., greater than, less than, greater than or equal, less than or equal, not equal, equal, and other more complex functions), the basic idea is that whichever sample is "closer" to the eyepoint than the other should be the one now stored in at the sample address. If the new sample value "wins", then its value is written into the frame buffer, replacing the old value. Otherwise, the existing value can be kept as is, and no write operation to the frame buffer will be needed. This so-called "z-buffer update function" is an example of a conditional sample update function.

Other conditional sample update functions exist in 3d rendering, including those that are conditional on the stencil sample component of a sample. There are also arithmetic sample update functions, including many alpha blending functions, in which a weighted sum of the new sample color sample components and the color sample components of the sample contained at the sample address is written back to the sample address. Other conditional sample update functions are fairly simple state variable enable/disable of individual sample components and/or bit-fields of sample components to be read or written.

Real hardware for 3d graphics hardware accelerators generally has to support all of the update functions described here and more. To provide a simple term to cover all the potential combinations of these functions, in this document the term conditional sample update function will refer to the general update function used when a sample being rendered into the frame buffer is to be processed. Particular embodiments of the present invention may define their conditional sample update function to include any specific combination of the sample update functions described here, as well as other described in the literature, or new, special sample update functions defined for their embodiments.

Supersampling

The term supersampling refers to any of a number of 3d graphics antialiasing algorithms that operate by computing the value of the underlying image at more than one point per pixel, e.g., any antialiasing algorithm that uses "samples" rather than "pixels". In the 3d graphics literature, sometime the term "stochastic sampling" is used interchangeably with the term supersampling. This is not the case in this document. "Stochastic sampling" refers to a specific class of methods to decide which subpixel location within the underlying image are samples to be computed. Originally these ways were thought to be optimal or nearly optimal, but in recent years both empirical and theoretical studies have determined that these ways are nearly always sub-optimal to other ways. E.g., the final resultant antialiasing images made using "stochastic sampling" usually look worse than those produced using other methods to decide on which subpixel locations of the underlying image to sample.

Antialiasing

The term antialiasing refers to any of a number of restricted assumption or non-restricted methods for removing un-desirable artifacts in the images generated by the graphics rendering pipeline due to high spatial frequencies of the underlying image still being present in the images, e.g., getting rid of the "jaggies". The term antialiasing refers to both methods that reduce these artifacts only in constrained special cases, e.g., just in the rendering of lines, not triangles, as well a more unrestricted methods for removal of these artifacts.

The term antialiasing is one word without a hyphen; if it had a hyphen then the term "aliasing", and the term "aliased rendering" would be acceptable, and generally they are not.

Full Screen Antialiasing

The term full screen antialiasing refers to a sub-set of antialiasing methods that work over most all of the types of graphics primitive that are rendered anywhere within the image. These methods are usually fairly general, and impose fewer restrictions on the workings of the graphics rendering pipeline than imposed by the more specialized antialiasing techniques. To qualify as "full screen antialiasing" a method should have few limitations on when it can be used, and not have too many cases where it fails. The "full screen" tag just indicates that the method has to be general, the method can be enabled over smaller regions of a screen, e.g., just to a particular window, or even to a sub-region of a window.

Convolution

The term convolution generally refers to the application of a convolution kernel (set of weights) to a 2d array of samples for implementing full screen antialiasing methods. Technically the convolution is in one computational step applying both the "re-sampling" and "band-pass" filters of the antialiasing technique. In this document, this is the definition of convolution unless explicitly stated otherwise.

Convolution Kernel

The term convolution kernel refers to the set of weight values used in the computation of convolution. In this document, these convolution computations will always be part of a full screen antialiasing method, unless explicitly stated otherwise. This means that the convolution kernel will always be from a combined re-sampling and band-pass filter. The kernel values themselves are usually computed dynamically, as specified by the details of the full screen antialiasing method.

Antialiasing Filter

Since all convolution kernels in this document refer to convolution kernel filters that will be used to perform filtering for antialiasing purposes, the term antialiasing filter is defined to refer to any convolution filter that might be used for antialiasing.

Box Filter

One of the simplest full screen antialiasing re-sampling and band-pass filters is the box filter. The filter coefficients have the value of unity anywhere under the square box, and zero everywhere else. A common size for a box filter is one pixel. This type of antialiasing filter is referred to as a 1×1 box filter. Having a simple constant value for all the coefficients makes the box filter less computationally expensive than more general filters. It also generally generates a lower quality results than is generated by other more general filters.

Tent Filter

The term tent filter refers to a simple antialiasing filter shaped like a four sided pyramid or a tent.

Radially Symmetrical Filter

The term radially symmetrical filter refers to any filter whose filter coefficient values at a point are only a function of the distance of the point from the filter's center, e.g., not a function of the direction the point from the filters center. The filter is entirely determined by a single valued function of a parameter that is the distance of a point from the center of the filter. This radial function is sometimes also called the cross section of the filter.

Separable Filter

The term separable filter refers to any filter whose value at an x,y point is the product of two one dimensional filter functions, where one of these one dimensional filter functions is only a function of the x coordinate, and the other is only a function of the y coordinate. (Of course, many different x and y coordinate representations are possible.) These form of filters have both theoretic and real quality advantages over radially symmetrical filters when the final physical image display device has square (or nearly square) pixels, or the pixels are on a rectangular grid. Most of the radially symmetrical filters also have separable filter version, this additional filters can be used with some embodiments of this invention.

Gaussian Filter

The term Gaussian filter refers to a radially symmetrical filter that is an antialiasing filter whose radial function is a Gaussian curve.

Cubic Filter

The term cubic filter refers to a radially symmetrical filter that is an antialiasing filter whose radial function is a cubic curve or a piece-wise continuous series of cubic curve segments.

Mitchell-Netravali Filter

The term Mitchell-Netravali filter refers to a family of antialiasing filters that are radially symmetrical filters that are cubic filters. This family of cubic filters defined by two piecewise cubic curve segments where the cubic curve segments are parameterized by two parameters B and C.

Sync Filter

The term sync filter refers to a radially symmetrical filter that is an antialiasing filter whose radial function is the sync function. The sync filter has no maximum radius, it continues out to infinity.

Windowed Sync Filter

The term windowed sync filter refers to a radially symmetrical filter that is an antialiasing filter whose radial function is the sync function out to a certain specified radius (the window value), the filters coefficients are always zero for radius larger than this window value.

Graphics Pipeline

The terms graphics pipeline and graphics rendering pipeline both refer to the set of sequential pipeline stages that input data to a graphics rendering system goes through. Particular computer graphics rendering APIs usually specify in detail a set of pipeline stages that they will implement. In the literature these terms can refer to any of a number of different types of graphics render process, but in this document they always will refer specifically to 3d graphics render process. Sometimes the explicit term 3d graphics rendering pipeline will be used.

Render Pipeline

In a 3d graphics hardware accelerator, the terms render pipe and render pipeline refers to the portion of the hardware that actually implements the 3d graphics rendering pipeline, and an explicit preceding "3d" is usually not added.

Render Pipeline Stage

The definition of graphics pipeline states that it is made up of a set of sequential pipeline stages, these individual stages can be referred to by the term render pipeline stage. In some computer graphics rendering APIs, there is an explicit formal model of what the pipeline stages consist of, and of where the boundaries are between them. In other cases, it is common for the term pipeline stage to refer to less formally to some set of operations presently under discussion. Also, it must be noted that most all computer graphics rendering API render pipelines are abstract pipelines, e.g., they accurately describe the semantics of the complete 3d graphics abstract render process, but real implementations of the graphics rendering system, either hardware or software, may perform the operations of the graphics rendering system in substantially different order and/or manner, so long as the end result is in compliance with the abstract specification.

In this document, most of the render pipeline stages discussed are hardware pipeline stages or sub-stages, and the descriptions should be read with this context in mind.

Shader

The term shader refers to a specialized computer program that is used as specific pre-defined points in the graphics pipeline to allow flexible control over the rendering process. Shader code does not necessarily execute on general purpose processor elements, and may be subject to specific restrictions and constraints imposed by the graphics pipeline they are operating within. Specific type of shaders include, but are not limited to, surface shaders, light shaders, displacement shaders, volume shaders, atmospheric shaders, image shaders, vertex shaders, patch shaders, geometry shaders.

Pixel Shader

When shaders are compiled to execute in real-time, what was several different shaders can collapse into one. The most frequently run example of this is the pixel shader, which executes the combined semantics of surfaces shaders and light shaders at the frequency determined by the shader rate, which many times is every pixel. When discussing the execution of the majority of the programmable shader code in the context of a graphics rendering system, the term pixel shader is often used to refer to that code.

Programmable Shader

Because shaders can actually be programmed by end-users, they are also referred to as a programmable shader. Graphics rendering systems which allow programmable shaders to be used are said to support programmable shading.

Shader Rate and Pixel Shader Rate

For a given shader, e.g., a pixel shader, the performance that a particular 3d graphics hardware accelerator in executing that shader is referred to the shader rate. Any specific example should include the name and thus the units of measure for that shader, e.g., for a pixel shader, the pixel shader rate would be expressed in units of pixels shaded per second.

Pixel Shader Power

The term pixel shader power refers to the relative complexity of a given pixel shader. In simplistic terms, the pixel shader power could be crudely measured by the number of lines (in a linear path) of source code of the pixel shader, or by the number of texture references in (a linear path of the) the source code. Generally on a given 3d graphics hardware accelerator, the higher the relative pixel shader power of a pixel shader, the slower the pixel shader rate for that pixel shader will be. Usually, but not always, a higher relative pixel shader power, the more complex or realistic the final rendered image results will be.

Procedural Texture

The term procedural texture refers to texture maps that are dynamically created by a surface shader (or certain other types of shader) as individual texels of the texture are needed, rather than stored as an image, as standard texture maps are. Procedural textures have the advantage that can have virtually infinite size and virtually infinite non-repeating detail, as compared to a standard texture map stored as an image. Procedural textures have the disadvantage that they require intense amounts of computation every time a texel from them is accessed, e.g., they can slow down surface shaders that use them by quite a bit. Procedural textures are also called synthetic textures.

Procedural Geometry

The term procedural geometry refers to a programmable shader that creates geometry procedurally, for example fractal mountain generators. Procedural geometry is similar in concept to procedural textures.

Graphics Primitive

Geometric Graphics Primitive

The terms graphics primitive and geometric graphics primitive refers to types of objects that directly causes samples or pixels to be rendered. Geometric graphics primitives usually are geometric elements representing parts of what would be in the real world surfaces or volumes that reflect light, emit light, filter light, or bend light, e.g., anything that light interacts with. A common graphics primitive is the triangle, other examples include lines and dots, as well as higher order surface representations, and various representations of volumes, including voxels. Other graphics primitives can be more complex, e.g., characters and text. For the purposes of this document, no differentiation of meaning will be made between the terms graphics primitive and geometric graphics primitive.

While the qualifier "primitive" could give rise to the semantic implication that the graphics hardware accelerator can process the object directly, without additional help from the host computer, really it only means that the application software that uses a graphics API does not have to explicitly break down the object into simpler or other primitives. The library running on the host computer may do some of this breakdown before the object reaches the graphics hardware accelerator.

Most geometric graphics primitives are specified to a graphics API directly, or indirectly, as a collection of vertices. In addition to this vertex data, there may also be data specific to the geometric graphics primitive being specified, rather than specific to one of its control vertex, as the control vertexs may be shared by multiple geometric graphics primitive.

Geometric graphics primitives can be either two dimensional or three dimensional.

Position

In computer graphics, the term position refers to spatial location, e.g., a mathematical point in a particular space, usually the normal mathematical two, three, or four dimensional space.

Vertex

In computer graphics a vertex is a compound object that at least has the property of position. While certainly the most salient property of vertex is position, a vertex may have any of a number of other attributes. The plural form of vertex is vertices.

Additional properties that a vertex may posses, in any combination, include, but are not limited to: normals, colors, and texture coordinates. To emphasis that a vertex in computer graphics is not just a representation of a mathematical point, the terms vertex data, vertex information, and vertex properties are used to refer to the entire collection of properties that might be contained within a vertex.

All of the vertices that must be specified to define simple geometric graphics primitives, like triangles, lie on the surface of the geometric graphics primitive being specified. However, more complex geometric graphics primitives, such as Bézier patches and other higher order surfaces, need additional mathematical points specified, and in general, these additional points do not lie on the surface. The representation of such additional points in computer graphics are referred to as control vertices. To avoid confusion, in this document the term control vertex will refer to all the vertices that define a geometric graphics primitive.

Triangle

Line

Dot

The terms triangle, line, and dot are common specific instances of geometric graphics primitives. These primitives are specified to a graphics API by specifying directly, or indirectly, 3, 2, or 1 vertices, respectively. These graphics primitives can also appear as two dimensional primitives, and even the three dimensional version may be transformed into their two dimensional versions by the graphics hardware accelerator. In this document, these terms always refer to the three dimensional version of these objects, unless specifically stated otherwise.

Note that there can be some confusion in when something is in a three dimensional vs. two dimensional space. When converted into screen space and rendered into the frame buffer, these graphics primitives are many times though of as now two dimensional, even if they entered the graphics hardware accelerator as three dimensional graphics primitives. But unless z-buffering is disabled (as well as many other rendering options) before rendering the screen space versions of these graphics primitives, the graphics primitives technically are still three dimensional, as they still have a z value defined for all points on them.

Higher Order Surface

The term higher order surface refers to a wide range of methods for representing geometric graphics primitives embedded in three space that are more complex than a triangle, e.g., usually the surfaces are curved, not planer. In this document explicit instances of specific higher order surface representations will be infrequent; instead usually issues that the broad range of higher order surface methods of representation all share (e.g., in general they are not planer, or easy to clip) will be discussed.

Specific instances of higher order surfaces include: Bézier patches, quadric surfaces, super-quadric surfaces, cubic patches, B-Spline surfaces, polynomial patches, non uniform rational b-splines surfaces (NURBS), conic surfaces, ruled surfaces, surfaces of revolution, implicit surfaces, sub-division surfaces, fractal surfaces, wavelet based surfaces, and both trimmed and un-trimmed versions of all these surfaces.

Compressed Geometry

The term compressed geometry refers to various encoding of geometric graphics primitives that take up less storage space than the more traditional representations of geometric graphics primitives. The compression can be loss-less or lossy. The lossy compression can still be preceptorial lossless. This means that while the compression may be lossy from a numerical point, e.g., after compression, the original geometric graphics primitives cannot be bit-for-bit reconstructed correctly, but that the differences are so minor that a human viewing the rendered geometric graphics primitives cannot reliably tell that anything was lost.

Depth Complexity

The term depth complexity refers to the number of times during the rendering of one frame that the conditional update function of pixels (or samples) is applied into a specified region of pixels (or samples) in the frame buffer, divided by the total area in pixels (or samples) of the specified region. Assuming that the only rendered graphics primitives are triangles, the depth complexity of a rendered image is the average number of triangles that cover a pixel (sample) in the image being rendered.

Rasterization Pipeline Stage

One of the primary tasks of any 3d graphics hardware accelerator is, in response to receiving graphics primitives from the host computer or internal display list memory, to render those graphics primitive into its frame buffer. While most graphics pipelines define many initial render pipeline stages of rendering that do not affect the frame buffer, the pipeline stage(s) that actually generate pixel or sample values to be used as one of the inputs to a conditional update function of pixels or samples in the frame buffer is called the rasterization pipeline stage, or sometimes just rasterization.

Scan Line

Many rasterization (and other) algorithms render pixel values in the same order that video signal formats define the sequential transfer order of output pixels, which is the same as the order most CRTs scan their electron beam over their phosphor screen: from left to right, and from top to bottom. When operations are being performed on sets of sequential pixels from one row of an image, it is common to say that the operations are being performed on a scan line (of pixels), even if the operation is not directly coupled to the video output signal processing.

Fill Rate

Pixel Fill Rate

Sample Fill Rate

Performance of 3d graphics hardware accelerators can be measured in terms of the rate at which a given accelerator can perform a particular task.

The task of rasterization is one such. The performance of rasterization can be measured in many ways, but there are two specific ways commonly used to benchmark 3d graphics hardware accelerators. One of these is to measure the fill rate of the rasterization stage. The term fill rate refers to the rate at which pixels or samples are generated and the conditional update function of pixels or samples is applied into the frame buffer. When no qualifier is given before the term fill rate, then the entity being filled are usually assumed to be pixels. When being more specific, the terms pixel fill rate and sample fill rate refer to the specific frame buffer entity that is being "filled". The rates are measured in units of entities per second, e.g., pixel fill rate is measured in units of pixels per second, and sample fill rate is measured in units of samples per second. Note that a system that uses samples instead of pixels in its frame buffer can still have its rasterization performance characterized in terms of pixels filled per second, so long as there is mention of at which sample density (e.g., how many samples per pixel are there on average) the pixel fill rate was measured.

Note that fill rates are usually peek rates, e.g., the rates are measured on the rasterization of geometric graphics primitives that each cover a large number of pixels. For this reason the fill rates are sometimes called asymptotic fill rates.

For a geometric graphics primitive that covers only a small number of pixels, the performance of the graphics rendering system in rendering that geometric graphics primitive will depend not only on the fill rate, but on the maximum geometric primitive rate, e.g., influenced by various overhead operations that must be performed for every geometric graphics primitive, no matter how few pixels it covers. In the limit, e.g., a geometric graphics primitive that covers less than one pixel, the rasterization time will be independent of the fill rate, and dominated by the maximum geometric primitive rate.

Maximum Geometric Primitive Rate

Maximum Triangle Rate

Set-Up Limited Triangle Rate

As described above, for geometric graphics primitives that cover less than one pixel, the time it will take to rasterize them has virtually no dependence on any fill rate, but is all mostly completely determined by the maximum geometric primitive rate. This is the maximum rate at which one geometric graphics primitive after another can pass through the graphics rendering system, even assuming that the rasterization of each geometric graphics primitive produces little or no pixel or sample values that have to be used as one of the inputs to a conditional update function of pixels or samples in the frame buffer.

This rate can be quite different for different geometric graphics primitives, so rather than use a complex abstract rate, usually rates are measured in terms of a specific geometric graphics primitive, e.g., a triangle, a line, a dot, etc. Even maximum rates for a specific geometric graphics primitive type are far from simple to specify; many other rendering state values of the graphics rendering system can cause the maximum rate of a given geometric graphics primitive type to vary wildly. The best that can be done is to when stating the maximum geometric primitive rate for a specific geometric graphics primitive type, as many of the potentially rate influencing rendering state values and other factors should be stated as well.

Because triangles are many times the most important geometric graphics primitive, the maximum triangle rate is of specific interest in comparing or contrasting different 3d graphics hardware accelerators.

The primary overhead computation in the rendering of geometric graphics primitives that will limit performance when little frame buffer fill is being done, e.g., the fill rate is not (much of) a factor is usually the set-up stage of the 3d graphics rendering pipeline. Because this stage thus many times will to a great extent determine the maximum geometric primitive rate, sometimes the rate will explicitly name its primal cause, e.g., the maximum triangle rate is sometimes also called the set-up limited triangle rate.

Frame Buffer and Video Terms

Two important concepts of 3d graphics hardware accelerators are those of the frame buffer and of video signal format. The term video signal format refers to the formal interface for transferring information to a physical image display device, a third important concept. This section will give definitions to several technical terms related to these three areas. Specific definition of these terms is needed prior to their use in the description of the invention.

Frame Buffer

The defining difference between graphics hardware accelerators and other areas of computer hardware is that graphics hardware accelerators are involved in the organization, processing, and conversion of digital computer information into images that human beings can see. (In this definition, graphics hardware accelerators also includes the sub-field of image processing hardware accelerators.) While the earliest physical image display devices connected to general purpose computers were individual lights and then oscilloscopes, since the early 1980's, most computer based image displays were attached to external I/O processor (graphics hardware accelerators) based on the concept of a frame buffer.

From the host computer's point of view, a frame buffer typically looks like a region of main memory. This memory was further organized as a 2d array of fixed size binary data, called pixels. While pixels started out at the smallest possibly binary data size, a single bit, over time the term pixel was also used to define larger objects that could also have internal structure. Graphics accelerators based on the frame buffer concept differed from previous graphics accelerators in that the frame buffer enables the storage of an explicit (and equal size) pixel value for every location in the 2d array. Thus, sometimes frame buffers are referred to as stored pixel frame buffers, to further differentiate them from alternative graphics architectures that had no such explicit dedicated storage. Because the earliest frame buffers used just one bit of storage for each pixel, frame buffers were also referred to as bit-mapped displays, to emphasize the point that every pixel on the image that the human saw was backed up by a separate dedicated bit in the frame buffer: e.g., every "bit" was "mapped" to a different visible pixel.

From the point of video of the physical image display device, the frame buffer is a 2d array of pixels to be continuously converted into a video signal (originally an analog video signal, now also more and more a digital video signal) in some agreed upon video signal format to be sent out through a video output interface as a video output signal to a physical image display device. This is indeed what happens. The width and height of the 2d array of pixels became the width and height of the raster of dots on the screen of the physical image display device, which until recently was quite likely to be a cathode ray tube (CRT).

The term "frame buffer" in the context of video technology is a device that can store (at least) one frame of video information. In the context of computer graphics, the term frame buffer initially started out meaning the same thing, e.g., a external I/O processor containing digital memory store for an image comprised of pixels, where the external I/O processor could continuously send out through the video output interface the contents of the frame buffer in a video output signal in video signal format as input to a physical image display device. The host computer that the external I/O processor was connected to could read and write the pixels in a wide variety of computer graphics algorithms, including rendering algorithms. The early computer graphics frame buffers were single buffered, e.g., they held a memory store for one single frame of pixels, and the same pixels were simultaneously accessed by the host computer that were also accessed by the video output sub-system.

But these computer graphics frame buffers started adding considerably more features, including support for hardware rendering, and soon diverged from the common definition used in the video literature. In current usage within the field of computer graphics, the term frame buffer has two causal uses. One use is that the term is still used to refer to the entire physical device, e.g., to refer to most any graphics hardware accelerator, regardless of how much more than a simple frame store the device has become. When the physical form of the graphics hardware accelerator is a single printed circuit board, the term frame buffer card is also used in this same sense. The other current computer graphics use of the term frame buffer is as a particular part of a larger sub-system, e.g., the frame store component of a larger graphics hardware accelerator system. Sometimes herein the term sample buffer will be used to emphasize that the memory store may store samples rather than or in addition to pixels.

A particular frame buffer can be characterized in terms of the width and height in pixels of its internal array of pixels, which also called the resolution of the frame buffer, the characterization also includes the size in bits of the pixels that the frame buffer supports. Thus, three numbers separated by "x" became the standard terminology for describing the resolution and pixel size (in bits) of a frame buffer, e.g., 640×480×8 would be a frame buffer storing images as 640 pixel wide by 480 pixels tall by 8-bit of storage for each pixel. Because this representation had three numbers, and the first two numbers referred to width and height, the pixel size would sometimes be referred to as pixel depth or since this was the pixel size in bits, it is also sometimes referred to the "bit depth" of the frame buffer. This is not to be confused with more general 3d concepts to be described earlier. Frame buffers also have a number of secondary attributes that may also be included in the characterizing of a frame buffers capability, the next most common attribute being the video refresh rate of the final video signal being generated. While the three number characterization was a good overall way of describing the early frame buffers, as frame buffers became more complex, most all of them could support more than one pixel array resolution, video refresh rate, or even more than one bit size of pixel. Thus, it is common nowadays to characterize a frame buffer by the highest resolution it supports, or to explicitly list all the important resolutions, pixel sizes, and video refresh rates that it can support.

Frame Buffer Card

The earliest external I/O processors that implemented the concept of a frame buffer (separate dedicated bits of storage for very pixel in the image) did little else, e.g., they did not "accelerate" or perform 2d rendering, let alone 3d rendering. They were merely a memory store for a digital representation of an image that could be accessed and modified by the host computer, and also continuously sent this image out through a video output interface as a video output signal in some agreed upon video signal format to a CRT or other physical image display device. Thus, these external I/O devices couple the host computer to the physical image display device, e.g., couple digital images in the computer world with real photon images in the physical world.

Thus, these physical sub-systems, often a daughter card for a general purpose computer, were often referred to as "frame buffers", or frame buffer card. In this document, the term "frame buffer" without the descriptor "card" will not mean the same things as the term frame buffer card. Instead, the term frame buffer is reserved for the meaning defined elsewhere. (In short: the image store component of a larger graphics hardware accelerator sub-system.)

Over time, most commercial products that served this function added additional computational processes within the sub-system. Now more and more support for 2d rendering were being added, and today many such products also include considerable support for 3d rendering. But today's sophisticated products that couple a general purpose computer to one or more physical image display devices still usually include a simple frame buffer component, and can be used that way by software. Thus, for both historic and some functionality reasons, it is common for the term frame buffer card to be used to (loosely) refer to any device that couples a general purpose computer to a physical image display device, even if that device that performs this coupling is a complex 3d graphics hardware accelerator.

Physical Image Display Device

A wide verity of technologies have been developed and put into production external I/O devices that allow electronics systems to dynamically generate and control photons of light that are perceivable by humans. Such external I/O devices will be referred to by the term physical image display device. Usually, although not always, these physical image display devices are capable of dynamically generating sequences of differing 2d images at a real-time rate. In the literature, several common shorter terms are in use to refer, in context, to this class, including: display device, image display, image display device, and visual display. Indeed because cathode ray tubes (CRTs) until recently used to be by far the most common physical image display device, frequently the acronym CRT is used in place of these other terms as a generic reference to the entire class of physical image display devices. Most of the discussion in this document is not physical image display device specific, so in most cases one of the class names will be used when that component of an overall system needs to be referred to.

A given technology for conversion of electronic signals to real-time sequences of images may be used in more than one way to couple the photons to human eyes. Different ways of coupling lead to different sub-classes of physical image display devices. Three examples include, but are not limited to, the human visual system coupling methods of direct view devices, projection devices (front or rear), and head-mounted displays (HMDs). And even HMD devices may be internally constructed of direct view, projection, or direct image formation on the human eye's retina.

Given this, the class of physical image display devices include, but are not limited to: direct view CRTs, direct view LCD panels, direct view plasma panels, direct view electroluminescent displays, led based displays, CRT based projectors, LCD based projectors, LCOS based projectors, DMD based projectors, laser based projectors, as well as head mounted displays (HMDs).

Hardcopy Display Device

There are other ways of creating and/or controlling photons to some degree that are seen by humans, but that are not dynamically controllable—hardcopy display devices. Thus, printers of paper and of film can be considered non real-time display devices, but are not the focus of this invention.

Video Signal

When information representing a sequence of 2d images is carried by a signal traveling in some medium, and the speed of the information flow is such that the image sequence is flowing at real-time rates, that signal is referred to as a video signal. Such signals are frequently electronic, where the information is carried by the amplitude changes of a voltage, and the medium is an electrically conductive material. The signal could be electromagnetic (radio) waves, where the information is carried by some property of that wave, and the medium is free air or free space. The signal also could be optical, where the information is carried by the intensity changes of light, and the medium is an optically transparent material (including free air and free space), but it also could be an optically "conductive" material, as in fiber optic cables. (Technically light is just a higher frequency form of electromagnetic radiation, but because in practice different physical materials and devices have to be used to handle light, it is usually considered to be a different type of signal.)

Analog Video Signal

Digital Video Signal

Compressed Digital Video Signal

These sequences of image information may be represented in many different ways by a video signal. Encodings that directly map the intensity of small regions of the image to the intensity (in some measure) of the video signal are referred to as an analog video signals. Encodings that first map the intensity of pixels (as the small region of the image definition) to digital values, and then map the bits of the digital values to the intensity (in some measure) of the video signal are referred to as digital video signals. An encoding that first compress the digital information that is the representation of the sequences of image as digital pixels to a smaller size digital representation before mapping the bits of the digital values to the intensity (in some measure) of the video signal are referred to as compressed digital video signals.

Video Signal Format

Some structure and set of conventions are necessary to reconstruct the information contained in any of these forms of video signals as sequences of images again (which is the whole point of the matter). For any of these forms of video signals, the specification of how to encode and decode images to and from a particular structured representation of the sequences of images is referred to as a video signal format.

The vast majority of video signal formats for analog video signals directly descend from the first television video signal formats standardized in the 1930's and 1940's, and include the formats NTSC, PAL, RS170, VGA, SVGA, etc. More recently several new video signal formats for digital video signals are being used, and include the formats D1 and DVI.

There are also several new video signal formats for compressed digital video signals in commercial use, including several different variants for HDTV: 1080i, 720p, 1080p, 1080 24p, D10, etc.

Video Output Interface

Video Output Signal

When one or more video signals are generated by a first device, and then transmitted through whatever the appropriate medium is for each video signal to one or more additional devices, the portions of the first device that brings each video signal to a physical boundary where it is then coupled to the appropriate transmission medium (e.g., wires, coax, optical fiber, etc.) are referred to as video output interfaces. A video signal traveling through a video output interface is referred to as a video output signal.

Resolution

In this document, the term resolution is used to refer to a property of many different types of images: images in the video output signal, images used as texture maps, images rendered into the frame buffer, etc. The term resolution itself refers to spatial bandwidth properties of the image as a whole, but usually explicitly means the width and height of the image measured in units of integral numbers of pixels. Resolution is an abstract concept, it must be applied to some other specific concept that deals in some way with images. Sometime in the literature the term resolution is used without any qualifiers in context. In this document an appropriate qualifier will always be used.

Video Resolution

One property of a video signal format is its resolution, usually expressed as a pair of integers: the width and a height of the images being represented described in units of integer numbers of pixels. It should be noted that these pixels may or may not be square. Thus, one may use the phrase video resolution to refer to this pair of numbers.

Other properties of a video signal format include its frame rate and possible use of interlacing alternate scan lines to reduce the bandwidth of the video signal. Occasionally the phrase video resolution not only refers to the pixel width and height of the video signal format, but also indicates if the video signal format uses interlacing, and even more rarely the video resolution might include a specific description of frame rates.

Frame
Video Format Frame
Render Frame
Field
Interlacing

The term frame is used to describe a single image out of a sequence of images when the sequence of images is being sent in real-time. When discussing the period of time that it takes for a frame of video to go by, the term video format frame will be used to distinguish this reciprocal of the video format frame rate from the reciprocal of the rendering frame rate, known as the render frame.

The term field is used to describe a sequential portion of a video signal format that conveys global but potentially partial information about some aspect of an image from a given frame in a sequence of frames. In so-called progressive video signal formats, e.g., those that do not use interlacing, every field of the video signal is also a frame of the video signal. The definition of interlacing for video signal formats that are interlaced is that every frame is broken down into two sequential fields, the first contains all the odd rows of pixels in the image being transmitted, the second contains all the even rows of pixels in the image being transmitted. Note that the semantics can be tricky here depending on how the interlaced fields were originally generated. Technically the interlaced television standards specify that each field is a complete separate image itself, just with only half the number of pixels in height of the frame, and thus the field's pixels are twice as high as the pixels specified in the frame. Thus, a television frame of a fast moving object would look like two superimposed images from different points in time. In other cases, the two fields really are just a split transmission of a single image. Yet other complications exist when transmitting video signals that were originally created in a different video signal format than they are now being sent. E.g., the need for so-called "3-2 pull-down" when 24 frame per second movie film must be transmitted via the NTSC video format.

Video Signal Format.
Field Sequential Color
Field Sequential Stereo

The concept of interlacing is not the only video signal format representation technique that causes fields to not be the same things as frames. In field sequential color video signal formats, there are three sequential fields to every frame, each field containing exclusively one color component, e.g., the first field are all the red components of the pixels of the image to be sent, the second the green, the third the blue. (Of course, many different orders of or color component representations may be used.)

In field sequential stereo video signal formats, there are two sequential fields to each frame. The first field caries the complete image for the left eye; the second field carries the complete image for the right eye. These two images may be shown as sent, e.g., in rapid fashion, with some form of shutter glasses or polarization or image angle of view spatial separation effect on the perception of the video image on the physical image display device of the human(s) viewing the display. In this manner, only (or mostly) the left image will be visible to the left eyes of the human(s) watching, and only (or mostly) the right image will be visible to the right eyes of the human(s) watching, giving rise to perception of stereoscopic depth. Alternately, the left and right eye fields may be sent to two different physical image display devices and then use some mechanism to ensure proper image visual delivery to the appropriate eyes of the human viewer(s). In the case of most HMDs, each eye has its own private display device situated so that only each eye only sees its own display device. Technically when two different display devices are used, rather than rapid display on a single physical image display device, the field sequential stereo video signal format is just multiplexing and sending two different image streams on one video signal.

It also should be noted that multiple of these field techniques can be combined. Several commercial HMDs have used interlaced field sequential color video signal formats, where there are six fields to each frame.

Frame Rate
Video Format Frame Rate
Rendering Frame Rate
Render Rate
Rendering Rate In the context of video signal formats, the phrase "frame rate" is used to denote for a particular video signal format the rate at which new images are sent when a sequence of images is being sent. It is measured in units of numbers of frames sent per second. To avoid confusion with the similar but different concept of the frame rate of graphics rendering systems, the phrase video format frame rate will generally be used in this document. Video format frame rates are usually video signal format dependent constants. The value of the constant is an explicit property of the video signal format.

In the context of a graphics rendering system, either 2d or 3d, the phrase frame rate is used to denote the rate at which new images are being rendered. The frame rate should be expressed in units of frames rendered per unit of time, usually in units of frames rendered per second. However, when the number of frames rendered per second falls below unity, e.g., it takes more than one second for a single frame to be rendered, instead the frame rate is often expressed in units of time per frame rendered, e.g., number of seconds, minutes, hours, or even days of time per frame rendered. This is why, in general, hardware rendering is usually measured in units of frames rendered per second, whereas software rendering is usually measured in units of time taken per frame rendered.

To avoid confusion with the similar but different concept of the "frame rate" of video signal formats, the phrase rendering frame rate will generally be used in this document. Rendering frame rates are usually not constants, as the time taken to render a given frame is usually not deterministic. However, as an average or a goal, rendering frame rates estimates can sometimes be loosely specified. In simulation applications where performance is critical, such as flight simulation, a constant rendering frame rate is a very important goal, and a verity of methods have been developed to ensure that the graphics rendering system does not take more time on a given frame that is allotted by the target frame rate. It should also be noted that sometimes, in context, the phrase render rate or rendering rate are used as a shorter phrase for rendering frame rate.

Field Rate
Video Format Field Rate

In the context of video signal formats, the phrases field rate and video format field rate are used to denote for a particular video signal format the rate at which new fields are sent when a sequence of frames is being sent. It is measured in units of numbers of fields sent per second.

Video Refresh Rate

Once again because of the potential ambiguity of the phrase frame rate, in this document the phrase video refresh rate will generally be used to indicate that the rate in question is a (constant) property of the video signal format, not a non-determinist property of the graphics rendering system.

Unfortunately the phrase video refresh rate does not have uniform use; mostly it is used to refer to the video format field rate, but sometimes it is instead used to refer to the video format frame rate.

Video Format Pixel Rate

Video Format Pixel Frequency

The chief concept missing from the analog video signal formats of half a century ago is the concept of pixels. So while the video signal formats carefully define both a vertical rate (the field rate), and a line rate (the horizontal retrace frequency), there is no mention of a pixel rate. On a black and white CRT, the video signal is a continuous analog signal, and there are no pixels or pixel boundaries.

In many modern circumstances a pixel concept had to be added to the old as well as new video signal formats. In some cases for a variety of reasons the pixels were defined in such a way as to make them non-square (rectangular), which doesn't work well with many 3d rendering algorithms. In most modern video signal formats, the pixels have been defined to be square, or nearly square (e.g., 6% non-square in one case). Regardless of squareness, once a pixel has been defined relative to a video signal format, we can now talk about a pixel rate within that video signal format, e.g., the video format pixel rate, or, as it is also know, the equivalent frequency term, the video format pixel frequency, measured in Hz.

Note that there can be a difference between the number of visible pixels in one frame of video vs. the video format frame rate divided by the video format pixel frequency. This is because most video signal formats have both horizontal and vertical blanking times during which no visible pixels are present. Which one of these two different definitions of pixel frequency different parts of a graphics hardware accelerator has to support is a complex trade-off involving the details of how individual scan lines of output pixels are buffered, and is well known to those skilled in the art.

Video Format Frame Size

The total number of pixels in a single frame in a video signal format is the product of the width of the video resolution times the height of the video resolution. This number is referred to as video format frame size. In the literature, it is also referred to as screen size, but that terminology will not be used here.

Physical Image Display Device Native Resolution

The images of many of today's newer technologies for physical image display devices are built up out of discrete pixels, e.g., not the effectively continuous phosphor surface of a CRT. In the literature the video resolution of the built-in pixels is referred to as the native resolution, in this document for clarity we will used the longer term physical image display device native resolution to refer to the same thing.

Most such devices usually have some electronics to convert video signal formats with different video resolutions than the physical image display device native resolution to a different video signal format that has the same video resolution as the physical image display device native resolution. However, this conversion can degrade the quality of the displayed images, so whenever possible the graphics hardware accelerator should be programmed to ensure that its video output signal's video signal format's video resolution is the same as the physical image display device native resolution.

Two additional very important areas for 3d graphics hardware accelerators are IC technology and memory chip technology. This portion of the document will develop and define several important technical terms that need to be defined prior to their use in the description of the invention.

Technology for Devices for Storing Bits

A defining difference between the digital computer and previous analog computers is the ability of the digital computer to represent, store, and process information as digital bits of information. While the earliest digital computers used vacuum tubes to store bits, with the invention in the fifties of magnetic core memory most general purpose computers switch over to core memory for their main internal bit storage needs (so called main memory, still many times even today also referred to as "core memory", even though other devices are now used). Secondary memory stayed on magnetic media (drums, disks, tapes, etc.), and very frequent access limited size stores (e.g., registers) were built from the also newly invented transistor. The transistor memory was very fast, but also quite expensive; several transistors plus several other devices (diodes, resistors, and capacitors) were needed to store a single bit.

Integrated Circuit

In the early sixties, a new technology for building electronic circuits was invented. The integrated circuit (IC) allowed at first dozens, and later many more transistors, diodes, resistors, and other electronic devices to be constructed and wired together on the surface of one small single chip of semiconductor material. For the purposes of this document, the term IC is defined to have the same meaning as the term "chip", defined below.

The invention of the IC made it possible to store several bits within a single device. This was good for registers, but still far too expensive for main memory uses.

Chip

Today's technology is driven by the ever increasing capabilities for putting more and more complex integrated circuits onto a single silicon chip. While most large chips are placed one each into separate packages, advancing packing technology of "multi-chip modules", and wafer scale integration, among others, can blur the one to one relationship of silicon chips to packages. Also, while the majority of today's electronic circuits are built on top of silicon chips, other materials than silicon are used today, and may see more use in the future. Thus, for the purposes of this invention, the term chip is not meant to limit the scope of the invention to only chips made of silicon, or necessarily to single pieces of material. The term chip can, in context, refer either only to the actual substrate material and the electronic circuits that have been added its surface, or, the more frequent usage is to refer to the entire physical part including the packaging to which most chips are embedded.

Pin

Information, both digital and analog, as well as electrical power, clocks, and reference voltages, are brought to and from an individual chip by many separate electrical conduits that extend from the chip's package. In packaging technology that far pre-dates chips, these electrical connections were individual pins of metal, e.g. as appeared on the bottoms of vacuum tubes. Most of the packaging technologies used for chips in the 1960's though to the 1990's, and still in some use today, were metal lead frames that were bent over the edge of the chip package to form sharply narrowing pieces of metal that were still called pins, even thought the form was no longer always a cylinder. More recent chip packaging technologies include among others so called "ball-grid-arrays", where the external electrical connection to the chip is a hemisphere of metal, among other shapes. However, these pieces of metal are still usually referred to as pins, especially when talking about the overall architectural design of electronics systems formed out of chips, and when very particular details of the true three dimensional form of the packaging are not relevant. In this document, the term pin will be used to refer to the individual conduits that connect the electronics within the package to the world outside the package.

The number of pins that a chip has is a cost/performance trade-off. The fewer the number of pins on a chip, generally the lower the cost of the both the silicon chip as well as the package will be, and also generally the lower power consumption of the chip will be. But the more pins a chip has, generally the higher data bandwidth that is achievable into and out of the chip. Thus in general design decisions that reduce the bandwidth required to flow between chips will result in allowing the chips to have fewer pins. On the other hand, the more pins a chips has, generally the higher the potential performance is achievable in whatever system contains the chip. The balancing of these trade-offs is generally performed at the system level by the system architect, as part of other trade-offs in minimizing the cost of the system while maximizing the performance of the system, relative to the both the current and the anticipated future cost and performance sensitivities of the various market segments that the system product is targeted at.

ASIC

The term ASIC is an acronym for "Application Specific Integrated Circuit". For the purposes of this invention, the term ASIC refers to chips that have been designed for a specific specialized purpose, such as performing computer graphics algorithms, as opposed to more general chips that have been design for a wide verity of uses. The term ASIC is not intended to be limited to chips designed with less than "full custom" IC design tools, such as sea of gates, gate arrays, programmable gate arrays, etc.

FIFO

The term FIFO is an acronym for "First In First Out." In the context of electronics hardware it refers to a flexible storage buffer that lets fixed size groups of bits enter and leave in non-correlated bursts. FIFO buffers are typically used to interface a producer of a particular type of data from a consumer of the same type of data, when the producer generates the data in at an un-predefined rate, and the consumer consumes the data at a different un-predefined rate. Many types of FIFO buffers have the ability to send a warning signal under varying internal conditions of the FIFO buffer, in particular a "high water mark" warning signal indicates that the storage capacity is within a certain preset limit of being exhausted, e.g. about to overflow.

While originally FIFO were produced as individual chips, nowadays most FIFOs are just another small circuit that can be used anywhere within the design of a larger circuit on a single IC.

RAM

The term RAM is an acronym for "Random Access Memory". This term is used to differentiate memories for which there is little or no performance penalty for accessing their contents in other than a specific predefined order from others type of memory where such performance penalties do exist. In most cases, a specific type of RAM device will be referred to.

Memory Chip

ICs made it possible for a single chip to be built that contained more than one bit of information. This gave rise to a new class of devices, referred to by the term memory chip. This term refers to a number of general purpose and special purpose chips designed to store, retrieve, and sometimes process information represented as bits. This term is an important one, as much of this invention relates to specialized ways to organize and use memory chips.

The earliest memory chips had more pins on the chip than they had internal bits of storage, so the bits could be more or less accessed directly from outside the chip. But as the number of bits that could be built into a chip eventually surpassed the number of pins that could be economically attached to a chip, some form of internal multiplexing was needed. Such a multiplexing technique had already been designed for memory systems based on magnetic cores: data from within the memory is read or written by first presenting an internal address (just a string of bits), and then accessing the bits associated by that address. This form of accessing bits means that memory chips are a type of RAM.

Modern memory chips come in a verity of sub-classes, to be described. In describing this invention, in most cases a specific class of memory chip will be referred to.

Local Memory Sub-System

In most applications of memory chips, more than one memory chip is used. This collection of memory chips are often considered together as a single more complex memory system. This collection of memory chips may all connect to a single controlling chip, or the control of the array may be connected to more than one chip. Regardless of the number of connecting non-memory chips, the collection will be referred to in this document as a local memory sub-system.

In simple cases, local memory sub-systems can be viewed as composite entities that behave very nearly like a single memory chip would, if it had a wider word size and/or a greater storage capacity.

Specifically two identical memory chips sharing most all control lines except for data input/output pins look very much like a single memory chip with double the word size of the actual memory chips, and also double the storage capacity.

Two identical memory chips sharing most all control lines including the data input/output pins look very much like a single memory chip with the same word size of the actual memory chips, but with double the storage capacity.

The composition techniques of the last two paragraphs can be both applied to create another type of local memory sub-system. Four identical memory chips sharing most all control lines, but with only half of the memory chips sharing data input/output pins look very much like a single memory chip with double the word size of the actual memory chips, and also with quadruple the storage capacity.

Clearly these memory chip composition techniques can be extended to form local memory sub-systems with m times the word size and m*n times the storage capacity of the actual memory chips, using a total of m*n of these actual memory chips. This is how many local memory sub-systems have been traditionally created. There are technical limits to the composition techniques; there are limits on the number of chip pins on either the memory chips or the controlling chips that can be driven by a single pin of another chip. There are also other more complex ways to combine multiple identical or non-identical memory chips into a local memory sub-system than has been described here.

The discussion of local memory sub-systems is relevant to this document because the architecture of 3d graphics hardware accelerators often includes the design of one or more different local memory sub-systems, and this is specifically the case for the invention described herein.

Word Size

In the special context of a single memory chip, the term word size refers to the number of bits of data that can be moved to or from the memory chip in parallel, in most cases this is the number of input or output data pins attached to the memory chip. When a number of memory chips are considered as a whole, as in a local memory sub-system, the phrase word size refers to the number of bits than can be moved into or out of the group of memory chips in parallel, and is not limited to the number of pins on just one memory chip.

SRAM

Even though the storage bits were all now on one memory chip, each bit of storage still required several internal transistors to store and allow read and write access to each bit. While there were several different ways to build memory chips of such storage, memory chips of multiple bits like this that were accessed externally are called static random access memories, or SRAMS for short. These memory chips are characterized both by the total number of bits that they could internally store (e.g., "a 256K-bit SRAM"), but also by the number of bits available all at once on the memory chip's pins after the address had been presented: the word size of the memory. A single bit wide device thus would also be described as "256Kx1 SRAM". This terminology can be confused with that for characterizing frame buffer resolutions. The key difference is that memories are always characterized by one or two "by" numbers. e.g. 256K or 64Kx4; frame buffer resolutions are usually characterized by three "by" numbers, e.g. 640x480x1. Occasionally when the size of the pixels are not important, and it is clear from the context that frame buffer or video resolutions are being talked about, two "by" numbers may be used: e.g. VGA resolution is 640x480.

DRAM

In the early 1970's a new circuit for storing digital bits was invented that only required one transistor per bit stored. The trade off was that the bit would remain stable for only fractions of a second before loosing its value. Thus these memory chips had to read and re-write, or refresh all the bits several times a second. This new class of memory chips were called dynamic random access memories, or DRAMs for short.

It was the introduction of relatively inexpensive (per bit of storage) DRAMs that made the concept of a frame buffer commercially possible. The existence of the frame buffer also influenced the design of DRAMs; thus there was a symbiotic development of the stored pixel frame buffer and DRAM architecture and technology.

VRAM

By the mid eighties, DRAM producers (including TI) were selling a interesting percentage of their product into these professional frame buffer companies. But a curious thing happened during the transition from the 16Kx1 capacity DRAMs to the 64Kx1 capacity DRAMs. The frame buffer companies, who were usually the first in line asking to get prototype parts of new DRAMs, were not asking for any of the 64Kx1DRAM parts. At that rate, there wasn't going to be any sales of 64Kx1DRAM parts into companies building high end frame buffers.

The density of DRAM had been growing much faster than the bandwidth of data access. The key measure is ratio of bandwidth of a memory chip, measured in bits per second, to the total memory capacity of the memory chip, measured in bits.

One solution was special DRAMs with a second set of data pins that can access the internal memory in parallel to the normal data pins. The idea was that this second set of memory data pins, or second "memory port" could be used to read out just the data needed for the video output signal almost completely in parallel to the more normal read and write access of the DRAM. Thus this second memory port is commonly referred to as the "video port". This attacked the heart of the DRAM chip bandwidth problem by adding considerably more, but specialized, bandwidth. These parts were called VRAMs, an acronym for "Video Random Access Memories". Generally they could store as many bits internally as the "current" generation of DRAMs. But the physical size of the VRAM chip was usually twice as large as a DRAM that could store the same number of bits as the VRAM could. This extra chip area was needed to support the second memory port (the "video port"). This made the VRAM chips more expensive per bit of storage than the equivalent DRAM part. However, the parts were quite economically good for manufacturers building frame buffers for either graphics terminals or built into workstations, so most of the high end computer and display companies used them. In the mid eighties to early nineties, PCs were still using low pixel depth VGA frame buffers with low video format pixel rates, and could build cheaper designs using standard DRAM.

At this point in time the display technology was still almost exclusively CRT based. The resolution of the CRTs had started out the same as television standards: 640 pixels wide by 484 pixels tall, refreshed 30 times a second using interlaced video signal formats. These video signal formats required a video format pixel rate of approximately 12 million pixels per second. In this time frame, the late 1970's to the late 1980's, CRT technology was still advancing in resolution. The next resolution goal was to display images of on the order of one million pixels. At this point, there were no strong high resolution standards, so many different video signal formats were being sold. A 1024 pixels wide by 1024 pixels tall, refreshed 30 times a second using interlaced video signal format is one good example. This video signal format requires a video format pixel rate of approximately 40 million pixels per second. But most people who used these devices did not like viewing interlaced video signal formats, and thus most new video signal formats had to use non-interlaced video signal formats (nowadays call progressive formats) even though this meant that the video format pixel rate had to be double or more for a given video resolution than it would be if interlaced video signal formats had been used. Furthermore, older electronics had the limitation that the video format frame rates had to be directly related to the 60 Hz AC frequency used for power in the United States (50 Hz in Europe and some other parts of the world). Now the people who used frame buffers wanted video format frame rates of at least 66 Hz, and eventually European labor agreements required refresh rates of 72 Hz, 76 Hz, and now in some cases 84 Hz. What did all this imply for the video format pixel rate that the frame buffers must support? One common video signal format at the time was 1152 pixels wide by 900 pixels tall, refreshed 66 times per second. This video signal format requires a video format pixel rate of approximately 84 million pixels per second. Another common video signal format at the time was 1280 pixels wide by 1024 pixels tall, refreshed 76 times per second. This video signal format requires a video format pixel rate of approximately 135 million pixels per second.

3DRAM

3DRAM places two levels of SRAM caches on the VRAM, changed from the traditional asynchronous interface to a pipelined, clocked, synchronous one, went to a 32-bit wide and moved the Z-buffer compare onto the VRAM. Today's DRAM, SDRAM, is very similar to 3DRAM: it uses synchronous, pipelined, clocked interfaces, and a small SRAM cache on chip. 3DRAM differed in having a (small die area) video output port, and special alu operations for Z-buffering and frame buffer OPs.

3DRAM did make a big change in achievable performance.

B. Several Embodiments

This document describes the technology of a new scalable architecture for low cost, very high performance, real-time 3d graphics products. While highly technical, the information is presented at a relatively high level, so that, for example, individual details of bit-field names and sizes are not given.

A new product concept, a GraphicsSlab, is introduced as a solution to non-low end 3d graphics requirements of present and future general purpose computer products. A GraphicsSlab is a self contained sub-system that uses industry standard I/O interfaces to connect to one or more host computers. The physical packaging of a GraphicsSlab would typically be in a rack-mountable chassis, with a height in the small multiple of U, say 2 U, for example. This document describes a new 3d graphics hardware architecture, called the Loop architecture, that is highly suited for building GraphicsSlab products. The Loop architecture presents a totally novel solution to the way in which multiple graphics ICs are connected together to form high end 3d rendering systems. The approach taken by the Loop architecture is an elegant solution to the set of technical constraints ("realities") presented by current and projected several-year future trends in IC design, IC packaging, IC interconnect, and commodity DRAM technologies, as well as the specialized requirements of the high end 3d graphics applications and users.

Starting with some background information on both 3d graphics architecture and memory technology, the Loop architecture itself will be described as series of solutions to the main technical problems of building high performance 3d graphics hardware accelerator products.

Development of the New Architecture

When you're buying DRAM, you're buying bits of storage. But you are also buying bandwidth. The time it will take to read or write bits from a DRAM will vary somewhat depending on the access pattern, but a best-case upper limit exists.

When you build an ASIC, and you attach some of the pins of the ASIC to the pins of a single DRAM chip, you have defined an upper bandwidth limit to that DRAM.

But what if you attach two DRAM chips to a single ASIC? Is the upper bound on memory bandwidth available to that ASIC from its attached memory chips doubled? The answer is that it depends, as there are three different useful techniques to attach two DRAMs to one ASIC.

The first technique is for the ASIC to use all new pins to attach the second DRAM chip, e.g., none of the pins of either DRAM are attached to the same pin of the ASIC. This way indeed doubles the upper bandwidth that the ASIC can get to the attached DRAM chips. The downside is that the ASIC had to double the number of pins it uses to talk to DRAMs.

The second technique is for the ASIC to use only one set of pins to talk to the address and control pins of both DRAMs, while the ASIC uses existing pins to talk to the data pins of the first DRAM and adds new pins to talk to the data pins of the second DRAM. This method uses fewer pins on the ASIC than the first technique, and the maximum bandwidth is still doubled. However, the word size of the local memory sub-system comprised of the two DRAM chips is double that of the first technique. If the ASIC doesn't need to use all the bits in this wider word when sending and receiving data from the DRAM chips, the effective bandwidth goes down.

The third technique is for the ASIC to share all pins (other than the DRAM "chip enable" pin) with both DRAMs. This technique minimizes the number of pins that the ASIC uses to talk to the DRAM chips, but the upper bandwidth that the ASIC can get to the attached DRAM chips does not go up at all; it stays the same as it was for the single attached DRAM case.

These three techniques form three different points along a trade-off curve between maximizing available bandwidth and minimizing the number of pins that must be added to the ASIC. But what if we were to attach four DRAMs to an ASIC? Eight DRAMs? Sixteen DRAMs? The answer is that different combinations of the three techniques described above can be simultaneously utilized in more complex ways when more than two DRAM chips are being attached. Clearly at some point any ASIC is going to run out of new pins that can be economically added to a single chip. In most applications, a limit exists after which wider and wider word widths have less and less usable bits, and thus the usable bandwidth does not increase as fast as the word width. There are also limits on how many pins can be wired together without having to slow down the speed of memory reads and writes. There is no one correct choice for this problem; the choice is part of a larger set of trade-offs in the over system design of the larger system that the ASIC and the DRAM are a part of.

Again, at any given point in time, there are limits on the number of pins that can an ASIC can economically have. These limits are imposed both by the then current packaging technology, and also by the amount of the ASIC chip area that can be devoted to pin connection sites. Thus, after subtracting out some pins for use other than attaching to DRAM, at a given point in time packaging and DRAM technology constrain the maximum amount of bandwidth available to a single ASIC to talk to DRAM.

While there is always some room for cleverness, there is typically a nearly linear relationship between the performance of algorithms (e.g., 3d rendering algorithms) and the available usable bandwidth to memory store. Thus, if you define a product as a single ASIC with some number of attached DRAM, there is hard envelope around the maximum rendering performance achievable.

The novel Loop architecture in accordance with one embodiment of the present invention arranges both the texture storage and the frame buffer storage in the same memory bank. In this embodiment, each LoopDraw chip has a number of attached standard low cost DRAM chips, that are used to store both a portion of the frame buffer as well as a complete (redundant but local) copy of the current textures.

Overview

FIG. 1 shows an example of the Loop architecture. In the Loop architecture, as seen in FIG. 1, each Loop chip is attached in a unidirectional, point-to-point, local manner to the adjacent Loop chip via a very high speed LoopLink interface 125.

Basic Loop Architecture Interconnect.

The Loop chip marked 'D' are LoopDraw chips 110. The boxes marked 'M' are memories, 115 e.g., memory chips. These memories in one embodiment are DRAMs, but may be other forms of memory chips in other embodiments (explicitly including SRAMs). The chip marked 'I' with arrows pointing in and out is a LoopInterface chip 105. LoopInterface chip 105 preferably includes a Host Interface In/Out and a Loop Interface In/Out. The topology shown enables a 3d graphics rendering architecture. The Loop architecture is described in more detail below.

Figure 2:
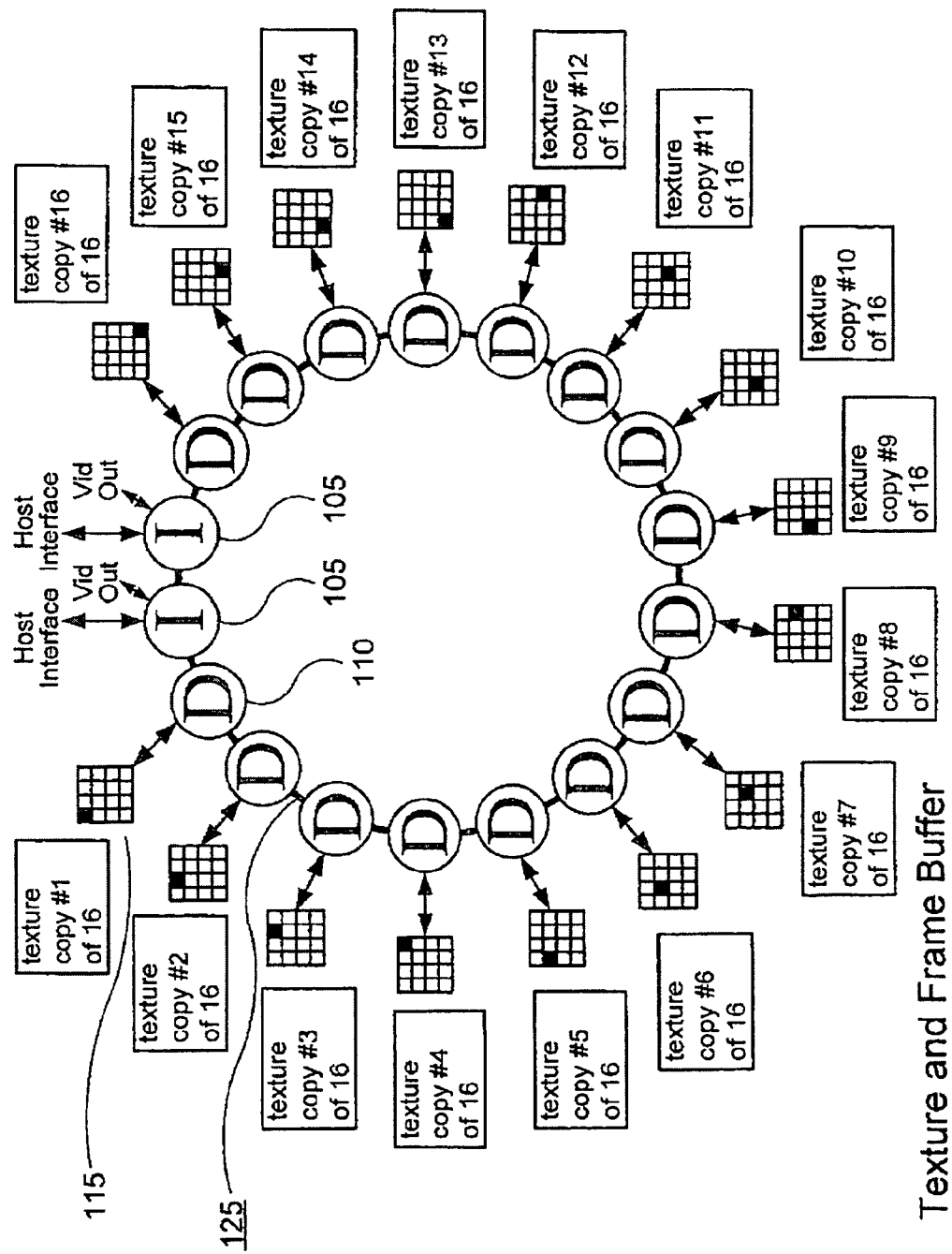
FIG. 2 shows detail of an embodiment of a Loop architecture, including a configuration containing LoopDraw chips and multiple LoopInterface chips.

FIG. 2 shows more detail of a sixteen LoopDraw 110 chip and two LoopInterface chip 105 configuration. Each Loop- Draw chip 110 contains 1/16th of the frame buffer in its locally attached DRAM 115. The frame buffer is partitioned by a regular 4 by 4 pixel grid, with each LoopDraw chip performing its operations to its assigned pixel within the 4×4 grid. In the diagram, the filled in pixel in the 4×4 pattern indicates which pixel interleave belongs to which LoopDraw chip. Also shown in FIG. 2 is that each LoopDraw chip has is own dedicated complete copy of all system textures within its local DRAM. Two LoopInterface chips are shown to support system options that will be described later.

To summarize the overview of FIGS. 1 and 2, the frame buffer is partitioned out into non-redundant pixel interleaves in the local memory sub-system of each of n LoopDraw chips so as to maximize the sample fill rate, providing on the order of n times higher sample fill rate than what is achievable on a single graphics chip system. The texture store is replicated in the local memory sub-system of each of n LoopDraw chips so as to maximize the texture fetch bandwidth: on the order of n times more read bandwidth than what is achievable on a single graphics chip system.

Mapping of Graphics Operations to the Chips.

Host graphics driver commands to LoopInterface chip graphics driver primitives come in from the host computer via the host interface on the LoopInterface chip. After processing the graphics driver primitive, the LoopInterface chip will transform them (among other GraphicsCommands) into a sequence of GraphicsPrimitives. The LoopInterface chip assigns some substring of this sequence of GraphicsPrimitives to a particular LoopDraw chip, then sends the GraphicsPrimitive out as a Loop packet along the ring, where GraphicsPrimitive Loop packet hops from Loop chip to Loop chip until it arrives at its destination LoopDraw chip. There, the Loop packet is processed and not sent any further along the ring. State changes are sent along the ring as multicast Loop packets, e.g., the Loop packet will be processed by (potentially) every LoopDraw chip in the ring, and forwarded by (potentially) all but the last LoopDraw chip. In a preferred embodiment, the LoopInterface chip assigns GraphicsPrimitive command to a particular LoopDraw chip (also called a "graphics chip") using a load balancing method. Other embodiments use other appropriate methods, such round robin.

Path of Unicast GraphicsCommand Loop Packet from a LoopInterface Chip to each Possible Destination LoopDraw Chip.

Figure 3:
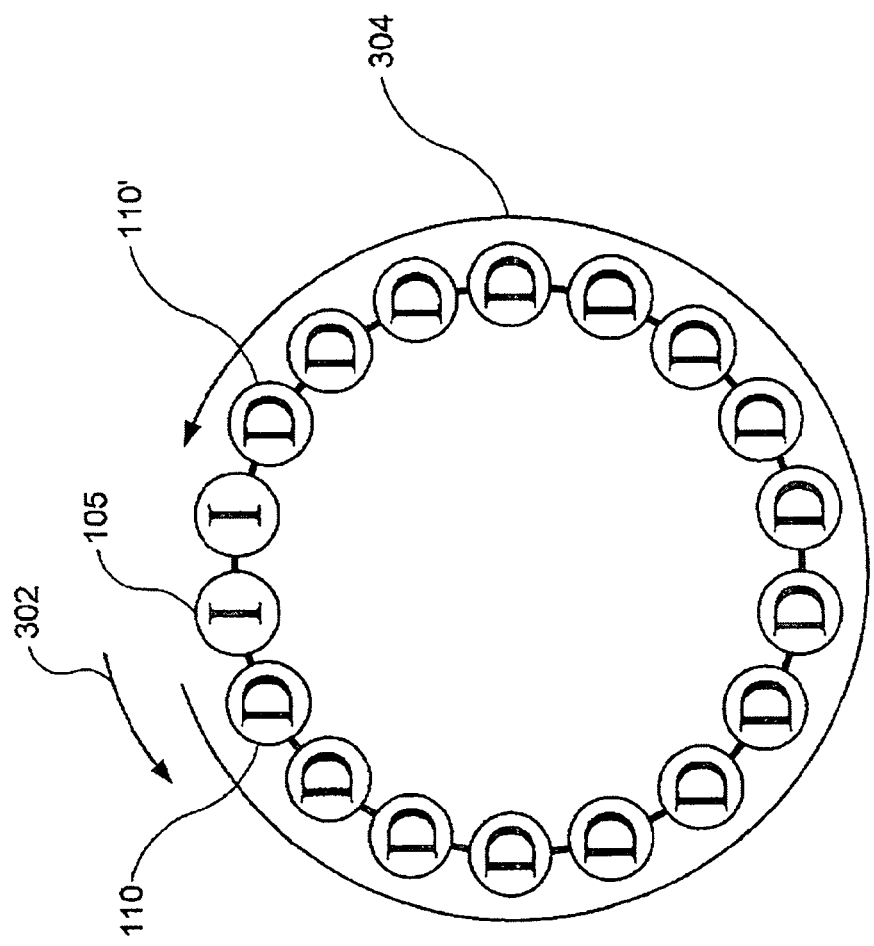
FIG. 3 shows a longest and shortest path of unicast GraphicsCommand from a LoopInterface chip to possible destination LoopDraw chips.

FIG. 3 shows a longest and shortest path of unicast GraphicsCommand loop packets from a LoopInterface chip to possible destination LoopDraw chips. The circular arc 302 represents a virtual "direct path" from the LoopInterface chip 105 to its closest LoopDraw chip 110 that unicast GraphicsCommand Loop packets follow. The circular arc 304 represents a virtual "direct path" from the LoopInterface chip 105 to its farthest LoopDraw chip 110' that unicast GraphicsCommand Loop packets follow. The actual path preferably involves multiple hops starting from the LoopInterface chip and continuing counter-clockwise through as many of the LoopDraw chip as necessary until the destination LoopDraw chip is reached. The paths between LoopInterface chip 105 and the other LoopDraw chips are not shown for the sake of clarity.

Note—in general, in the Loop architecture, the unidirectional flow of data around the ring is arbitrarily chosen to always be shown as flowing in the counter-clockwise direction. There is nothing special about this choice. In other embodiments, the direction of flow could be clockwise instead. Indeed later some embodiments will be shown that contain both clockwise and counter-clockwise flow in a double ring.

If a multicast GraphicsCommand Loop packet is sent, it would follow the path of the longest unicast Loop packet, e.g., the Loop packet leaves the LoopInterface chip, enters and is processed by the first LoopDraw chip, 110 and is also passed on to the next LoopDraw chip, until the last DrawLoop chip 110' in the ring is reached. (Unicast and multicast Loop packets and their control and routing will be cover in more detail below.)

LoopDraw Chip Processing of a GraphicsCommand Packet

When a graphics primitive, say a triangle, reaches its assigned LoopDraw chip, the LoopDraw chip applies most of the 3d graphics rendering pipeline to it. For example, the triangle preferably is transformed, clip checked, optionally clipped if needed, vertex shaded, scan converted (rasterized), then each generated pixel is subject to a programmable pixel shader that usually includes texturing and lighting.

The screen space boundaries of the projected triangle are multicast transmitted to all the LoopDraw chips, along with the plane equation of Z. The individual pixels generated by the pixel shader process are then made into DrawPixel Loop packets and sent out over the LoopLink, with an assigned destination LoopDraw chip. Note the special case in which the destination LoopDraw chip is the one rasterizing the primitive. In this case the Loop packet is consumed locally, and never goes out over the LoopLink.

Path of a DrawPixel Loop Packet from a LoopDraw Chip to each Possible Destination LoopDraw Chip.

Figure 4:
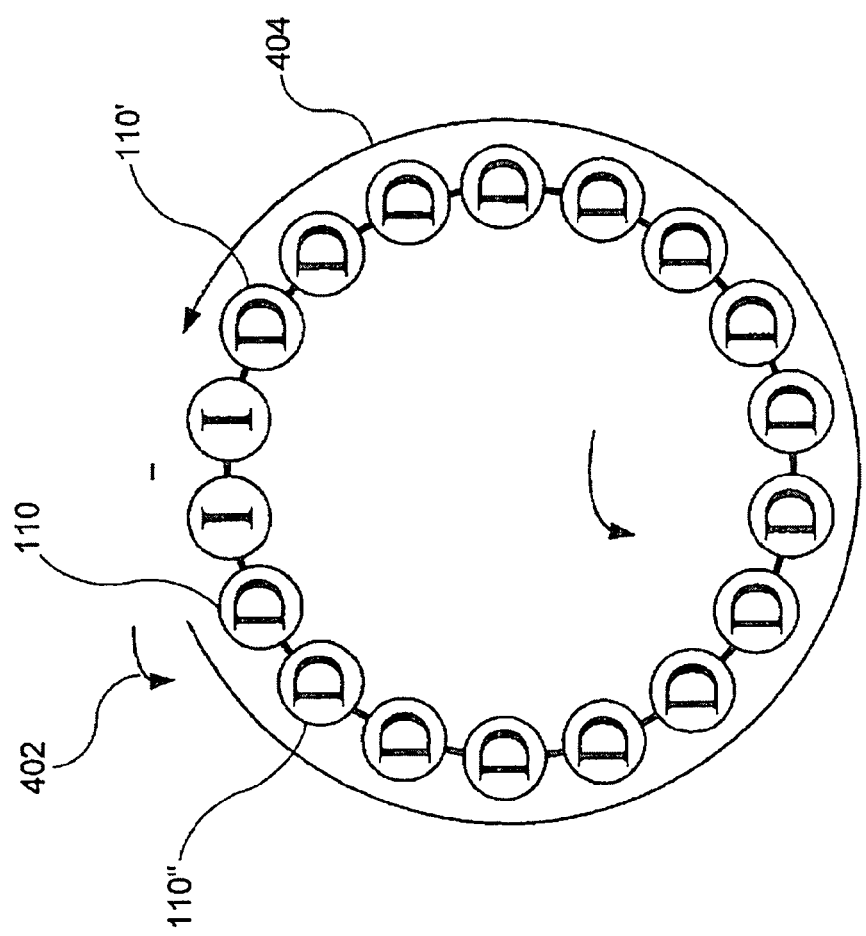
FIG. 4 shows a longest and shortest path of a DrawPixel Loop packet from a LoopDraw chip to possible destination LoopDraw chips.

FIG. 4 shows a longest and shortest path of from a first LoopDraw chip to each of the rest of the LoopDraw chips that DrawPixel loop packets follow. The circular arc 402 represents a virtual "direct path" from the LoopDraw chip 110 to its closest LoopDraw chip 110 that DrawPixel Loop packets follow. The circular arc 404 represents a virtual "direct path" from the LoopDraw chip 110 to its farthest LoopDraw chip 110 that DrawPixel Loop packets follow. The actual path preferably involves multiple hops starting from the first LoopDraw chip and continuing through as many of the rest of the LoopDraw chip as necessary until the destination LoopDraw chip is reached. The paths between LoopDraw chip 110 and the other LoopDraw chips are not shown for the sake of clarity. It is important to note that on average the number of chip hops that a DrawPixel Loop packet has to take is half the total length of the ring. A similar figure could be drawn for the other 15 LoopDraw chips; their paths would look the same, only rotated counter clockwise by one successive LoopDraw chip each, and would all included two hops through the two LoopInterface chips along the way.

LoopDraw Chip Processing of a DrawPixel Packet

Each LoopDraw chip's attached memory contains all the samples for 1/n of the pixels of the frame buffer, where n is the total number of LoopDraw chips in the system (n typically 16). This is a traditional 2d interleave of frame buffer storage. This is how a particular rasterized pixel is assigned a LoopDraw chip destination. Interleaving could also occur at the multi-pixel level if appropriate.

When the DrawPixel Loop packet reaches its destination LoopDraw chip, all the samples within that pixel that are also within the boundaries of the current GraphicsPrimitive (in our example a triangle, the boundary was multicast earlier) are subject to possible interpolation computations to determine their value at a particular sample location, and then subject to the conditional sample update function. The interpolation may or may not be performed on a sample component by sample component basis. For example, in one embodiment interpolated values of the Z sample component value may be computed by applying a previously multicast plane equation of Z. In one embodiment, the color sample component values are not interpolated at all, e.g., they are flat-filled within a pixel or a portion of a pixel. The conditional sample update function is controlled both by existing on-chip state values, as well as possibly additional control bits within the DrawPixel command, such as enabling or disabling the Z buffer check and other checks.

Generation of Video Output Signals

Generation of streams of data that will generate the video output signal are originated by a LoopInterface chip. A LoopInterface chip sends a VideoPixel Loop packet to the first LoopDraw chip connected to it, which then accesses the samples in its interleaves of the frame buffer that contribute to the first video output pixel, and sends this partial sum on to the next LoopDraw chip. Each LoopDraw adds its contribution, and when all have contributed, the video output signal leaves a (possibly different) LoopInterface chip out of its video output signal pins. In one embodiment, multiple video output signals are supported by adding additional instances of LoopInterface chips to the ring. full screen antialiasing is achieved by applying high quality antialiasing filters to areas significantly larger than one pixel area of samples during the process of generating the video output signal. Specifically, nearly arbitrary 4×4 antialiasing filters (such as the Mitchell-Netravali filter family) can be supported at full video output signal video format pixel rates.

Path of VideoPixel Loop Packet from a LoopInterface Chip Through all the LoopDraw Chips, and Back to the Original LoopInterface Chip.

Figure 5:
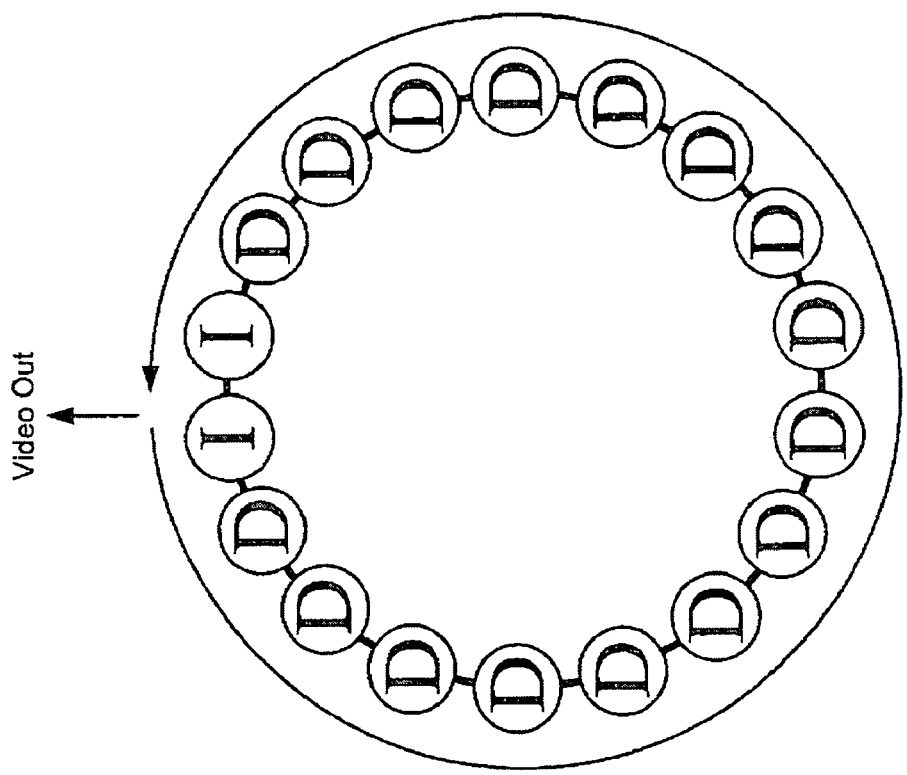
FIG. 5 shows the path that all the VideoPixel Loop packets from a particular LoopInterface chip take for antialiasing and generation of a video output signal to a video output interface.

FIG. 5 shows the path that all the VideoPixel Loop packets from a particular LoopInterface chip take for antialiasing and generation of a video output signal to a video output interface. While in this diagram the same LoopInterface chip both starts and finishes the generation of the video stream, in at least one embodiment the starting and finishing LoopInterface chips do not have to be the same physical chip.

Generation of Texture from Rendering to the Multiple Texture Memory Copies

Generation of textures are handled similarly to how video output signals are generated, but rather than leaving the ring when complete, the pixel stream continues around the ring a second time to be deposited locally in each of the (enabled) LoopDraw chips. Normally when this is going on, there are no new GraphicsCommand Loop packets flowing through the ring, so the bandwidth that would had been taken up by GraphicsCommand Loop packets and DrawPixel Loop packets is free and available for the texture loading. The VideoPixel Loop packets also flow, and take priority.

Read-Back of Rendered Results by the Host Computer

Read-back of rendered results proceeds similar to a read-back for generating a video output signal, except that when the completely assembled pixel stream reaches the destination LoopInterface chip, the results go out its host interface rather than (one of) its video output interface pins. (Also, some of the real-time constraints of ensuring that the video output signal is fed with any stoppage to physical image display devices can usually be relaxed some when transferring to the host interface.)

Transfer of Textures from the Host Computer to the LoopDraw Chip Copies

Textures from the host computer enter the ring via the LoopInterface chip, and then get passed around the ring for each LoopDraw chip to pull a copy into the local DRAM store. Just as with local texture generation, when texture downloads are in progress, drawing is usually not also in progress, and thus the bandwidth available for texture transfer is not just the normal bandwidth allocated to GraphicsCommands, but also the considerable bandwidth normally allocated for drawing. Indeed the texture transfer shares the ring bandwidth with the ring traffic that is generating the video output signal.

Advantages of the Architecture

This section describes the several advantages of the Loop architecture.

Two Chip Types

While the Loop architecture supports high end to very high end 3d graphics products, in one embodiment the Loop architecture requires only two different custom chips to be designed and fabricated to produce products, with most of the complexity in the drawing chip. This is in stark contrast to the much larger number of custom chips types needed when using conventional methods to design products for the high end to very high end 3d graphics market.

All Unidirectional, Short, Local Communication

Unlike other high-end architectures, the Loop architecture can be implemented without global busses or long wires. This is because all internal system communication is point to point, unidirectional, and over a short physical distance using the LoopLink.

Massive Parallel Processing Available for Shaders

The more complex, powerful, and (hopefully) realistic a programmable shader gets, the more program steps and texture fetches are needed to execute programmable shaders. With single chip-based 3d graphics hardware accelerators, or indeed any 3d graphics hardware accelerator based on a fixed number of chips past a given point of complexity, the more powerful a programmable shader gets, the slower the overall graphics hardware rendering system will get. By contrast, because of the unique way that the Loop architecture is designed to scale, so long as more LoopDraw chips are added, the programmable shader power can grow by the same proportion without any reduction in performance. Because a single LoopDraw chip will likely be at least comparable in programmable shader power to the 3d graphics rendering power of any contemporary single chip based 3d graphics hardware accelerator, the power of Loop architecture based systems using 16, 32 or 64 or more LoopDraw chips will literally be one to two orders of magnitude more powerful than these contemporary single chip based 3d graphics hardware accelerator.

Multiple Options for Host Computer Interconnect

The Loop architecture has been designed so that anywhere a single LoopInterface chip can be positioned in a (single) ring, two, three, four or more LoopInterface chips can instead put into the same position in the same (single) ring. Since each LoopInterface chip has it own dedicated host interface, it is easy to build even single ring Loop architecture based 3d graphics hardware accelerators that can connect to multiple host computers. The advantage that this ability gives to Loop architecture based 3d graphics hardware accelerators is best illustrated by an example. Consider a scientific computing end user of 3d graphics hardware accelerators that has several very powerful computer systems. The more powerful a particular computer system that they have is, the more useful it is to have 3d graphics resources directly connected to that computer. But the most powerful computers tend to frequently get assigned to perform large batch jobs for a single project that can run for hours to days at a time. Not all of these large jobs will need interactive 3d graphics; indeed many such jobs use interactive 3d graphics to examine the results of the large computation after it is finished. If a very high end 3d graphics hardware accelerator could only be physically attached to a single computer at a time, the 3d graphics hardware accelerator would be unavailable for any use while any large non 3d graphics using jobs were being run. But by the ability of the Loop architecture based 3d graphics products to physically attach to two or more computers at a time, even if only one computer at a time may use the 3d graphics hardware accelerator, the 3d graphics hardware accelerator can be fully used even if a computer has been preempted for other tasks (or down for maintenance, etc.).

Another way to use multiple LoopInterface chips is to connect together several different rings into a single large 3d graphics hardware accelerator, and share one (or more) host interface(s). This allows very large scale 3d graphics support systems to be built, including those that may support up to a dozen or more high resolution physical image display device at the same time. (A good fit is to have as many separate but connected rings as you have separate high resolution physical image display devices.) Such large scale systems are actually a common requirement of high end immersive projection based virtual reality display systems (Caves™ and Virtual Portals™).

Support of High Quality Supersampling Based Algorithms

Several high quality features are supportable by a 3d graphics hardware accelerator when that system can support a large number of samples per pixel. First and foremost is the support of high quality antialiasing filters. Because of the way that the video output signal is assembled along the ring, for a little extra bandwidth and internal processing, large area antialiasing filters can be applied at video output signal video format pixel rates. The feature of dynamic video resizing drops naturally out of this sort of video architecture. If the resampling raster pixel center positions are not a simple rectangular raster array, but rather are points along a locally controlled spline curve, then various video image correction operations drop out. If the red, green, and blue pixels are resampled using different splines, then even chromatic aberration distortions can be corrected for in the proper pre pass-band space. Other effects supportable by high sample densities include various forms of blur (motion blur, depth of filed), special dissolves, etc.

Multiple Differentiated Products Possible with the Same Two Chips

By intention, the design of the two base chip Loop architecture types, the LoopInterface chip and the LoopDraw chips, allows completely functional 3d graphics hardware accelerators to be built using different numbers of these chips. E.g., different size commercial products can be assembled with the two chips "as is" with no "redesign" of either chip needed. Only different PC board design(s) are required to produce differentiated products. This ability to rapidly and inexpensively commercialize products with differentiated cost and features is an important asset in today's rapidly changing markets. Conventional methods for designing 3d graphics hardware accelerators usually require changes to the main chips themselves (at great expense in engineering and time to market) for similar market flexibility.

Even with a single 1 U or 2 U rackmount packaged product, the ability to attach multiple GraphicsSlabs together with external cables allows for many custom configurations may be supported with no change in the base hardware product.

Supports Very Large Amounts of Texture Memory

By attaching large numbers of DRAM to each LoopDraw chip, and/or assigning different areas of the texture to each LoopDraw chip (reasonable to do for volume textures), larger internal to system texture maps can be easily supported.

Certain terms used in the above discussion of the embodiments of the present invention will be explained in context below.

Graphics Driver Command

As described in the definition of the term graphics driver, application software is rarely directly connected a graphics hardware accelerator. Usually an additional piece of host computer software, a graphics driver, that implements one or more computer graphics rendering APIs, is interposed between the application software and the graphics hardware accelerator. The application software makes software subroutine calls that adhere to the software interface standard (e.g., language bindings) as described by the computer graphics rendering API, to the graphics driver software. The graphics driver software treats each of these subroutine calls to it along with any data directly or indirectly associated with the subroutine call as a command to perform some rendering or other computer graphics related task. The graphics driver software then may translate the implied task into a form that the graphics hardware accelerator can understand. This is not to say that the graphics driver software must examine every byte of data sent by the application software. Some application software calls may include one or more pointers to data areas dozens to millions of bytes or more in size; the graphics driver software may just pass these pointers on to the graphics hardware accelerator. This is quite common for graphics hardware accelerators that can do direct memory access (dma) of data that is in the main memory of the host computer.

The term graphics driver command refers to the set of all messages created by the graphics driver software as it translates a computer graphics rendering API call into a message that the graphics hardware accelerator can understand.

The graphics driver command set of messages is sub-divided into two non-overlapping subsets of messages: graphics driver state and graphics driver primitive.

Note: The three terms graphics driver command, graphics driver state, and graphics driver primitive all refer to sets of messages or packets. When referring to an un-named message from one of these sets, mathematically the phrasing should be "a message from the graphics driver command message set", but by convention the clearer "a graphics driver command message" is used to mean the same thing.

Graphics Driver State

The term graphics driver state refers to the subset of graphics driver command messages whose member messages change or modify rendering state, but do not themselves specify geometric graphics primitives or directly cause any additional rendering at this time. Examples of graphics driver state messages in some embodiments are those to set the current color, or set one of the current transformation matrices, or change aspects of the current antialiasing filter(s).

Graphics Driver Primitive

The term graphics driver primitive refers to the subset of graphics driver command messages whose member messages specify geometric graphics primitives and/or directly cause any additional rendering at this time. Examples of graphics driver primitive messages in some embodiments are those that specify all three vertices that define a triangle to be rendered, specify the two vertices that define a line to be rendered, or specify the single vertex that defines a dot to be rendered.

Loop

The term Loop refers to the graphics hardware accelerator architecture that is the subject of this invention. Many times the phrase "in the Loop architecture" or similar phrases will be used to denote this context. (Note that the current invention in its more complex topologies goes beyond the topology of a simple ring structure, but the term Loop is intended to include these topologies as well.)

Loop Chip

The term Loop chip refers to any custom chip types designed as part of the implementation of the Loop architecture. In one embodiment, there are two Loop chip types: the LoopInterface chip and the LoopDraw chip. Other embodiments could define additional and/or different custom chip types. One alternate embodiment explicitly defines only a single chip type that combines into a single chip much of the functionality of the two chips defined in the two chip type embodiment.

LoopLink

LoopLinkInputPort

LoopLinkOutputPort

The term LoopLink refers to a special unidirectional high speed Loop chip to Loop chip data interconnect. In one embodiment the LoopLink is supported by two special sets of standardized IC pad drivers and packaging multi-pin interfaces: the LoopLinkInputPort and the LoopLinkOutputPort.

The LoopLink is used to transfer packets of data from one Loop chip to another Loop chip. In one embodiment, the data transferred over the LoopLink should by protected by error correcting codes (ECC) embedded in the transmission.

If a Loop chip type is to be able to be connected into one of the formal ring structures defined by the Loop architecture then that chip type supports at least two such ports: a counter-clockwise LoopLinkOutputPort and a clockwise LoopLinkInputPort.

A given Loop chip may not always be in a state where it can accept an additional Loop packet transmitted to it over its LoopLinkInputPort. Thus, part of the LoopLink sub-system should include handshake signals where a first Loop chip that has a Loop packet that it wishes to send out over its LoopLinkOutputPort to the LoopLinkInputPort of a second Loop chip can known ahead of time if the second Loop chip is or is not in a state where it is ready to receive a new Loop packet over its LoopLinkInputPort.

In one embodiment, the handshake protocol gates the transmission of a Loop packet traversing the LoopLink regardless of Loop packet type. In another embodiment, Loop packet types may be broken into several different sub-groups of Loop packet types, and the handshake protocol would indicate separately for each of these sub-groups if a Loop packet with a type that is the member of a specific sub-group of Loop packet types would be allowed to traverse the LoopLink.

LoopInterface

In one embodiment of the invention the LoopInterface chip is a Loop chip with at least one host interface for connecting to a host computer, and at least one counter-clockwise LoopLinkOutputPort and one clockwise LoopLinkInputPort. In some embodiments, the LoopInterface chip also has at least one video output interface.

Using these conventions, in a simple ring most all data would flow counter-clockwise around the circle of Loop chips. The specified direction of flow is only a convention; different embodiment can chose different conventions. Not all embodiments contain both a clockwise and counterclockwise LoopLinkInput Port.

On the host computer, graphics drivers generate graphics driver commands which are sent over the host interface to a LoopInterface chip. Upon arrival, the LoopInterface chip processes these graphics driver commands, in many cases generating a number of Loop architecture internal messages to be sent out from the LoopInterface chip through its various other interfaces to other Loop chips.

In one embodiment, the LoopInterface chip also contains at least one programmable video signal format timing generator, which can send a series of VideoPixel messages out through its LoopLinkOutputPort around the ring that this LoopLinkOutputPort connects to. In the same embodiment, a second stage of this timing generator can accept in through the LoopLinkInputPort a stream of VideoPixel messages that have passed through a ring. After normalization by the reciprocal of the summed filter energy, and possibly post processing of the pixel data (programmable gamma correction, additional video timing considerations, etc.) this second stage would then send the (possibly post-processed) pixel data out of the LoopInterface as a video output signal out through its video output interface to be connected to a physical image display device.

In at least one embodiment, there is no restriction that the stream of VideoPixel messages has to both originate and terminate at the same LoopInterface chip.

LoopDraw

In one embodiment of the invention the LoopDraw chip is a Loop chip with a local memory sub-system attached to it, and at least one counter-clockwise LoopLinkOutputPort and one clockwise LoopLinkInputPort. In one embodiment, this local memory sub-system is composed of DRAM chips, although any suitable memory may be used.

This local memory sub-system can be configured to store more than one of several possible data types. One possible type is frame buffer pixel and/or frame buffer sample storage for a sub-portion of the entire frame buffer. Another possible type is storage of a complete replicated copy of all the currently active texture memory. Another possible type is storage of a partial, potentially replicated, copy of all the currently active texture memory. Another possible type is storage of a complete or partial copy of currently un-active texture memory. Another possible type is storage of a complete or partial possibly replicated copy of all the currently active display lists.

In a particular embodiment, the LoopDraw chip has three computational responsibilities. The first computational responsibility is that it accepts and internally process any GraphicsCommand Loop packets that come in its LoopLinkInputPort that identify this particular LoopDraw chip as one of the destinations of the GraphicsCommand Loop packet. This processing may cause both accesses to the local memory sub-system, as well as potentially cause this LoopDraw chip to create and send additional new Loop packets out its LoopLinkOutputPort. These new Loop packets can include DrawPixel Loop packets.

The second computational responsibility is that it accepts and internally processes DrawPixel Loop packets that come in its LoopLinkInputPort that identify this particular LoopDraw chip as one of the destinations of the DrawPixel Loop packet. This processing may cause accesses to the local memory sub-system.

The third computational responsibility is that it accepts and internally processes VideoPixel Loop packets that come in its LoopLinkInputPort that identify this particular LoopDraw chip as one of the destinations of the VideoPixel Loop packet. Information within a VideoPixel Loop packet and internal LoopDraw chip state define a filter center point at which the currently defined antialiasing filter is to be applied. Any antialiasing filter has an active area relative to any given filter center point. A specific LoopDraw chip owns and contains in its local memory sub-system a subset of the samples that make up the frame buffer. Define the set of samples that are both within the antialiasing filter active area for the current filter center point and also are owned by a specific LoopDraw chip as the contributing set. When a LoopDraw chip must process a VideoPixel Loop packet, this means that the antialiasing filter is applied to the contributing set to generate a partial convolution result. Specifically, this processing may cause the following computation to take place: 1) Based on the specific filter center point, convert this into sample addresses upon which can be performed read accesses of the local memory sub-system to obtain specific sample components, 2) Generation of convolution coefficients associated with both the current filter center point, and the sample locations of the samples identified by the sample addresses generated in step 1, 3) Convolution of sample components read from the local memory sub-system by the coefficients generated in step 2, 4) Partial summation of the results of the convolution with the partial results already contained in the VideoPixel Loop packet, and 5) Sending to the LoopDraw chips LoopLinkOutputPort the VideoPixel Loop packet with the partial results value replaced with the one computed in step 4. Note that the partial results could be all zero in some cases, usually if the current LoopDraw chip is the first LoopDraw chip to process the VideoPixel Loop packet.

A LoopDraw chip may also from time to time spontaneously generate and send out its LoopLinkOutputPort FifoStatus Loop packets, based on any of a number of factors, possibly including but not limited to: the amount of free storage remaining in its various internal queues, local parameter values set by previous GraphicsState Loop packets, and how much time has passed since the last time this LoopDraw chip has sent out a FifoStatus Loop packet. In a particular embodiment, the local parameter values include some appropriate measure of the circumference of the local ring that this particular LoopDraw chip is a part of. Note that this measure can be complex when non-local LoopLink connections are included in the ring topology.

Packet

Loop Packet

In the Loop architecture, a Loop packet or just a packet is a variable length collection of bits that is sent by a first Loop chip over a LoopLink to a second Loop chip as an atomic object (e.g., sent all at once, usually all sent before any data from a following packet is sent.) The first Loop chip either has recently created a Loop packet, or recently determined that a Loop packet that arrived from somewhere else needs to be sent out. The first Loop chip will then send the Loop packet out over its LoopLinkOutputPort to the LoopLinkInputPort of the second Loop chip. The second Loop chip is the next counter-clockwise Loop chip in the local ring from the first Loop chip. In one embodiment of the invention, the LoopInterface chip may instead send a Loop packet out to any of its several non-local output LoopLinks to any one of another LoopInterface chip's non-local input LoopLinks.

Packet Header

Packet Payload

The data within a Loop packet is divided into two groups. The first group is packet header, which in one embodiment may include such information as packet length, destination information, and type. The second group is packet payload, which in one embodiment may include such information as a geometric object to be drawn, or a pixel to be sampled, or a video output pixel to complete assembly.

GraphicsCommand

The term GraphicsCommand refers to the set of all Loop packets whose type of Loop packet may be created by a LoopInterface chip as a direct or indirect result of processing graphics driver command messages from the host computer.

The GraphicsCommand set of Loop packets is sub-divided into two non-overlapping subsets of Loop packets: GraphicsState and GraphicsPrimitive.

Note: The three terms GraphicsCommand, GraphicsState, and GraphicsPrimitive all refer to sets of Loop packets. When referring to a un-named Loop packet from one of these sets, mathematically the phrasing should be "a Loop packet from the GraphicsCommand Loop packet set", but by convention the clearer "a GraphicsCommand Loop packet" is used to mean the same thing.

Note: there is a superficial resemblance between the sets of possible messages sent by the host computer software to the graphics hardware accelerator: the graphics driver command, graphics driver state, and graphics driver primitive messages, and the sets of possible Loop packets created by a LoopInterface chip: the GraphicsCommand, GraphicsState, and GraphicsPrimitive Loop packets. While there could be considerable semantically similarly in a particular embodiment, this is not required. Indeed, in many embodiments the single host computer graphics driver software sends a single graphics driver primitive message that would in turn cause a LoopInterface chip not just to generate one or more GraphicsPrimitive Loop packets, but also generate a number of GraphicsState Loop packets potentially both before and after the GraphicsPrimitive Loop packet is generated.

For completeness, in one embodiment the LoopInterface chip also generates VideoPixel Loop packets, so these Loop packets formally are also members of the GraphicsCommand set of Loop packets.

GraphicsState

The term GraphicsState refers to the subset of GraphicsCommand Loop packets whose member Loop packets change or modify rendering state, but do not themselves specify geometric graphics primitives or directly cause any additional rendering at this time. Examples of GraphicsState Loop packets in some embodiments are those to set the current color, or set one of the current transformation matrices, or change aspects of the current antialiasing filters.

GraphicsPrimitive

The term GraphicsPrimitive refers to the subset of GraphicsCommand Loop packets whose member Loop packets specify geometric graphics primitives and/or directly cause any additional rendering at this time. Examples of GraphicsPrimitive Loop packets in some embodiments are those that specify all three vertices that define a triangle to be rendered, or specify the two vertices that define a line to be rendered.

DrawPixel

A DrawPixel is a Loop architecture Loop packet that can be sent over the LoopLink to a number of other Loop chips. In one embodiment, LoopDraw chips are the only type of Loop chips that perform any processing on the contents of DrawPixel Loop packets, other types of Loop chips primarily process the routing and destination information in DrawPixel Loop packets, to determine if and how to pass the package on through any of or all of the LoopLinkOutputPorts that the chip may have. In one embodiment, the only Loop chips that can initially create DrawPixel Loop packets are LoopDraw chips. In one embodiment, DrawPixel Loop packets are created by a LoopDraw chip only as a direct result of processing GraphicsPrimitive Loop packets that have been received by the same LoopDraw chip.

The destination information in the Loop packet header of DrawPixel Loop packets specifies which LoopDraw chips are to process this DrawPixel Loop packet. In one embodiment, the destination information is specified by an integer x and y screen space pixel address, and the destination Loop chips are the one or more LoopDraw chips that contain some or all of samples within the specified pixel. In another embodiment, the destination information is a multi-pixel region of screen space. In yet another embodiment, the destination information is a sub-pixel region of screen space. In still another embodiment, the set of destination Loop chips are specified via a more general Loop chip sub-group labeling mechanism that is not directly encoded as x and y addresses.

DrawState

In one embodiment, LoopDraw chips maintain internal (on-chip) state data that will be used to carry out rendering tasks that are assigned to it. Some of this state is global, e.g., only one copy of the state is maintained per LoopDraw chip. Other state is local, with a different copy of state specific to each possible source LoopDraw chip that might send packets to this particular LoopDraw chip. Both classes of state are modified by the receipt of DrawState Loop packets.

When a LoopDraw chip has determined that it is one of the destinations of a particular DrawPixel Loop packet that it has received, and knows that it should perform some processing on the contents of the DrawPixel Loop packet, it does this processing in the context of the global and local state maintained by this particular LoopDraw chip. In some embodiments, at least one of these local data contexts is identified as the one that maintains state data received as DrawState Loop packets received from the same sender LoopDraw chip as the one that subsequently sent the DrawPixel Loop packet that now is processed.

This local state data context (of sending LoopDraw chip specific information) may include any information necessary to determine a candidate set of frame buffer sample addresses (and thus the associated sample location and samples) owned by this particular LoopDraw chip for which a corresponding set of sample components should be computed by this particular LoopDraw chip. These sample components will then be used as one of the inputs to a conditional sample update function on the sample address associated with the value. Which conditional sample update function will be applied may also be part of the local data context.

In one embodiment, the (sending LoopDraw chip specific) local state data context stored on a particular destination LoopDraw chip necessary to determine this candidate set of frame buffer sample addresses owned by this particular destination LoopDraw chip includes three screen space subpixel accurate point locations that form a triangular shaped region. The sample locations within the interior of this region are eligible to become members of the candidate set. Additional local state information may be present to distinguish the inside from the outside of this region, and to resolve tie cases for sample locations that lie exactly on any of the three edges of the triangle, as well as tie cases for sample locations that are exactly the same sample location as one of the three screen space subpixel accurate point locations that form the triangular shaped region. Variations of these sample set determining context data and rules also may be present for line segments, antialiased line segments, dots, antialiased dots, large dots, as well as geometric regions more complex than a triangle.

An alternate embodiment contains less information in the local state data context, and instead each DrawPixel Loop packet explicitly contains information that allows the candidate set of frame buffer sample addresses of all of the destination LoopDraw chips to be determined. In one embodiment, this information is a string of bits for all the samples within the designated screen space region associated with this DrawPixel Loop packet. For a given LoopDraw chip, for bits from this string that are associated with frame buffer sample addresses contained by this particular LoopDraw chip, a bit value of '1' value indicates that frame buffer sample address is to be a member of the candidate set, a bit value of '0' indicates that it is not.

We now turn to the portion of the same local state data context on a particular LoopDraw chip that is used to compute sample components for sample locations that are members of the candidate set. As sample components include multiple components, they contain information about how to compute the value for each component. One possible method may be to use a plane equation in screen space subpixel accurate x and y location to compute the value of a component of a sample at a given sample location. With this method, the information stored in the on-chip local state data context would be that values of the coefficients for this plane equation. In one embodiment, the z-depth value of a sample is optionally computed in this way. Another method for computing a component value would be to just insert a constant value from part of the packet payload portion of the DrawPixel Loop packet. In one embodiment, the red, green, blue, and possibly alpha values of components of a sample are optionally computed in this way. Other methods for computing values of sample components are contemplated and possible. Interpolation of cached data from other previously received DrawPixel Loop packets and other previously computed samples is possible. Clearly any number of these techniques could conditionally selected individually for each sample component, and thus mixed in any way.

VideoPixel

A VideoPixel is a Loop architecture Loop packet that can be sent over the LoopLink to a number of other Loop chips. In one embodiment, LoopDraw chips and LoopInterface chips are the Loop chips that perform any processing on the contents of VideoPixel Loop packets, any other types of Loop chips that exist will process the routing and destination information in VideoPixel Loop packets, to determine if and how to pass the package on through any of or all of the LoopLinkOutputPorts the chip may have.

In one embodiment, the only Loop chips that can initially create VideoPixel Loop packets are LoopInterface chips.

When a VideoPixel Loop packet enters a LoopDraw chip, it may be subject to internal processing and modification before it is sent back out from the LoopDraw chip.

In one embodiment the Loop chip that can consume a VideoPixel Loop packet (e.g., not pass it on) are LoopInterface chips. This does not always happen in some cases, a LoopInterface chip might only route a VideoPixel Loop packet, not consume it. Alternately, if a first LoopInterface chip is determines that the first LoopInterface chip is the intended final destination of a VideoPixel Loop packet received through one of the first LoopInterface chip's LoopLinkInputPorts, the Loop packet will be subject to some internal computation, culminating in the eventual sending of the computed results out as a video output signal through (one of) the LoopInterface chip's video output interface(s).

FifoStatus

The term FifoStatus referees to Loop packets that are generated by LoopDraw chips, through the mechanism previously described. In one embodiment, FifoStatus Loop packets are eventually consumed by LoopInterface chips, though not always by the first several LoopInterface chips encountered by the FifoStatus Loop packet.

The Loop packet payload contained within a FifoStatus Loop packet that reaches a LoopInterface chip is potentially used to update that LoopInterface chip's model of the relative availability of the LoopDraw chip that generated the FifoStatus Loop packet to process any Loop packets which that LoopInterface chip might in the future consider sending to that particular LoopDraw chip, relative to other possible destination
LoopDraw Chips.
Ring
Simple Ring Configuration When a 3d graphics hardware accelerator is built out of Loop chips, in the simplest case the Loop chips are connected in one ring—each Loop chip has its LoopLinkOutputPort connected to the LoopLinkInputPort of the next clockwise Loop chip in the ring. The Loop chip types used to construct this ring are some number of LoopDraw chips and one or more LoopInterface chips. Certain implementations of the Loop architecture place some limits on the exact numbers of this chips, but these limits will not be relevant to the discussion here and the invention does not contemplate any particular number of chips in a loop.

Thus, these chips are all connected together into a circular loop. In this simple cases, the only chip interfaces not forming the ring connections are three additional interfaces on the one or more LoopInterface chips in the ring: the LoopInterface chip host interface, the LoopInterface chip video output interface, and any LoopInterface chip non-local LoopLink ports (in those embodiments that include such ports).

The Loop architecture has been designed so that this simple structure is capable of performing as a fully functional 3d graphics hardware accelerator. In the context of a 3d graphics hardware accelerator built in this way out of one ring structure, the term ring refers to this one ring of chips. The term used to refer to a 3d graphics hardware accelerator built in exactly this way is as a simple ring configuration. These are also sometimes referred to as a simple ring.

Local Ring

Because some embodiments of this invention include additional connectivity options in and out of the LoopInterface chips, more complexly connected sets of Loop chips can be formed and usable as functional 3d graphics hardware accelerators than just the simple ring configuration. However, in these more complex cases there is still the concept of a local ring, where most of the operations of the rendering process proceed in a way very similar to how they do in simple ring configurations. In this context, referring to the local ring, or even sometimes just the ring, refers to just the Loop architecture chips that make up the local ring.

Ring Traffic

While several examples of ring connected electronics and/or computer systems exist in computer science, many more examples of interconnected systems are based on much more complex topologies. Thus, terminology as applied to Loop systems may be carefully defined.

One general concept from computer science involving connected systems is traffic. In some definitions, traffic is a form of the measure of how much of the available bandwidth at critical or specified sub-systems (called nodes in this context) in a connected electronics and/or computer system.

A related concept is that of bus traffic, as applied to electronic and computer systems where a number of sub-systems may all share a single data path. Bus traffic is simply any valid communications taking place on this shared bus.

Sometimes in systems connected as the ring system of this invention is, one might talk about a ring bus, and the traffic on the ring bus. But there is no single shared bus to be talking about, technically the only buses present are all the unidirectional point-to-point interconnects between different Loop chips, and thus the concept of ring bus traffic is ill-defined.

However a more general concept of ring traffic can be usefully defined. On a given simple ring or local ring, the traffic over any specific LoopLink should be statistically roughly the same. Thus, the average traffic over a single LoopLink is a good approximation of what is going on all around the rest of the ring. Thus, a statistical concept of ring bandwidth can be defined using the same statistical arguments.

Within this concept of ring traffic one can ask which portions of the rendering computations are generating traffic along the ring at a given point in time. This traffic can be measured in terms of absolute bandwidth used, or as the percentage of the total (maximum or average) bandwidth of the ring. Different sources of traffic within the 3d graphics hardware render process can also be compared to each other in terms of relative bandwidth used, or bandwidth used relative to the nominal or expected use of a particular rendering computation.

Performance

This portion of the document characterizes the performance envelope of some of the communication and computation aspects of the Loop architecture. This characterization is done under and scaled to a specific set of assumptions about the performance of other computational parts of the Loop architecture. These assumptions are not specific engineering or marketing goals; these assumptions are just an example set of computational capabilities for a particular embodiment of the present invention that will allow an understanding of how computation, chip count, and bandwidth issues trade-off in the Loop architecture.

Assumptions

Let us assume that in a particular embodiment a single LoopDraw chip has a pixel shader rate of 64 million pixels per second, a sample fill rate of 1 billion samples per second, and can process and feed on 240 million VideoPixel Loop packets per second. Thus, for a simple ring containing 16 LoopDraw chips, the aggregate pixel shader rate would be 1 gigapixels shaded per second, the aggregate pixel fill rate would be 1 billion pixels per second (at a sample density of 16), and the video output signal video format pixel rate would be 240 megapixels per second. These throughputs do not take into account any time taken by less frequent tasks such as texture loading or texture copying.

Performance Envelope

Given the assumption above, Table 1 shows the relative performance increase possible in Loop architecture based 3d graphics hardware accelerators as the number of LoopDraw chips used increases from 1 to 64. For each number of Loop-Draw chips, the performance is shown at two different sample densities.

The column labeled pixel shader power is a measure of the relative complexity of the pixel shader program, with the relative pixel shader power complexity supported by 16 LoopDraw chips arbitrarily defined as 1.0. The actual amount of pixel shader power required will vary depending on the details of a particular application. For some applications, pixel shader powers of less than 1.0 will still be quite usable, other applications may want to use features such as procedural textures or procedural geometry that could require more than 1.0 of pixel shader power.

Experience with 3d graphics software rendering systems has shown that sample densities less than 4 do not add much quality to rendered images. Furthermore, while rendering images at sample densities of 8 does produce appreciably better quality than those rendered with a sample density of 4, images rendered with a sample density of 16 or more are much more likely to produce pleasing results. Similar quality trade-offs exists for graphics hardware rendering systems.

This means that it will be advantageous for 3d graphics hardware accelerators to support sample densities of at least 16 or higher.

The pixel shader rate constrains the maximum value of the product of the depth complexity of the frame and the video resolution in pixels and the rendering frame rate. Holding the depth complexity at 6, a pixel shader rate of 1G (one gigapixel per second) supports a physical image display device with a video resolution of 1920×1200 pixels at a rendering frame rate of 76 Hz, while a pixel shader rate of ½ G (one half gigapixel per second) supports a physical image display device with a video resolution of 1280×1024 pixels at a rendering frame rate of 60 Hz, or a physical image display device with a video resolution of 1920×1200 pixels at a rendering frame rate of 38 Hz. If the depth complexity is reduced by a factor of two, to a value of 3, then video signal format with twice the pixel video resolution or applications requiring twice the rendering frame rates are supported (up to certain maximums). Table 2 summarizes the supportable envelope for an embodiment. In all the render frame rates with a +, the system has more capability than the physical image display device can use.

Table 2 is constrained by the maximum video format pixel rate, shown in the last column in Table 1. A physical image display device with a video resolution of 1920×1200 usually only runs at 60-84 Hz, and thus requires at least a 200 million pixels per second video format pixel rate. A physical image display device with a video resolution of 1280×1024 76 Hz needs only 100 million pixel per second video format pixel rate.

Loop architecture based 3d graphics hardware accelerators can be configured to support from one to two or more video output interfaces. Simultaneously servicing the needs of more than one video output interface introduces additional shared resource constraints on the video signal formats that can be supported. If two different renderings must also be performed simultaneously, this will also place additional shared resource constraints on the rendering performances achievable. In some embodiments, going from 1 to 2 video output signals on 2 video output interfaces requires most of the resources to be divided between the video output interfaces. In one embodiment, this is a simple halving of supportable physical image display device video resolution and/or supported rendering frame rates, or in some cases, pixel shader power.

Loop Packets

This portion of the document describes some of the technical details and constraints on the Loop packets, routing and queuing of Loop packets, and the implied FIFO buffers for Loop packets traversing the ring via the LoopLink in one embodiment of the present invention.

Definition of a Loop Packet

In the Loop architecture, a packet is defined to be a variable length collection of bits that is sent from the inside of one Loop chip over a LoopLink to the inside of another Loop chip as an atomic object. A first Loop chip has a Loop packet inside of it either because that first Loop chip created the Loop packet, or because the first Loop chip has received the Loop packet from some other Loop chip. Such Loop packets are usually sent from the first Loop chip out over the first Loop chip's LoopLinkOutputPort to the LoopLinkInputPort of a second Loop chip. The second Loop chip is usually the one that is physically the immediate counter-clockwise neighboring Loop chip to the first Loop chip.

In one embedment of the invention, the LoopInterface chip may instead send a Loop packet out any of several non-local output LoopLinks to one of another LoopInterface chip's non-local input LoopInterfaces.

In one embodiment, the data within a Loop packet is divided into two groups. The first group is the packet header, such as packet length, destination information, and type. The second group is the packet payload, such as a geometric object to be drawn, or a pixel to be sampled, or a video output pixel to complete assembly.

In one embodiment, the LoopLink has a fixed bit width; in this case the bit size of Loop packets are integer multiples of this fixed size (some bits may be unused).

In one embodiment, each Loop packet's packet header information includes an explicit length field. This length information may be redundant information, as the length of a particular Loop packet may be indirectly determinable from the Loop packet's packet header type field or other fields. However, in some cases just the Loop packet's packet header type field may not be enough information to uniquely specify the length of the entire Loop packet. This can occur if the same Loop packet type is allowed to have variable length packets payload lengths. Having an explicit packet header length field independent of the packet header type field allows low level state machines to properly handle transit of Loop packets. It also allows for new Loop packet types to be introduced after a given chip has been made; so long as the only thing that the older chip has to do with the new Loop packet is pass it on to the next chip the old chip will still function in a system that also contains newer chips with new Loop packet types.

Loop Packet Types

All Loop packets traversing the ring are marked as either multicast or unicast. Multicast Loop packets nominally are addressed to all chips on the ring; target bits may instead indicate that only certain designated chips are to process this Loop packet.

While there are potentially quite a large number of different Loop packet types, most Loop packets belong to one of three specific sets of Loop packet associated with three major groups of stages of the 3d graphics rendering pipeline. For simplicity of verbiage, if a Loop packet p is a member of Loop packet set s, then we will just say that p is an s Loop packet. These three sets of Loop packets and some of the more important specific associated subsets of Loop packet are:

The GraphicsCommand Loop packet set. This is the group of all Loop packet that carry GraphicsCommand Loop packets from the LoopInterface chip to the LoopDraw chips. Loop packets in the GraphicsCommand group fall into two main sub-groups of Loop packet: the GraphicsState and GraphicsPrimitive Loop packet subsets. GraphicsState Loop packets are usually multicast, and change internal rendering state, but they do not generate pixels themselves. GraphicsPrimitive Loop packets are usually unicast, and in general contain the vertex data that actually specify triangles, lines, dots, and other geometric primitives to actually be rendered into pixels. When a LoopDraw chip receives a GraphicsCommand Loop packet, this takes up room in the GraphicsCommands input FIFO buffer internal to that LoopDraw chip. At (programmable) time intervals, the LoopDraw chip will send a FifoStatus Loop packet out along the ring back to the LoopInterface chip to keep it up to date with the amount of buffer storage space remaining inside that particular LoopDraw chip.

The DrawPixel Loop packet set. This set of Loop packets include all the Loop packets that result from a LoopDraw chip processing a GraphicsPrimitive Loop packet. An important subset of the DrawPixel Loop packet set is the DrawState Loop packet set. When the full detail of the rendering is described, it will be seen that there are also DrawState Loop packets generated by the LoopDraw chips in order to set up the appropriate state for the pixels to be drawn in the context of.

The VideoPixel Loop packet set. These are how data that will eventually generate the video output signal is collected from within the ring. In one embodiment these Loop packets are generated with initially zero RGBA summation and normalization data by a LoopInterface chip (which in one embodiment contains the video signal format timing generator). These Loop packets then pass through all the LoopDraw chips in a ring (collecting up pixel data components along the way, adding this into in one embodiment the RGBA summation and normalization data fields of the VideoPixel Loop packet), then re-enter the LoopInterface chip for final normalization of the pixel data, the optional gamma correction graphics pipeline stage, and output over either the video output interface pins, or to be passed up the host interface to the host computer, or to be passed around this or one or more other rings for use as a texture map (or other map type) in subsequent rendering(s).

Loop Packet Creation

There are three ways in which a Loop chip might find itself with a Loop packet that needs to be sent out over its LoopLinkOutputPort (or in some embodiments, other Loop packet output ports):

The Loop packet can come in from off system interfaces. An example of this is data that came in over the host interface on a LoopInterface chip, but now needs to be sent out as a Loop packet to other Loop chips.

The Loop packet can be created as a result of on-chip processing of information. An example of this are the DrawPixel Loop packets created as part of the rasterization process inside a LoopDraw chip. Another example is data that came in over the host interface on a LoopInterface chip and has been processed by that LoopInterface chip into modified data that now must be sent out as a Loop packet to other Loop chips.

The Loop packet could have entered a Loop chip through its LoopLinkInputPort (or other Loop packet input ports in some embodiments). An example of this would be a DrawPixel Loop packet that is just passing through; its destination is not the current Loop chip, but some other Loop chip further down the ring.

Loop Packet Destination Type Unicast

Unicast Loop packets by definition have a single targeted destination. For example, a DrawPixel Loop packet will have a unicast target of the particular LoopDraw chip somewhere down the ring that is the one responsible for the frame buffer memory interleave that contains the xy address of the pixel in question. GraphicsPrimitive Loop packets are also defined to be unicast Loop packets; their fixed destination is the LoopDraw chip that a LoopInterface chip has decided to send the next GraphicsPrimitive to for load balancing reasons.

In one embodiment, the destination chip of a DrawPixel Loop packet could be indirectly inferred from the xy drawing address of the pixel. But in another embodiment, the low level Loop packet control information can be kept redundant and simple if explicit unicast target information is always present within the control field of all DrawPixel Loop packets.

In order to allow building rings of many different sizes from the same Loop chips, the internal mechanism for one Loop chip to address another Loop chip is made flexible. In one embodiment, only after a Loop chip is powered on will it find out what the physical organization and count of Loop chips are in the system that it is a part of. In one embodiment, this flexibility can be achieved by designing the Loop chips to download from an off-chip source dynamic configuration information when the Loop chip is initialized. For example, which all Loop chips of a given type may be manufactured identically, the initialization configuration information may set an internal id field on each Loop chip to a unique value relative to all other Loop chips in the same system. Having such a unique id can be used as part of many different possible chip routing and addressing mechanisms.

Loop Packet Destination Specification Alternatives

The following paragraphs discuss several ways in which unicast and multicast destination information within a set of chips connected into a ring could be specified. However, the ability of LoopInterface chips to connect out to additional rings implies that much more complex topologies than simple rings need to be supported. However an exploration of the solution space for a simple single ring topology will be discussed first for clarity.

There are a large number of ways within a simple ring in which chip targets could be identified. These ways include, but are not limited to, three examples in the paragraphs below:

One: The Loop packet header of each Loop packet contains a small integer field called the hop-count. After receiving a Loop packet through its LoopLinkInputPort, a Loop chip subtracts one from the hop-count, if the results are zero than the destination of the Loop packet is this Loop chip; otherwise the Loop packet (with the decremented hop-count) is sent out through the Loop chip's LoopLinkOutputPort to the next Loop chip along the ring. This is effectively a source relative mechanism, e.g., to send a Loop packet to a Loop chip that is 8 Loop chips away from you, just set the hop-count to 8.

Two: Assume that at system initialization time every Loop chip has been assigned an integer id that is unique from all the other Loop chips in this system. Further assume that this unique integer id is a count of how many Loop chips away a particular Loop chip from a designated master LoopInterface chip. This unique integer could be initialized by sending a Loop packet meant for initialization through the ring, where the initialization Loop packet has a hop-count field that is incriminated every time is enters a new Loop chip. Other more complex addressing information could follow later. To see how this additional information might be used, assume that a first Loop chip wants to send a message to a second Loop chip. This additional addressing information could allow the first Loop chip to compute the unique integer address of the second Loop chip based on other data, such a frame buffer x and y pixel address. If each Loop chip has such an unique id, then destination determination is fairly simple. If you are a Loop chip, and the unique destination id in a Loop packet that just came in your LoopLinkInputPort matches the value of your unique id, then this Loop packet's for you; otherwise it is not for you, and should be sent out your LoopLinkOutputPort in further search of its destination Loop chip.

Three: Similar to two above, but instead the unique chip numbers are assigned on an arbitrary basis. This has certain advantages in a Loop chip based system connected by more complex paths than a simple ring.

These examples have only mentioned unicast Loop packets. How are multicast Loop packets handled? Again, for example, let us look at three out of the many possible alternatives for the simple ring case:

One: multicast Loop packets are processed by all Loop chips.

Two: multicast Loop packets are processed by all Loop chips, except for individual Loop chips that have had multicast Loop packets expressly disabled. This disablement could have been communicated individually to each Loop chip that is to be disabled for receiving multicast Loop packets by a unicast Loop packet that says "multicast disable thyself".

Three: multicast Loop packet headers contain a fixed length string of bits representing the bit set of all integer chip ids. (This implies a fixed maximum number of chips in a ring.) If a Loop chip's integer id bit is set in the multicast header, then this Loop chip should accept the multicast Loop packet; otherwise not. Note that this scheme either requires that Loop packet headers for multicast Loop packets are different (longer) than those for unicast Loop packets, or that wasted control bits are always present in the (much more frequent) unicast Loop packets.

A layer of indirection is added by creating (a fixed maximum number of) subgroups, each with unique integer ids. Each Loop chip has a state bit for each subgroup that marks membership within a particular subgroup called a multicast group. Every multicast Loop packet has a fixed field for storing the integer that represents the unique integer id for the subgroup it is broadcasting to. A given Loop chip is the destination for a particular multicast Loop packet if and only if the Loop chips's membership bit is set for the specific subgroup id in the Loop packet's header. Adding the convention that all Loop chips always belong to subgroup zero is a low overhead insurance to guarantee that there is always a way to send a Loop packet to all the Loop chips. The total number of simultaneously supported subgroups does not have to be very large; eight groups would only require three bits of subgroup information in a Loop packet header. Indeed, if unicast Loop packets already need an n-bit destination field in the header, then the multicast bit when set could re-use this n-bit field to support up to 2n different sub-groups.

As mentioned before, all of the proceeding discussion was under the assumption of directing Loop packets in the simple topology of a single ring. Multiple rings connected together by either additional LoopInterface chips or additional non-local interconnections between LoopInterface chips require more complex routing information for Loop packet destination information.

One embodiment for achieving this is to just add a simple routing layer on top of the simple intra-ring destination layer. This would work as follows: so long as a Loop packet is destined for a different ring than the one it is presently traveling within, LoopDraw chips merely pass it on. Upon encountering a LoopInterface chip, the routing information kicks in, possibly jumping the Loop packet to a different (and possibly the final destination) ring, or feeding it still further forward within the current ring (looking for a different LoopInterface chip). As usual, there are several ways in which the routing information might be represented and processed. In a first method, LoopInterface chips do anything other than pass non local destination Loop packets on to the next Loop chip in the ring. A LoopInterface chip could decrement one or more counts, match Loop chips ids, or any of several other things to see which of the multiple LoopLinkOutputPorts belonging to the LoopInterface chip this particular Loop packet should sent out. Once the Loop packet arrives within the destination ring, one of the previously described local destination determination algorithms could apply. This implies that multicast Loop packets could be sent such that the implicit scope of the multicast Loop packet is within the destination ring. Multicasting to multiple rings is a more complex matter, but may be performed by one skilled in the art according to the teaching described herein.

More detail on the mechanisms and header formats for Loop packets will depend on, and can be derived from other constraints that arise when in the process of building a particular implementation of the Loop architecture, as may be performed by one skilled in the art according to the teaching described herein.

One important additional constraint on Loop packet forwarding algorithms has yet to be discussed: termination. Unicast Loop packets always terminate at their specified destination target. But multicast Loop packets go on and on; some mechanism is needed to terminate the auto forwarding once the Loop packets has been all the way around the loop once. (Certain complex situations may require Loop packets to go around the ring two or more times before stopping forwarding.) The idea here is that infinite looping of Loop packets is preventable by simple low-level state machines.

Again there are several ways in which to prevent infinite looping, but there is the additional constraint of low-level error firewalling, even though it is assumed in most embodiments that at least all Loop packet header information is error correcting code (ECC) protected.

Once again within the header of a Loop packet a small integer hop-count field could be used that would be decremented every time the Loop packet enters a new LoopLinkInputPort. When the hop-count field reaches zero, the Loop packet should never be forwarded, regardless of what the other header data says. If group and routing information is to be provided in addition to a decrementation unicast destination address field, this field could be re-used for this purpose on multicast Loop packets.

Another possibility (for a simple ring) is that if a chip ever sees again a Loop packet that it generated, it should stop it. The drawback with this solution is that a) Loop packets would (almost always) have to flow past their otherwise last chip to get back to their chip of origin, and b) an additional bit field for (long) sequence id's and originator chip id would be needed to make this scheme work.

Loop Packet Priorities

It is desirable to have a fairly simple method to ensure that the normal processing, forwarding, and generation of new Loop packets does not cause deadlock on any Loop chip's LoopLink. In one embodiment, deadlock avoidance can be achieved by a consistent set of polices governing the relative priority of different groups of Loop packet types should have when a Loop chip decides which of several Loop packets current resident on that Loop chip all indicate that they wish to be sent out the Loop chip's LoopLinkOutputPort. Such a set of policies are given next:

First, VideoPixel Loop packets always have highest priority. The reason for this is simple; most physical image display devices will fail if the video output signal ever pauses. In the special case of final rendered data being read back to texture memories or to the host computer this priority may be able to be lowered below certain others. Note that this might not be a good enough reason to lower the priority if the reason that the data is being read back to the host computer is so that it can be sent out across a different host interface to a real-time or pseudo real-time physical image display device (a different graphics hardware accelerator, a compression and networking card, etc.).

Second, DrawPixel Loop packets have the second highest priority. This is beneficial, because GraphicsPrimitive Loop packets can generate large numbers of DrawPixel Loop packets (the worse case is that a single triangle primitive may end up filling the entire frame buffer and thus may generate up to 2 million DrawPixel Loop packets). Deadlock could occur if the DrawPixel Loop packets can't at some point temporally stop any new GraphicsPrimitive Loop packets from being processed. Note that in theory, GraphicsState (change) Loop packets don't themselves cause additional Loop packets to be generated, so that they don't necessarily have to always give priority to DrawPixel Loop packets (and VideoPixel Loop packets). However, in general GraphicsState Loop packets are closely followed by GraphicsPrimitive Loop packets, so things would have to have had stopped fairly soon anyway. Thus, it is just simpler and usually no less optimal to just make DrawPixel Loop packets always have a higher priority than GraphicsCommand Loop packets.

In theory, a given LoopDraw chip can be overloaded with DrawPixel Loop packets. If unchecked, this could lead to dropping VideoPixel Loop packets that cannot get through the traffic jam of DrawPixel Loop packets. The LoopDraw chips could in theory send an input buffer status all the way around the ring, as they do for GraphicsCommand Loop packets, so that all the other LoopDraw chips could have a (conservative, slightly out of date) model of all the other LoopDraw chip's input buffers. This would probably be best done by adding DrawPixel input FIFO buffer state information to the FifoStatus update Loop packets that are being generated regularly anyway. But it is not clear that a mechanism that might consume additional bandwidth over the ring would be necessary. A less bandwidth intense mechanism would be achievable if the LoopLink handshake protocol indicated the readiness of the receiving Loop chip to accept Loop packets with types that are members of one of several different sets of Loop packet types. In this way Loop packets with higher priority Loop packet types can be let through while Loop packets with lower priority Loop packet types would be (temporarily) blocked.

If this tiered Loop packet class mechanism is adopted, for debugging and wedge state reset (e.g., when state machines lock-up for some reason), it is useful to have certain special state command Loop packets with priorities above and between the general Loop packet priority classes supported.

Loop Packet Fifo Status Feedback

Most types of Loop packet are fire and forget: once the Loop packet has left the Loop chip that created it, that Loop chip can forget about that Loop packet. VideoPixel Loop packets and DrawPixel Loop packets are in this category. But GraphicsCommand Loop packets have to be carefully load balanced across multiple LoopDraw chips by LoopInterface chips. This means that the LoopInterface chips need some visibility into how full the various on-chip input FIFO buffers are within each LoopDraw chip.

In order to completely avoid any wiring other than to Loop chips physically adjacent to each other in the ring, at various times FifoStatus Loop packets should be sent by LoopDraw chip back to the originating LoopInterface chip.

FifoStatus Loop packets are not sent as a direct response of a LoopDraw chip receiving a GraphicsCommand Loop packet. Instead they are generated by a LoopDraw chip just before a conservative model of the LoopInterface chip (from the point of view of the LoopDraw chip) would predict that one of the LoopDraw chip's input FIFO buffers was about to overflow. The model works as follows:

First, the amount of free input FIFO buffer space that the LoopInterface chip last knew for sure (at some point in time) was the amount contained in the last FifoStatus Loop packets sent by the LoopDraw chip.

From this amount, next subtract the amount of space taken by any GraphicsCommand Loop packet received since the FifoStatus Loop packet was sent.

Then subtract an additional amount of space taken up by a worse case number of GraphicsCommand Loop packets either already being passed around the ring (but not yet received by the LoopDraw chip) or that could be sent into the ring by the LoopInterface chip before the potentially generated FifoStatus Loop packet could reach the LoopInterface chip.

If this amount is too close to zero (the actual threshold should be programmable), but the actual amount of input FIFO buffer free space is considerably larger than the conservative prediction, then the LoopDraw chip should generate a FifoStatus Loop packet with the current more correct free space amount.

(Note that there should be some built in hystereses, new FifoStatus Loop packets should not be sent too frequently if they won't change the situation much.)

The situation here is that the LoopInterface chip has a (delayed) "worse case" model of the how little input FIFO buffer storage is free in each LoopDraw chip that it sends GraphicsCommand Loop packets to; the remaining free storage amount is updated as FifoStatus Loop packets arrive back from (the long way around) the individual LoopDraw chips. The FifoStatus Loop packets could include the (LoopDraw chip specific) sequence number of the last GraphicsCommand to enter the particular LoopDraw chip's FIFO buffer as a relative time stamp (other methods are possible). The model is conservative in that it assumes that just after this last report from the LoopDraw chip, no more GraphicsCommand Loop packets drained from the LoopDraw's input buffer. (This is usually, but not always, caused by a geometric primitive's rasterization covering a large area and thus taking a long time to complete.) Thus, conservatively, the additional "free" space in that LoopDraw chip's input buffer is what it reported in its last FifoStatus Loop packet, minus the total space taken up by all GraphicsCommand Loop packets that have been sent (to that LoopDraw chip) by the LoopInterface chip since the one that caused the FifoStatus to be reported back. In this way input FIFO buffer overflow on the LoopDraw chip (and attending glitching of the image being rendered) can be prevented from occurring. The LoopInterface chip uses this worse case predicted LoopDraw chip GraphicsCommand input FIFO buffer free space to determine which LoopDraw chip the next unicast GraphicsCommand should be sent to (it selects only among ones that have sufficient minimum space left to receive the whole command). For multicast Loop packets, all target LoopDraw chips must have sufficient input FIFO buffer space to receive the entire multicast GraphicsCommand Loop packet, or the LoopInterface chip will just wait and send no data. (More complex algorithms could send the commands to just the subset of LoopDraw chips that have space for them, keeping track of which LoopDraw chips have not yet received the command, caching and then re-sending the command when the left out LoopDraw chips have space to receive the command. The advantage of such a complex algorithm is that many GraphicsCommand are frequent and cancel out their predecessors, eliminating the need to send (and process) them in all LoopDraw chips.) Eventually, more recent LoopDraw chip FifoStatus Loop packets will alive, free up enough space to allow transmission of GraphicsCommand Loop packets again.

This Loop packet transmission "hold-back" algorithm has the advantage in that there is no direct assumption about the number of chips in the ring. Indeed, even the GraphicsCommand input FIFO buffer size within the LoopDraw chip could change in future chip revisions, so long as the FifoStatus Loop packets can represent a larger available space than is present in earlier chips.

The Loop packet transmission "hold-back" algorithm also does not favor LoopDraw chips at any particular position on the ring, because the FifoStatus Loop packets travel the rest of the way along the ring to get back to the LoopInterface chip. Consider the LoopDraw chip right next (downstream) to the LoopInterface chip vs. the one furthest away (e.g., connected just upstream from the LoopInterface chip). The close downstream LoopDraw will have less GraphicsCommand Loop packets in flight, but have more (and older) FifoStatus Loop packets currently making their way around the ring than the LoopDraw chip just upstream. Thus, the relative advantages of ring position cancel out and a simple load balancing algorithm can be used. To decide among LoopDraw chips that all have sufficient space to receive the next unicast primitive, a simple round-robin algorithm keeps things fair. (This type of round-robin is where any LoopDraw chips without sufficient (predicted) input buffer space are eliminated from consideration for receiving the next unicast primitive.)

However, the Loop packet transmission "hold-back" algorithm does have some indirect dependence on the number of chips in the ring. If the total storage size of the GraphicsCommands input buffer on the LoopDraw chip is close to or less than the total size of all the transport buffers going around the (length of) the ring, then artificial holds will generally be generated (though the system will still function).

General Issue: How "Wired In" are System Limits?

The Loop architecture has been presented as one for which in one embodiment the same two building block Loop chips can allow for rings of many different sizes to be built and function properly: a highly scalable architecture.

It certainly is true that most of the architectural limitations that have heavily restricted the scale of past 3d graphics hardware accelerators have been avoided. There need be no system spanning wires other than power and ground (even clocks may be forwarded from a main LoopInterface chip). All the wires connecting the LoopLinkOutputPort output pins to the LoopLinkInputPort input pins may be point to point from one chip to the next chip in the ring.

However, there are real secondary upper limits on the number LoopDraw chips that can be strung together within a single ring. As seen in the destination mechanism discussion, nearly any scheme will have an inherent upper limit on addressability. This limit isn't much of a practical concern if count fields are used, but it is if bit-set fields are chosen. There is also the problem of lengthening delays in larger rings that may eventually overwhelm internal FIFO buffers of Loop chips (and thus represents a design limit, albeit a soft one). Beyond a certain limit, the benefits of additional LoopDraw chips are primarily useful in a system for additional sample density and/or programmable shader power. Of course, in any physical product instantiation there will be cooling, power, and space limits on the largest size ring that can be fit into a given chassis. And finally, while scalability in and of itself is a good thing, it almost always increases the cost of designing tests for increasingly flexible chips. The testability impact of the Loop architecture is mostly confined to the LoopInterface chip, but still, additional features come at additional costs.

And while we have been talking about maximums, there are also limits on supporting a functional system (e.g., minimum video output signal video format pixel rates) when using a number of LoopDraw chips below a certain threshold.

Taking all these issues into account, while the architecture will be designed for current and future flexibility, at a (later) point in design, the build-up of constraints will result in the establishment of specific fixed limits on scaling.

These limits should not be forced too early, but as an example, at this point in time, one set of scaling assumptions would be to target the architectural design for a sweet spot of 16 LoopDraw chips in a ring, and support a maximum number of 64 in a single ring to provide sufficient room for support of expanded systems. Past a certain point, additional rendering power is better supported by the use of multiple parallel rings, each separately connected to the host computer, or, as will be seen later, as multiple rings connected into a larger system, think of this as a stack of rings connected to one or more host computers.

Video Output

One of the advantages of the Loop architecture is that much more complex and rich video output processing than has appeared before in commercial products is easily supportable. This portion describes the video output architecture than can achieve this.

Relationship of Frame Buffer Memory to Video

For simplicity, let us consider a simple ring system with one LoopInterface chip and 16 LoopDraw chips, and assume a sample density of 16. Each LoopDraw chip has the storage for all 16 samples of every 16th pixel, because there are 16 LoopDraw chips. Again to make things simple, let us assume that pixel ownership is assigned on a 4×4 matrix.

Figure 6:
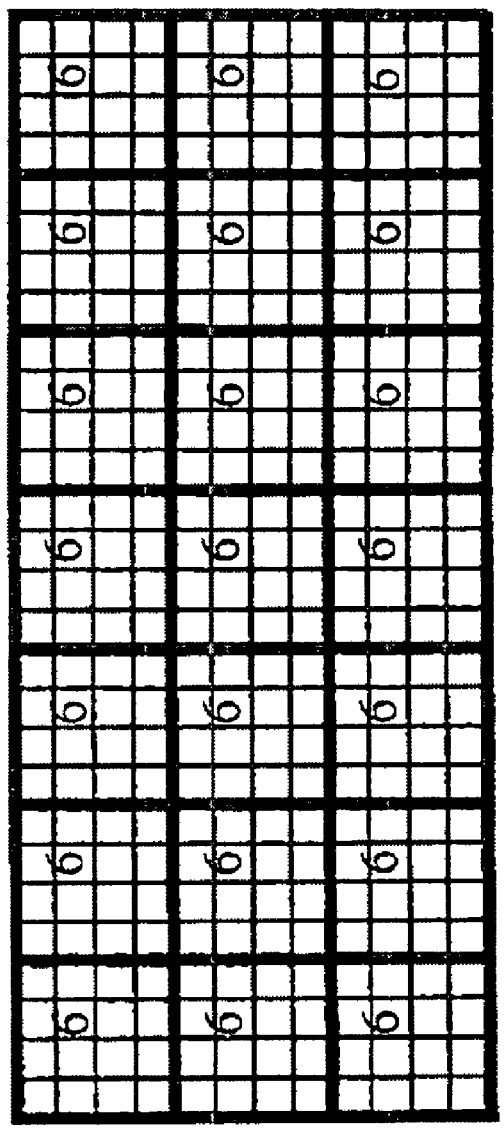
FIG. 6 shows all the pixels in a 16 LoopDraw chip system owned by a particular LoopDraw chip.

FIG. 6 shows all the pixels in the display owned by LoopDraw chip #6, where the LoopDraw chips are numbered 0-15. The DRAM memories attached to LoopDraw chip #6 will contain all the samples for the specified pixels, 16 samples per pixel in our example. The other LoopDraw chips would own the other pixels within the 4 by 4 grid. For example, LoopDraw chip #5 would own the pixels directly to the left of the pixels owned by LoopDraw chip #5.

Relating this to video output signal, if our antialiasing filter was a 1×1 box filter, then each LoopDraw chip would participate in only one out of every four output scan lines, and only compute (as opposed to pass on to another chip) a pixel value for only one out of every four pixels on the one out of four scan lines that LoopDraw chip participates in. The antialiasing filtering operation would be to fetch all 16 samples of each of the owned pixels (each of the samples are only fetched once per video format frame), add all of the samples together, and then shift the results over by four bits (for each color/alpha component). (This shift is just an inexpensive form of normalization of all the weights of the box filter: sixteen weights that are all unity is 16, and division by 16 in binary arithmetic representation is just a shift right by four bits, as is well known to one skilled in the art.)

Now assume that the antialiasing filter is something a little harder—a function of a 4×4 pixel neighborhood. Now each LoopDraw chip does participate in all scan lines of video output signal, and has something to add to each output pixel on every scan line. What does this say about how the LoopDraw chip will have to fetch samples out of the frame buffer? Now the 16 samples of every pixel will have to be available for use in the filtering of 16 different video output signal pixels. If we don't want to have to fetch the samples from the frame buffer 16 times in one video format frame, some form of on the LoopDraw chip sample component caching mechanism (not shown) will be needed. The number of times that a given 16 samples are fetched from the frame buffer per video format frame may be reduced to four time per video format frame, if all the samples for a pixel are fetched and stored for use for four consecutive video output signal pixels. Saying this another way, now the pixel data (the samples) need only be fetched once for every scan line of video output signal, four times in total. This is still a large amount of excessive bandwidth, as the memory traffic is equivalent to a depth complexity of four being read (not written) on the rendering side. If a scan line of pixel contents (16 samples) on-chip buffer is added, now the total accesses can be reduced to the minimum: once per pixel per video format frame. Note than in our example this scan line of pixels would contain only one quarter as many pixels as the highest resolution video signal format does per scan line. (Assuming 1920 as a maximum scan line width (in pixels), this would be 480 times 16 samples.)

Figure 7:
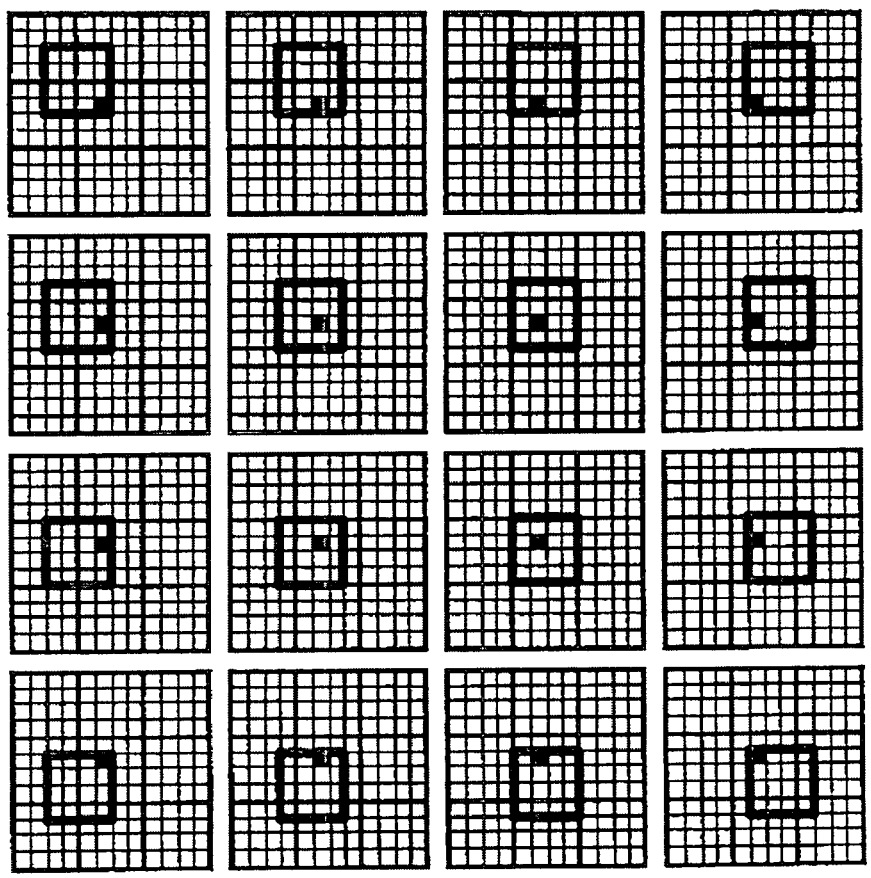
FIG. 7 shows all sixteen VideoPixel Loop packets whose 4×4 convolution windows require include processing of one specific pixel from the LoopDraw chip of FIG. 6.

FIG. 7 gives some context for this discussion. The convolution window, represented by the light gray square proceeds through the frame buffer in video signal format scan order: left to right, top of screen to bottom. The set of samples from one specific pixel belonging to LoopDraw #6 need only to be fetched once, sometime prior to the first use in the upper left hand corner; and then cached on chip for reuse until the last use (for this video format frame) in the lower right hand corner of the figure. Each of the different centered VideoPixel Loop packets will require different convolution kernel coefficients to be generated and multiplied by the individual sample component values.

The other 15 LoopDraw chips all have similar convolution windows and sample fetch and cache requirements, though with different points in time for sample fetch and cache re-use than each other.

All Sixteen VideoPixel Loop Packets Whose 4×4 Convolution Windows Require Include Processing of One Specific Pixel from LoopDraw Chip #6.

Clearly there are many other alternatives—why a 4×4 grid, what about an 8×2 or 2×8 grid? What if there are 8 or 32 LoopDraw chips rather than 16? What if the output filter requires a 5×5 support rather than 4×4? Each of these different assumptions leads to different trade-offs in pixel access and pixel cache sizes, which may be accounted for by one skilled in the art based on the discipline here. Any of these variations are considered to fall within the spirit and scope of the present invention.

This discussion covers the frame buffer access, but what about the antialiasing filter? First let us consider how the subpixel locations of the samples in a given pixel are known.

Here we assume that the positional distributional of samples within a pixel (subpixel sample locations) is a non-locally repeating pattern generated by a hardware sample address generator. This function may include a random number function seeded by the current pixel location, so that the pixel location will always generate the same partially random subpixel offsets. One way that the offset could be used would be as perturbations of an underlying regular grid (rectangular, hexagonal, etc.).

While there are many way to apply an antialiasing filter to these 4×4 arrays of pixels with 16 samples each, for simplicity we will concentrate on one particular method. This is not to exclude alternate embodiments for implementing the antialiasing filtering.

When the LoopInterface chip sends out VideoPixel Loop packet requests along the ring of LoopDraw chips, the request contains a subpixel accurate xy address (or delta address from the last, to save bits) of the center of the output pixel to be generated. Assuming that the antialiasing filter is a radially symmetrical filter, the filter coefficient for a given sample can be computed as follows:

First, subtract the xy address of the output pixel center from the xy address of the given sample. Now square and then sum these xy difference measures. The results is the square of the distance of the particular sample from the center of the video output location, the center of the circularly symmetric antialiasing filter. Now this squared distance can be used as an address to look up in an (e.g., in an on-chip SRAM) table that maps squared distance to filter coefficient.

Now that the filter coefficient has been found, next we multiply this value times the red, green, blue, and alpha (and possibly other) sample components, and add the resulting value into a running sum of the red, green, blue, etc. video pixel output components. The filter coefficient is added into a running sum of filter coefficients for this video output pixel. A LoopDraw chip computes a separate filter coefficient for each of the 16 samples in a pixel it owns, summing all of them into the single running sum (per component, plus total filter energy), and then pass this (as yet incomplete) output VideoPixel on to the next LoopDraw chip in the ring.

The incremental total summed filter energy will eventually be used to normalize the other summed filtered component values as part of the finial steps of producing the final pixel values for output. But note that the incremental total summed filter energy does not have to be explicitly passed along with the other incremental summed filtered component. The total summed filter energy could be re-computed when it is eventually needed, e.g., wherever the final component normalization is to take place. However, this would involve re-computing all the filter coefficients generated for all the samples that have contributed to the summed filtered components. While this does not require any (expensive) access of frame buffer sample components, the computation is massive, and takes on the order of as much circuitry as all the other convolution circuits spread across several chips (16 in our example) combined! So while an alternative embodiment might save the cost of sending the incremental total summed filter energy along with all the other summed filtered component values, and instead replicate the filter coefficient generation on some chip, many other embodiment do send the partial sum(s) of the filter energy for each updated VideoPixel given the present economic trade-off in pins vs. on-chip computation.

When a LoopInterface chip receives a VideoPixel, after having traversed and been added into by all of the (appropriate) LoopDraw chips, the pixel only requires normalization and a few more steps before final generation of the video output signal. To do this, the LoopInterface chip first takes the reciprocal of summed filter energy, and then multiplies this value times each of the pixel components (red, green, blue, etc.) in turn to produce the final convolved value. Most embodiments would add some additional processing before the components leave the video output signal pins of the LoopInterface chip, in some embodiments this consists at least of an optional conversion of the pixels into a non-linear gamma space (a simple table lookup).

One of the complications of performing convolution in the way described above is that the un-normalized partial sum values of all (convolved) pixel components are passed via the LoopLink pins from LoopDraw chip to LoopDraw chip. Because of the large number of samples that may contribute to the final sum, and the high numeric accuracy of the filter coefficients, the partial sums require significantly more bits of precision than the individual sample components. The number of bits is the log 2 of maximum number of samples that might fall within the filter, plus the number of bits (dynamic range) of the generated coefficients. For example, for 4×4 filters with a sample density of 16, and with 10 bits per component, a maximum of approximately 4*4*16=256 samples may contribute, implying eight bits of size, and adding to this 16 bit filter coefficients, a grand total of approximately 24 bits are passed from chip to chip for each video output pixel component. But to put this in perspective, this is still less than half the pin bandwidth needed by the DrawPixel Loop packets to render at a depth complexity of 6, so it should be supportable.

Given this background, we can briefly describe what would have to be modified to support some additional features in alternative embodiments of the invention.

In the description above, all of the components of a sample had a single filter coefficient value computed for them. In many cases this is sufficient. But if we are to correct on a subpixel level for chromatic aberrations within the physical imaging system that is displaying the video (digital micromirror displays, lenses, screens, etc.), we need to be able to specify a different (subpixel accurate) video pixel center for each of the rgb components. Furthermore, this will require three, rather than one sums of filter energy to be passed from chip to chip. (Three is emphasized here, as being able to distortion correct an alpha channel usually isn't a requirement for these sort of projection systems applications.) (Of course, other embodiments that use more than three spectral color components will need more than three additional filter partial sums.) This will nearly double the number of bits that have to be passed from chip to chip per output VideoPixel Loop packet, and triple the computational requirements on the internal circuitry for computing filter coefficients. One possible way to lessen the chip die area impact for the ability to separately distortion correct each of the rgb video output pixel components would be to take advantage of the excess computational power of system that have a surplus of LoopDraw chips, as might happen in a high end system with 32 or 64 LoopDraw chips per ring. Now possibly the LoopDraw chips could take three times as long to compute a given output VideoPixel Loop packet, and still support the high video output signal video format pixel rates. Many other similar trade-offs are possible.

Another complication is the support an antialiasing filters larger than 4×4. For example, even a 4×4 filter not centered on a pixel boundary in x and y would in general require 5×5 pixels to be accessed for filtering to be performed properly. This non integer alignment easily occurs in video re-sizing and distortion correction modes.

So far the generation of a single video output signal per ring has been discussed. Another complication is how are two video output signals supported from one ring, even assuming that the sum of the video format pixel rates does not exceed the single channel maximum video format pixel rate? How is the frame buffer mapped? Does video generation now happen separately and in parallel on two ring halves, or is it mixed together some way? As usual, there is not a single option; there are many different ways to make this work, overall system architecture arguments have to be weighed to decide among the options. These arguments are to be architectural and system constraints, and are well understood by ones skilled in the art from the teachings in this document.

LoopLink Required Bandwidth

This portion of the document will derive some example bandwidths used in embodiments of the LoopLink for the different rendering tasks. These bandwidths are presented here for the sake of example only and should not be taken as a limitation of the present invention. There are three types of traffic that can occur simultaneously:

GraphicsCommand Loop packets from a LoopInterface chip to one or more LoopDraw chips;

DrawPixel Loop packets from one LoopDraw chip to one or more other LoopDraw chip(s);

VideoPixel Loop packets from a LoopInterface chip to a LoopDraw chip, VideoPixel Loop packets from one LoopDraw chip to another LoopDraw chip, and VideoPixel Loop packets from a LoopDraw chip to a LoopInterface chip.

Note that the all three of these traffic types occurring at the same time is not an exceptional case, it is the expected usual case, thus it is the one that the overall design of the system should be designed around.

Bandwidth Required by GraphicsCommand Loop Packets

The relative bandwidth required to pass GraphicsCommand Loop packets compared to that of other Loop packet types can vary enormously. A GraphicsCommand Loop packet specifying a single triangle could generate upwards of 2 million DrawPixel Loop packets (full screen triangle), but it could also generate only a single DrawPixel Loop packet, or even none at all. More typical load ranges will vary from production of one pixel to production of 100 pixels, e.g., most drawing operations will be in the range of one pixel non-textured triangles through 100 pixel area textured triangles. So in all but a few extreme cases, the relative amount of bandwidth taken up by GraphicsCommand Loop packets should be well less than that of the DrawPixel Loop packets, and also well less than that of the VideoPixel Loop packets.

GraphicsCommand Loop packets may be limited by the bandwidth of the host interface (the connection from the host computer) to the 3d graphics hardware accelerator. The bandwidth of the LoopLink is usually far higher than any host interface bandwidth. Unless a application software has explicitly sent display list over to be cached within the 3d graphics hardware accelerator, most GraphicsCommand Loop packets seen by the ring on a given frame are created by graphics driver command messages explicitly sent by the host computer over the limited bandwidth host interface to the 3d graphics hardware accelerator. In this case, as the bit rate of the host interface is likely much less than the bit rate of the LoopLink, in all likelihood the bit rate of the GraphicsCommand Loop packets generated by the LoopInterface chip in response to graphics driver command messages that are sent over the host interface of the LoopInterface chip will also in all likelihood be much less than the bit rate of the LoopLink. Only in cases in which the host computer has sent display lists over to be cached on the 3d graphics hardware accelerator would it be possible for the 3d graphics hardware accelerator to see GraphicsCommand Loop packet ring traffic requiring a large amount of bandwidth on the LoopLink.

To be quantitative, most of the next generation host interfaces will likely have maximum sustainable bandwidths in the one to two gigabyte per second range: 8 to 16 gigabits per second. The aggregate traffic of the GraphicsCommand Loop packets present a lower bandwidth demand on the LoopLink in comparison to the aggregate Loop packet traffic of the DrawPixel Loop packets and the aggregate Loop packet traffic of the VideoPixel Loop packets.

Bandwidth Required by DrawPixel Loop Packets

The desired pixel fill rate as an example for the system in one embodiment is one gigapixel per second, at a sample density of 16. In a DrawPixel Loop packet consisting minimally of 4 12-bit component values (plus some address information and packet header), this is a minimum of 50 bits, and probably a few bits larger. (In other embodiments, more than one shaded component value may have to be sent to a LoopDraw chip for it to perform the pixel fill. In these embodiments, the number of bits per pixel filled could increase to significantly more than 50.)

If all DrawPixel Loop packets had to traverse every LoopLink, a gigapixel per second would require 50 gigabits per second of bandwidth per link.

However, in a ring of n LoopDraw chips, only 1/n DrawPixel Loop packets have to traverse all n LoopDraw chips before being consumed, only 1/n DrawPixel Loop packets have to traverse n−1 LoopDraw chips before being consumed, etc., and finally 1/n DrawPixel Loop packets never leave the LoopDraw they were generated by. The asymptotic value for this sequence is ½, so a rendering rate that requires m DrawPixel Loop packets to be generated will see an average traffic of only m/2 DrawPixel Loop packets on any given LoopLink.

So the expected traffic on the LoopLink to support our gigapixel fill rate will be closer to 25 gigabits per second. Still, these Loop packets present the single largest bandwidth demand on the LoopLink.

Bandwidth Required by VideoPixel Loop Packets

VideoPixel Loop packets need to be processed at the same rate as video output signal video format pixel rates (a little less if the horizontal retrace time is also used for transmitting data within the ring). So the required VideoPixel Loop packet rate is ~135 mega pixels a second to ~240 mega pixel per second. These are the video format pixel rates required to support the video signal formats of the range of 1280×1024 76 Hz to 1920×1200 76 Hz.

The size of a VideoPixel Loop packet depends on the details of the numerics of the partial convolution function each circuit takes, but four 24-bit sums is a good approximation. This implies ~13 gigabits to ~23 gigabits per second. These Loop packets present the second largest bandwidth demand on the LoopLink.

(If chromatic aberration color correction is enabled, these numbers may rise by a factor of two.)

Total LoopLink Loop Packet Bandwidth

Adding the maximum numbers, we have 16 gigabits for GraphicsCommand Loop packets plus 25 gigabits for DrawPixel Loop packets plus 23 gigabits for VideoPixel Loop packets, for a sum total of 64 gigabits per second.

However, 64 gigabits a second is less than the actual bandwidth achieved when you create a local memory sub-system from eight parallel DRAM chips with 32-bit data buses running at 320 MHz (8*32*320M=82 gigibits/sec). In fact, the DRAM bandwidth number is higher than stated here, because there are also address and control busses. Of course, there is both an input and an output LoopLink on the same chip that has all the control pins for this DRAM local memory sub-system.

Any pin I/O technology that supports 64 gigabits per second both in and out of a single chip is a viable candidate for implementing the LoopLink physical layer.

One such candidate is the current 2.5 gigabit serial links used for a variety of high speed interfaces for CMOS chips. Assuming that multiple 2.5 gigabit per second links are employed at the pin level, this would take 26 such links, on both the input and output LoopLinks of any Loop architecture chips.

The 2.5 gigabit number is from year 2001 shipping chips. With advances in manufacturing, a product aimed at production in a later year should be able to assume a higher number, not just in clock rates, but also in the use of more than two voltage levels per pin.

Physical Wiring

The regularity and exclusively point to point wiring of the Loop architecture's LoopLinks presents some intriguing new options for the physical construction of commercial Loop systems. This portion of the document will explore both a traditional PC board building approach as well as a more packaging speculative option.

The Traditional Approach

Figure 8:
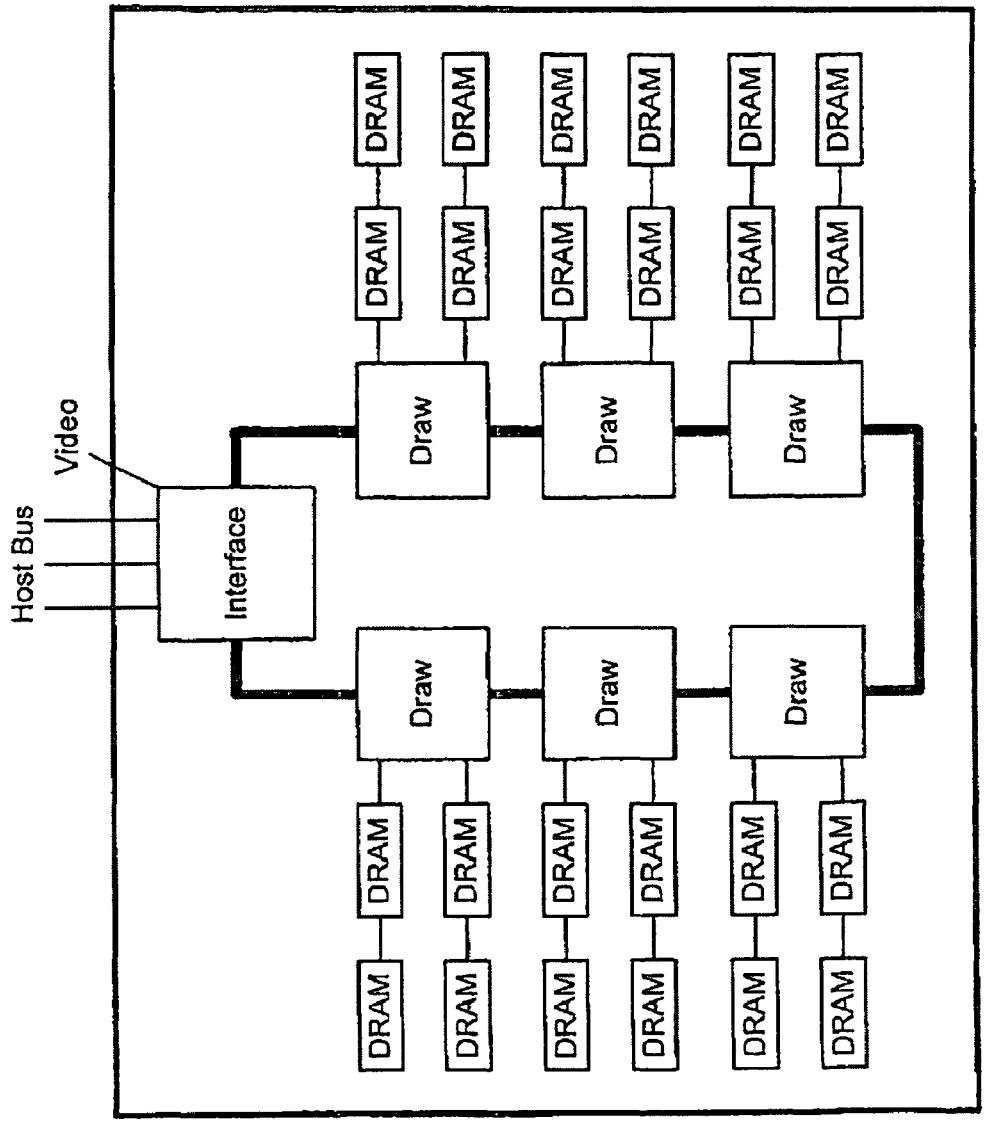
FIG. 8 shows an example of a six LoopDraw chip layout.

The traditional approach to building frame buffer cards for the Loop architecture would be to build one big PC board, the result would look similar to that shown FIG. 8. For simplicity only six LoopDraw chips are shown. But boards with 8, 16, or even 32 to 64 or more LoopDraw chips would be similar, though perhaps implementations having larger numbers of LoopDraw chips would add some LoopDraw chips to the top and bottom of the ring.

This design has the advantages of being formed on a single PC board, and having easy air flow for cooling coming from most any direction. However, this entire large complex PC board is very likely to be required to be changed to accommodate most any changes in the individual sections.

The Non-Traditional Approach

It seems a pity to have to build so many nearly identical replications of a single LoopDraw chip and memory sub-system on a single large PC board. It would be much simpler for manufacturing, testing, stocking, debugging, customizing, etc. if just the basic LoopDraw chip and connected DRAM block could be a simple small PC board of its own. This small PC board would have only a small number of short distance signals that would have to come off it and attach to the previous adjacent and next adjacent boards in the ring.

The LoopLink interconnect pins that this small PC board would need for connections are all running at 2.5 GHz or faster. Technically, what is needed are waveguides, not wires. But, in one embodiment, soldered on coaxial connectors should be able to perform this function.

Figure 9:
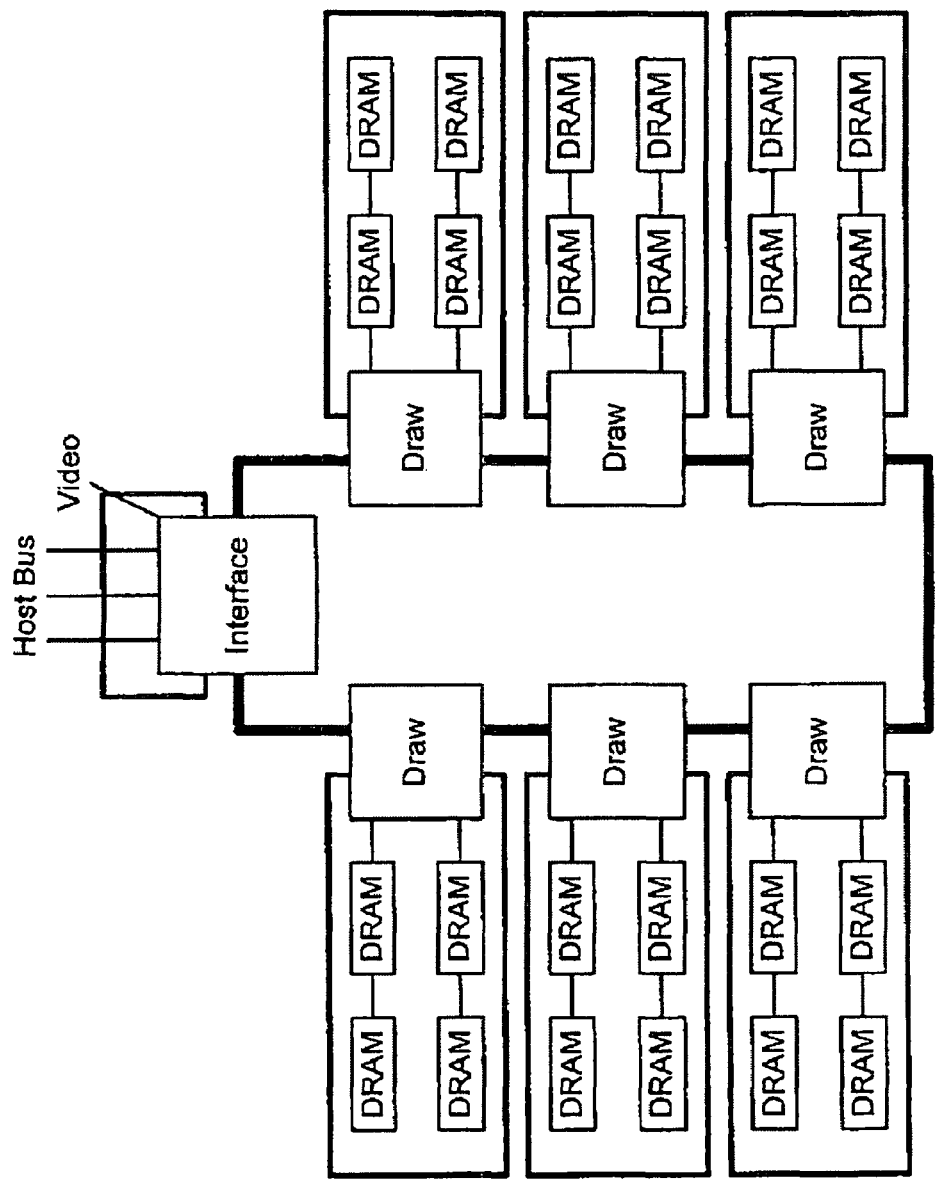
FIG. 9 shows an example of a six LoopDraw chip printed circuit daughter board layout.

FIG. 9 shows this alternative physical construction: six identical small, simple LoopDraw PC daughter boards, all attached to each other by a number of coaxial cables. In the figure, the group of cables that form the LoopLink connection are represented by a single black line. In actuality, this would be an approximately 28 wide ribbon coax. In FIG. 9, the LoopDraw chips are shown as hanging off the edge of the PC daughter boards. This is not mechanically advisable. The point here is to show that due to the use of high speed serial links, the number of connections that have to made to couple each LoopDraw chip into the ring (e.g., two connections per LoopDraw chip) is small enough that the old PC board and connector approaches to manufacturing may be able to be improved by alternative techniques.

Figure 10:
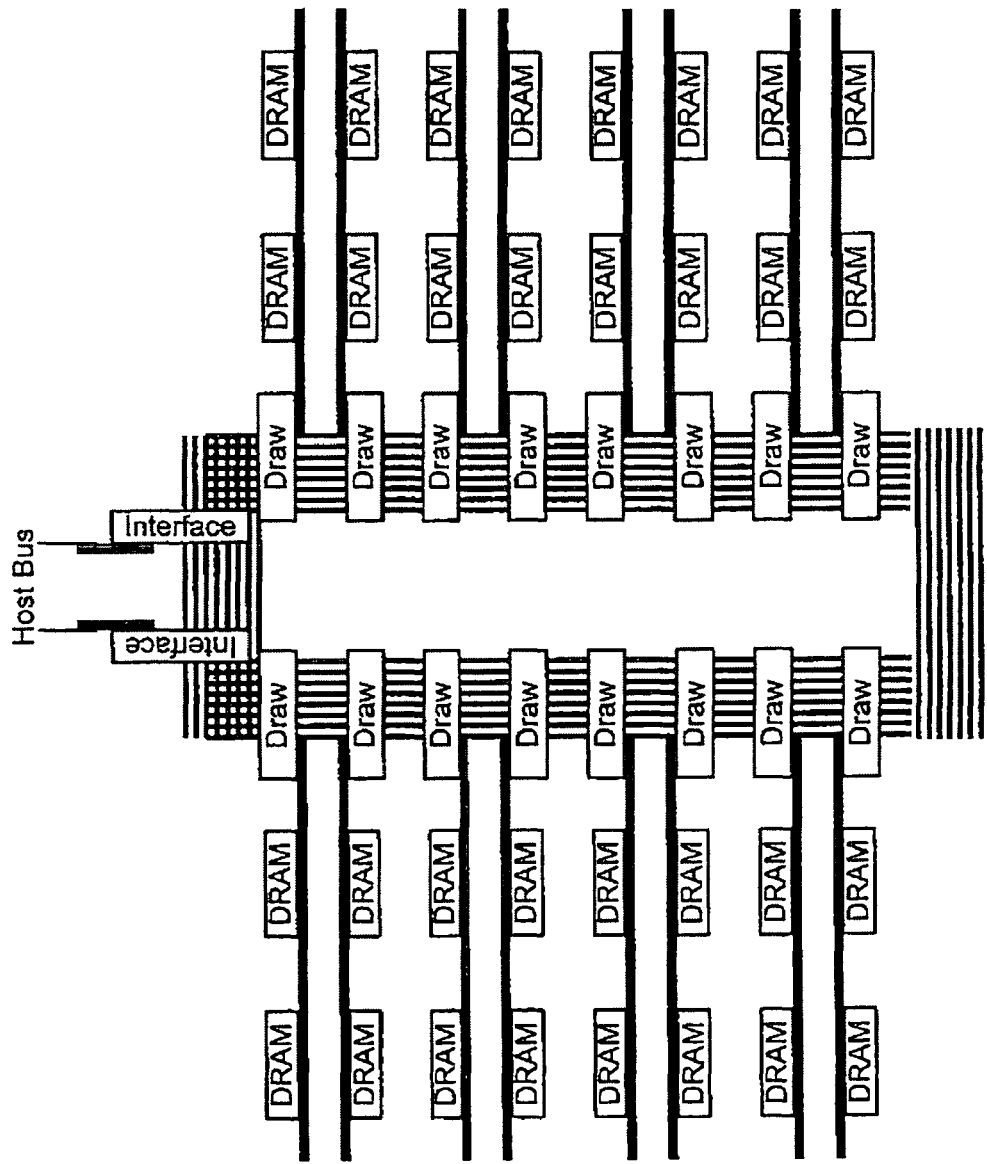
FIG. 10 shows an example of a printed circuit daughter board on edge layout.

But now that we have these separate PC boards, there is no reason to require them to be located on a single plane. FIG. 10 shows what is possible when these cards are turned on their side, every other one reversed, such that adjacent boards are either coupled "top-to-top" or "bottom-to-bottom." FIG. 10 shows a sixteen 16 LoopDraw, 2 LoopInterface chip printed circuit daughter board on edge layout. Here, the point to point wires are wired straight from one LoopDraw chip to the next LoopDraw chip. This is done by making the pin-outs of the input and output LoopLink interface mirror images of each other. Here a design with a full 16 LoopDraw chips are shown, plus 2 LoopInterface chips (the total number of connected daughter boards should be even for the mirroring wiring to line up). The air flow now may be horizontal across the diagram, e.g., either from left to right or from right to left.

Figure 11:
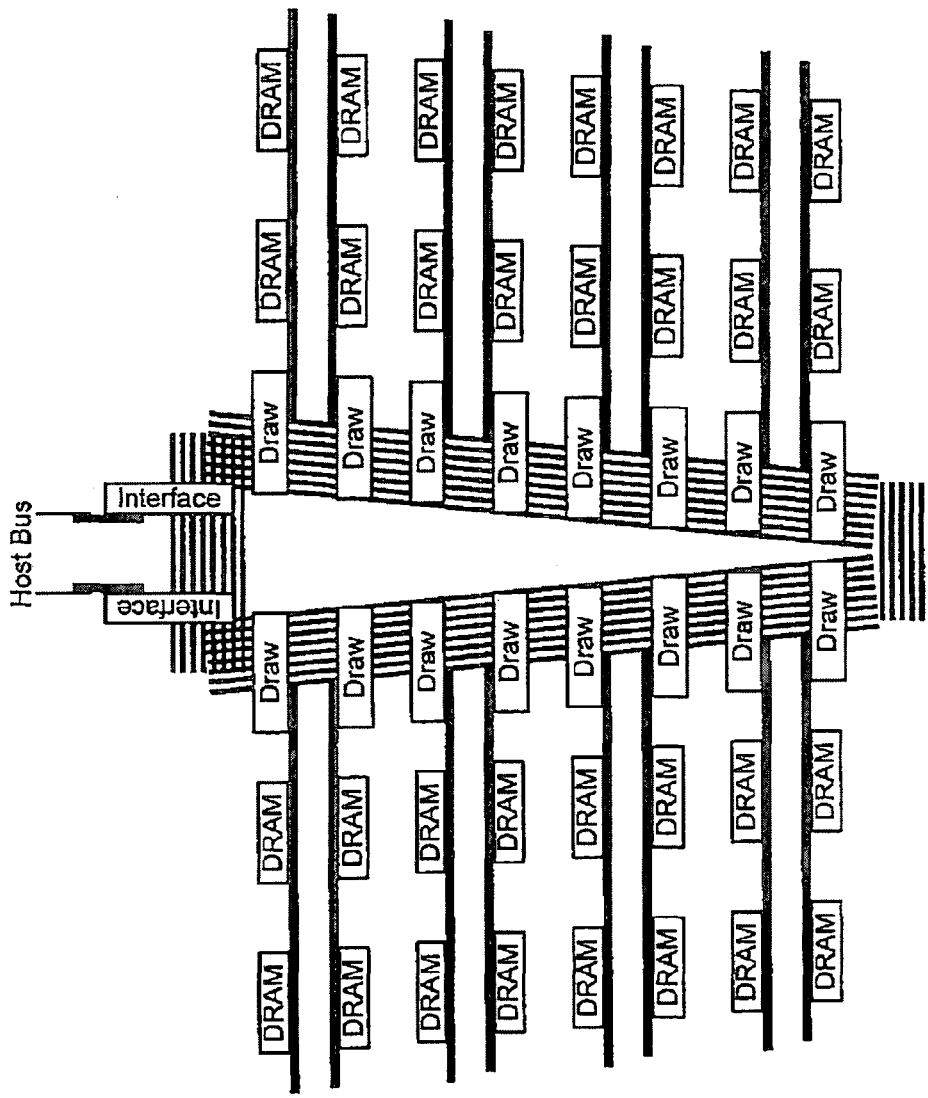
FIG. 11 shows an example of a printed circuit daughter board on edge 'V' layout.
Figure 12:
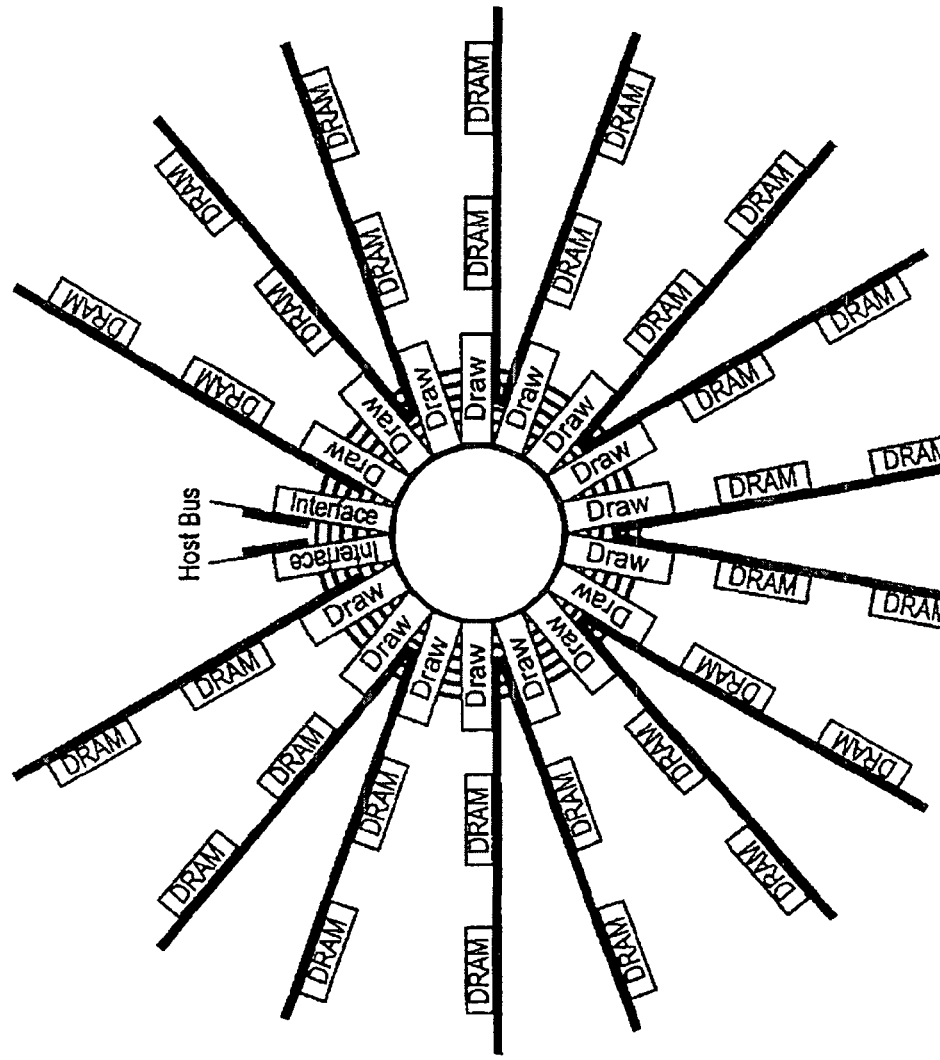
FIG. 12 shows an example of a printed circuit daughter board radial on edge layout.

The wires at the bottom are only crudely drawn, but would be the longest connection. This could be fixed as seen in the next diagram, FIG. 11, which shows a sixteen LoopDraw, 2 LoopInterface chip printed circuit daughter board on edge 'V' layout FIG. 12 uses the same cards and mirrors FIG. 11, but now arranges the cards in a circular manner to show a sixteen LoopDraw, 2 LoopInterface chip printed circuit daughter board radial on edge layout. This layout has the same airflow advantage as that of FIG. 11, but the length of wires at the bottom is beneficially reduced, limiting the maximum wire length. This is an even more optimal design possible, from the point of view of connection length and uniformity. This design has even shorter wire lengths, but the cooling may have to blow through the ring, and the Loop chips, which may need the most cooling, are all located in a confined space.

The physical constraints of pin locations on chip packaging is an important design consideration. Optimal wire length is achieved with pins on both sides of the package for the top-top, bottom-bottom daughter board configuration. (This would also make it easier for a package to support large numbers of signal pins.) The FIG. 13(a) and FIG. 13(b) diagrams show a simplified IC package input and output connectors from both sides. The LoopLinkInputPort input pins are labeled "i00" etc. in a 2d array; the LoopLinkOutputPort output pins are labeled "o00" etc. in a 2d array. Thirty-five pins for each are shown to simplify the illustration. The actual number would be larger to account for each signal being a balanced pair, and the required nearby power and ground pins.

Positions of Pads on Both Sides of Chip Package for Flipped Back-to-Back LoopLink Connections.

Note that all the output pins appear at mirrored locations to the input pins. Thus, when the chip sides are reversed, the wiring from chip to chip becomes a set of very straight wires in space. Indeed, the external wiring length could be kept to distances not too different than the internal wires from the input/output driver pads on the surface of the silicon chip to the external (solderable) pins on the hermetically sealed IC package.

Again, while this is a third property of the Loop architecture, real world packaging constraints will determine if this is something worth taking advantage of in a production product. Some transmission line setups require explicit resistors for termination, and these may be fabricatable off-chip; and therefore may be external or built into the packaging.

Multiple Ring Support

The examples so far have been for a single simple ring. System architectures for rings with 8 to 64 or more LoopDraw chips could be designed by one skilled in the art without departing from the spirit of this invention. But what about rings that support one or more sub-rings? This section will describe how multiple simple rings can be connected together using host interfaces, e.g., the host interfaces don't have to connect to a host computer, they can also be used to connect to other simple rings. The next portion of the document will discuss using additional non-local high speed interconnects to perform much the same function. There will be many similarities between the concepts in this section and the next portion. The differences are more a matter of degree; this section describes connecting simple rings using data paths with significantly less bandwidth than the LoopLink; the next portion describes connecting simple rings using data paths with the same or close to the bandwidth of the LoopLink. Indeed, in one embodiment the additional data paths are just additional LoopLinks. First, let us change our graphical notation to a little more abstract.

Single Ring Schematic.

Figure 14:
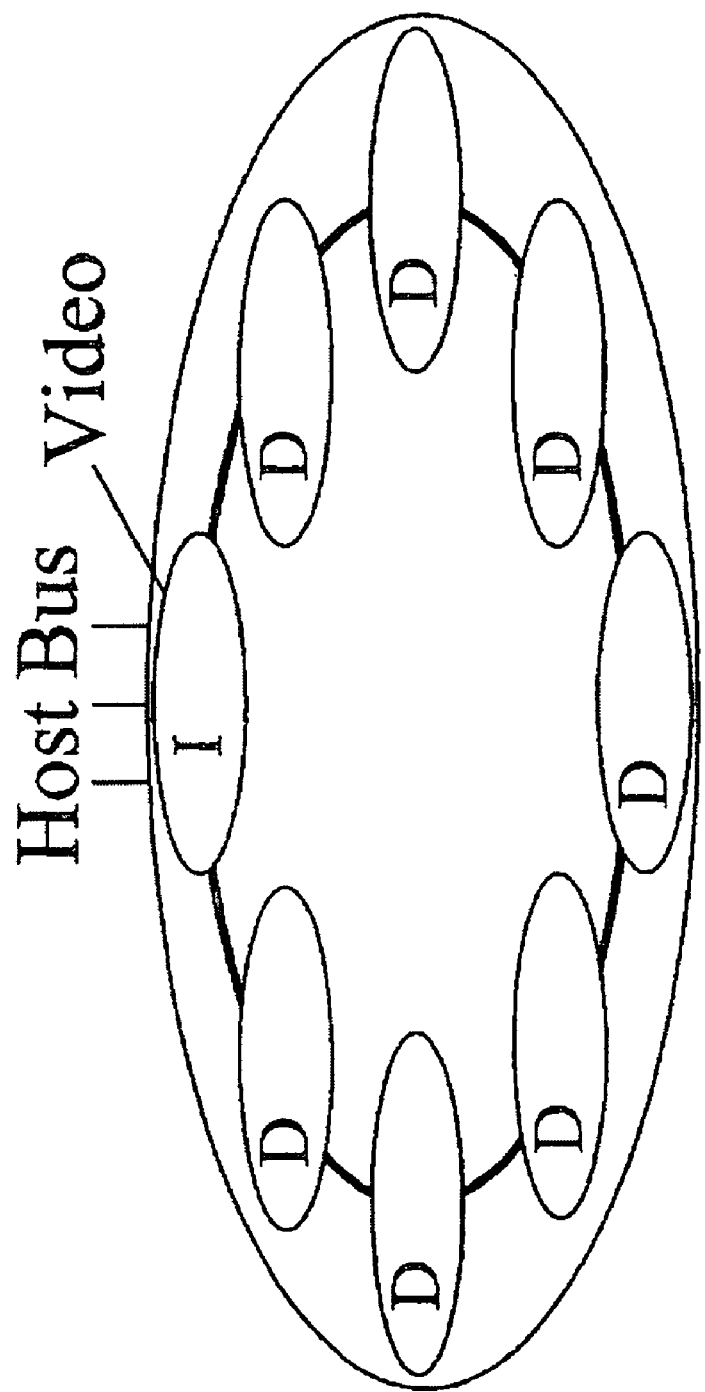
FIG. 14 shows an example of a single ring schematic.

FIG. 14 shows a ring with one LoopInterface chip I1 and 7 LoopDraw chips D1-7 in 3d perspective. The DRAM chips attached to the LoopDraw chips are not shown.

Figure 15:
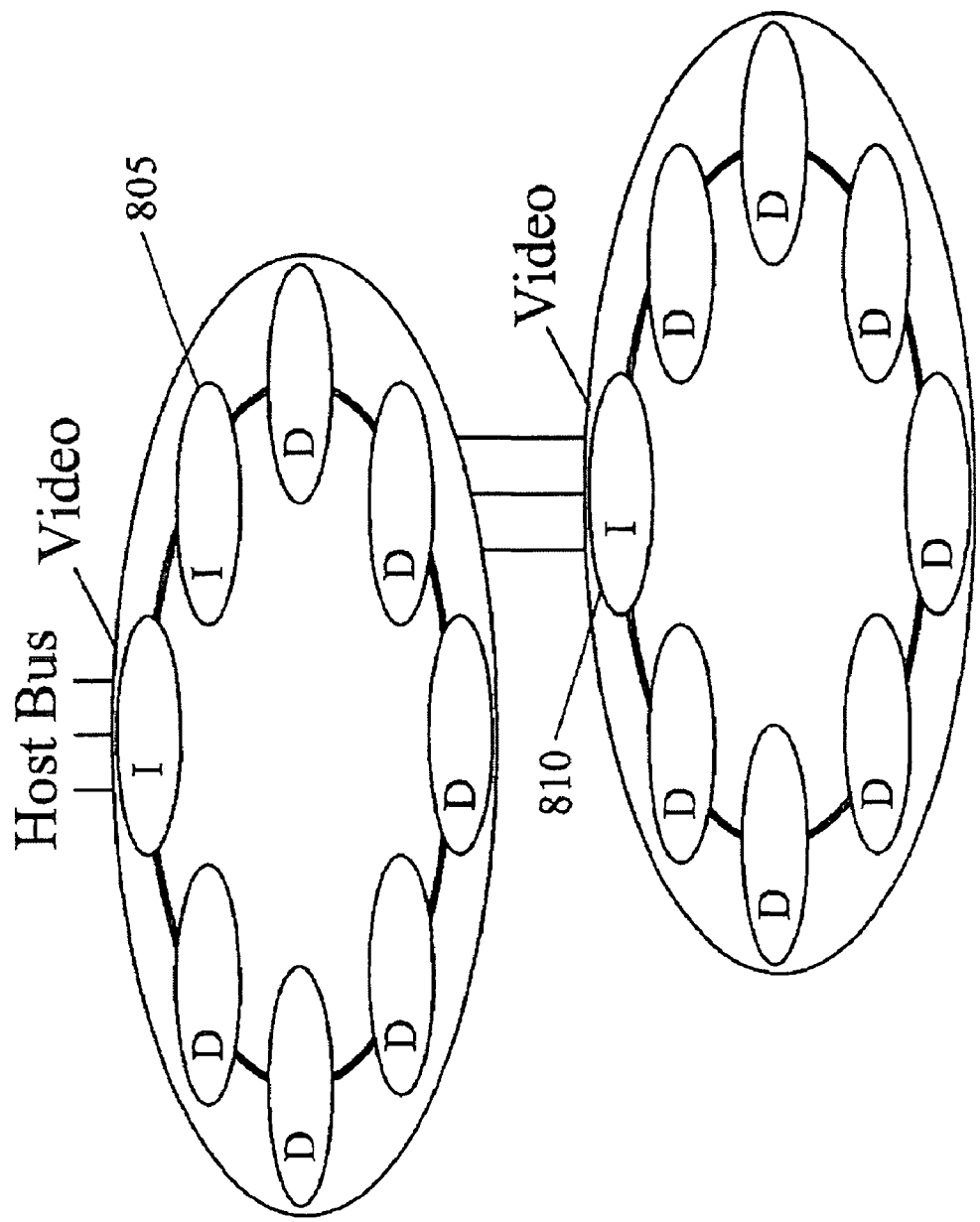
FIG. 15 shows an example of a double ring schematic.
Figure 16D:
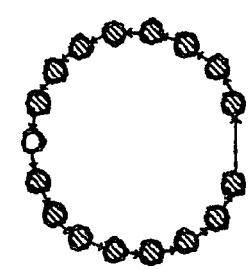
FIGS. 16(a)-16(k) show different shortcut connections, and different ways of drawing the same connections.
Figure 16C:
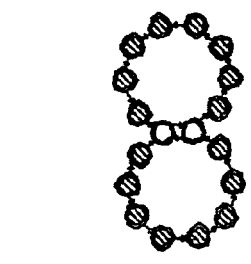
Figure 16B:
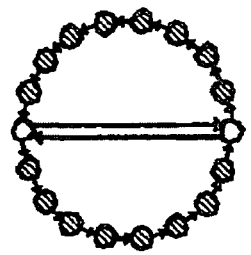
Figure 16A:
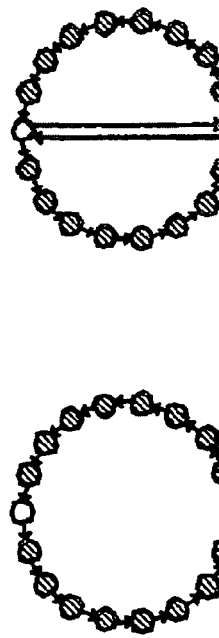
Figure 16G:
Figure 16F:
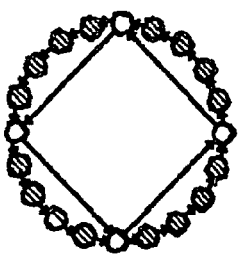
Figure 16E:
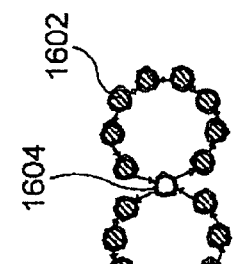
Figure 16H:
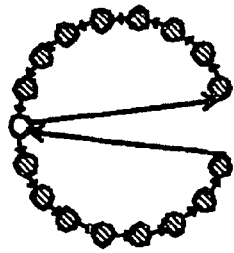
Figure 16K:
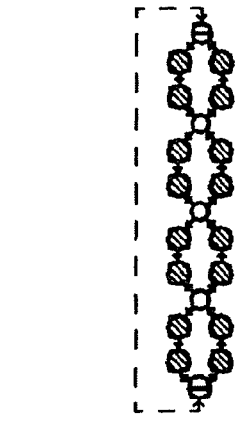
Figure 16J:
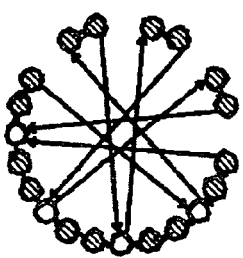
Figure 16I:
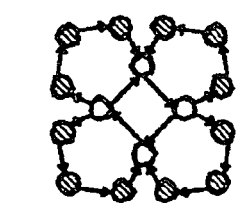

FIG. 15 shows a double ring system, with the second ring connected ring via a second LoopInterface chip in the first ring:

Double Ring Schematic.

The presence of 6 and 7 LoopDraw chips in these rings is only for ease of illustration. Typically, the number of LoopDraw chips is a power of two regardless of the number of LoopInterface chips present.

In FIG. 15, a second LoopInterface chip 805 has been added to the first ring in order to connect to/from the LoopInterface chip 810 on the second ring. This is possible because the host interface is by definition a fully functional bidirectional inter-system bus. An important point is that the host computer only connects directly with the first ring.

The second ring could be a logical second 3d graphics hardware accelerator, with its own video output interface, and the ring to ring link via the two LoopInterface chips just used to avoid having two host computer interfaces. The trade off is that both ring systems have to share bandwidth to/from the host computer over a single link. In the special case of stereo support, where one ring computes the left eye view and the other the right eye view, the application software and the graphics driver can ensure that most of the graphics driver command messages sent from the host interface are identical for both the rendering of left eye view and the rendering of the right eye view. This means that there would be a small amount of non-identical graphics driver command messages meant for only one or the other of the two rings, and then a large amount of graphics driver command messages that would be sent only one with the intention that they be processed by both rings. (This is in effect a multicast of graphics driver command messages rather than the more usual unicast of such.) Thus, two parallel rendering could be performed by two parallel local rings without taking up much more host interface bandwidth than a single rendering would have.

Another alternative is that the second ring is a sub-processor for the first ring. It could be computing shadow maps, reflection maps, etc., so long as the special view matrices for these rendering computations can be known a (partial) frame ahead of the final rendered image's rendering.

Adding an additional LoopInterface chip to a ring allows for the connection to another LoopInterface chip within another ring. In computer science connectivity terms, the class of structures that can be built is an arbitrary connected graph (also called a network), not just a ring or a directed acyclic graph. And since LoopInterface chips can be cabled over to host computers wherever is desired, there does not have to be an equivalent to single "root" to the graph. Thus, the architecture and the packaging of the invention impose few limits on the sort of connected structures than can be formed.

Partitioning into Boxes

The packaging at the box level of a simple ring or a more complex collection of rings will now be discussed. While complex multi-ring structures could be packaged within one chassis, there are simpler ways to support arbitrary graphs.

Assume for the moment that a simple ring, but with multiple LoopInterface chips is packaged as a standard into a 2 U rack mount box with internal power supply: a 2 U GraphicsSlab.

All of the signals for external I/O to and from the LoopInterface chips inside the GraphicsSlab 2 U box need to brought to standard connectors on the back of the box. Some of these standard connectors would be video output interfaces. Other connectors would be standard host interface connectors. One or more of the host interface connectors in the back of the box could have external cables plugged into the connectors, the other end of the cables would attach to one or more host computers. But it is also possible that one or more of the host interface connectors in the back of the box could have external cables plugged into the connectors, where the other end of the cable is not connected to another host computer, but instead connected to the host interface connector in the back of another different GraphicsSlab box in the same or a nearby rack. Thus, using just a single standard product, such as a 2 U GraphicsSlab with 16 LoopDraw chips and 3 LoopInterface chips, a very large number of different topologies of graphs of rings can be constructed using only cabling. (And of course, some configuration software.) These configurations may be user customizable, rather than factory customized.

Shortcuts

Most of the detailed discussion so far has focused on how rendering computations can be distributed across a number of Loop chips that are connected in a simple ring, e.g., each Loop chip only connects to the Loop chip immediately preceding it in counter-clockwise order, and the Loop chip immediately following it in counter-clockwise order. This portion will focus on how additional non-local connectivity paths mentioned previously could actually be used to improve the performance of some aspects of the rendering process.

Optimal Loop Packet Flow

The simple ring connectivity is well balanced for computational processes that can be structured as stream processes, e.g., computational data flows sequentially through all the computational nodes (chips). The Loop architecture VideoPixel Loop packets fall into this category, and can account for more than one third of all the ring traffic on a simple ring. The Loop architecture GraphicsState Loop packets also mostly fall into this category, but usually do not amount to a significant amount of ring traffic.

The Loop architecture GraphicsPrimitive and DrawPixel Loop packets are not best served in a stream format; they would consume less bandwidth in a connectivity scheme where point to point transmission is more optimized. These two Loop packet types can account for between half and two thirds of all the ring traffic on a simple ring, accounting for higher percentages when larger numbers of LoopDraw chips are in the ring. Thus, adding non-local connectivity to a simple ring would help with these Loop packet types the most.

Shortcuts

Various embodiments add non-local connectivity to a simple ring in a number of different ways. One embodiment might add non-local connectivity to all LoopDraw chips. While this approach is the most direct, it adds additional pins to the Loop architecture chip type that can least afford them, and adds more additional connectivity than is usually needed.

The most "pure" embodiment would be to create a new Loop architecture chip type—a "Cross" chip that would have the usual LoopLinkInputPort and LoopLinkOutputPort LoopLinks, but which would also have additional LoopLink interface pins beyond the usual two. These additional LoopLinks could then be used to add the desired non-local connectivity. The main limitation of this approach is that it adds another new custom chip design to the engineering efforts necessary to build a commercial implementation of the Loop architecture, in exchange for some increases in the supportable amounts of ring traffic in a system.

A compromise approach would be an embodiment that instead adds the desired additional non-local connectivity to the standard LoopInterface chip design. While the LoopInterface chip also already has to support a large number of interface pins, it is not as loaded as the LoopDraw chip. A given system configuration would contain many fewer LoopInterface chips than LoopDraw chips, so raising the cost of the LoopInterface chips would have much less of an overall cost impact. In addition, in some embodiments many of the existing pins that support the host interface on the LoopInterface chip design could be reused as pins in the implementation of the non-local connectivity interface.

One brief note on the interface details of these non-local interfaces. All of these non-local interfaces have to be compatible at some level with the LoopLink interface, as the same Loop packet types have to traverse both interfaces. But depending on the circumstances, because the most desirable connection between non-local interfaces are to other non-local interfaces, in some embodiments the non-local interfaces do not have to have the same data width and pin interface as the LoopLink interface. So in order to avoid unnecessarily constraining the non-local interfaces to be identical to LoopLink interfaces, they will not be referred to as LoopLink interfaces, even though that would be one such embodiment. Instead they will be referred to as shortcuts, a name close to their function in Loop systems.

Examples of Added Shortcuts, Including Different Shortcut Connections, and Different Ways of Drawing the Same Connections FIGS. 16(*a*)-16(*k*) shows a number of different ways of connecting Shortcuts, as well as in some cases showing two different ways of drawing the same Shortcut connections. All the examples in FIG. 16(*a*)-16(*k*) show rings containing 16 LoopDraw chips, represented by the diagonally hatched circles 1602, and 1, 2, or 4 LoopInterface chips, represented by hollow circles 1604. The LoopInterface chips are either without any Shortcut support (e.g., those that only have the standard one each LoopLinkInputPort and LoopLinkOutputPort), or a new embodiment in which every LoopInterface chip has one additional Shortcut input and output port. In some embodiments the Shortcuts may be allowed to differ from the standard LoopLink interface, however in one embodiment they are just additional LoopLink interfaces attached to the LoopInterface chip. (Which cases are which will be pointed out on a case by case basis.) In all cases, the black lines with arrow heads indicate the direction of data flow over the LoopLinks or the Shortcuts.

FIG. 16(*a*) shows a example ring with two LoopInterface chips, but no Shortcuts. FIG. 16(*b*) shows a ring with a single pair of Shortcuts, effectively allowing some unicast Loop packets to take a "Shortcut" that bypasses 8 LoopDraw chips. In FIG. 16(*b*), the added Shortcuts only connect to other Shortcuts, so the interface for the added Shortcut ports does not have to be the same as the LoopLink interface. In FIG. 16(*b*), the Shortcuts appear to be much longer wires than the LoopLink connections between the chips, but this is just an artifact of the example representation. FIG. 16(*c*) shows the same connectivity as example 16(*b*) but with the various chips positioned differently so as to minimize all the connection lengths. FIG. 16(*c*) shows only one embodiment in which the connection lengths could be kept short. Many other configurations of physical chips and printed circuit boards are possible that can still achieve this short wire length goal, if it is desired. Such alternate configurations will be apparent to one skilled in the art in accordance with the teachings herein.

In FIG. 16(*b*), two LoopInterface chips are used just to add a pair of Shortcuts. If the constraint is added that the Shortcuts must be built utilizing LoopLink interfaces, similar connectivity to FIG. 16(*b*) can be achieved. FIG. 16(*d*) shows a simple ring having a single LoopInterface chip and no Shortcuts. FIG. 16(*e*) shows the equivalent connectivity to FIG. 16(*b*), but using only one LoopInterface chip. FIG. 16(*f*) shows a shorted connecting length embodiment similar to that of FIG. 16(*c*).

The quantitative improvement in the functioning of a graphics rendering system will be discussed after some additional connection embodiments are described.

FIG. 16(*g*) shows a ring with four LoopInterface chips with Shortcuts that do not have to be the same as the LoopLink interface. In FIG. 16(*g*), the "Shortcuts" are forward jumps over four LoopDraw chips. The ring shown in FIG. 16(*h*) is very similar, except the "Shortcuts" are backward jumps over four LoopDraw chips. When the performance of these various embodiments is discussed later, it will be seen that the backward jumps improve the traffic flow more than the forward jumps. FIG. 16(*i*) is an alternative physical layout that supports shorted maximum connection lengths (similar to the ideas of FIG. 16(*c*) and FIG. 16(*g*)).

FIG. 16(*j*) shows another embodiment with the same number of chips as FIGS. 16(*h*)-16(*i*) (e.g., four LoopInterface chips with Shortcuts). The data flow of this system is better visualized in the embodiment shown FIG. 16(*k*). The connections can now be seen to be a forward and a backward ring of LoopDraw chips, with the ability to hop from one direction to the other every four LoopDraw chips. Note that the Loop-Interface chip halves on the left and the right side of FIG. 16 are the same LoopInterface chip.

The dashed double ended arrow is meant to re-enforce this. FIG. 16 may also be drawn as an outer counter-clockwise ring of eight LoopDraw chips and an inner clockwise ring of eight LoopDraw chips, with the four LoopInterface chips at the 3, 6, 9, and 12 o'clock positions, as is presented in FIG. 17. This embodiment supports even higher effective bandwidths than the others shown in FIG. 16. This ring structure, and larger generalizations of it will be called a double simple ring.

Figure 17:
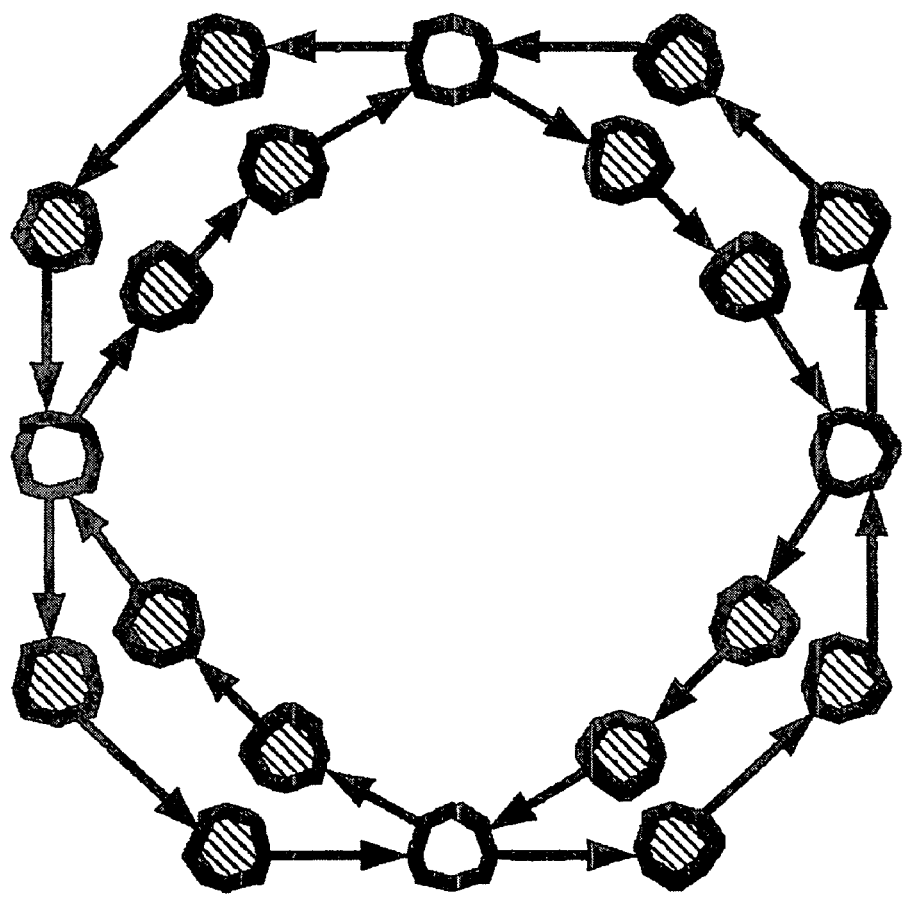
FIG. 17 is a redrawing of FIG. 16(i) as a double simple ring.

FIG. 17 is a redrawing of FIG. 16(*i*) as a double simple ring.

All these example configurations were shown for systems containing 16 LoopDraw chips. These example configurations can be generalized to embodiments containing other or larger numbers of LoopDraw chips, some of which would keep the same number of LoopInterface chips, while others would also add additional LoopInterface chips, either in the same portion as the LoopDraw chips are added, or in different proportions. One general class of these embodiments would be a generalization of FIG. 17. Distribute n LoopDraw chips as an outer counter-clockwise ring of n/2 LoopDraw chips, and an inner clockwise ring of n/2 LoopDraw chips. Insert a LoopInterface chip for bridging between the inner and outer rings every m LoopDraw chips, where m is a positive integer between 1 and n/2, and n/2 is an integer multiple of m. Slightly less regular embodiments can relax this restriction on m.

Performance with a Single Pair of Shortcuts

Consider the connectivity of FIG. 16(*b*) or 16(*e*). A local ring has had two uni-directional links added that bisect the ring connections. Now, in some cases, unicast Loop packets can take advantage of the Shortcuts to avoid traversing the LoopLinks of all the Loop chips on the ring between their source and destination Loop chips.

Assuming statistically balanced ring traffic, e.g., unicast where all source/destination pairs are equally likely occur, the following paragraph discusses the impact of adding these two Shortcuts to the local ring. The impact is that some of the Loop packets (those that would have to travel through eight or more LoopDraw chips) would get to use the Shortcut to avoid passing through 8 of the LoopDraw chips.

Our nominal assumption is that every LoopDraw chip is sending an equal number of Loop packets to every other LoopDraw chip, including itself. In the general case where there are n LoopDraw chips, without the Shortcut, on average, for additional every DrawPixel Loop packet sent per second by a LoopDraw chip, the incremental bandwidth needed per second on all the LoopLink interfaces in the ring goes up by the bit size of a DrawPixel Loop packet times $0.5*(n-1)/n \sim = 0.5$. With the Shortcut, the increment fraction is less than 0.38.

Performance of Multiple Shortcut Pairs

The following paragraphs discuss the impact on performance of the other configurations shown in FIG. 16. Consider the double simple ring (generalization of FIG. 17, and FIG. 16(*i*)). Assume that there is a LoopInterface chip for every four LoopDraw chips (e.g., only two LoopDraw chips in a row in each direction). Table 3 shows the incremental bandwidth needed per second on all the LoopLink interfaces in the ring as a multiple of the bit size of a DrawPixel Loop packet, for the case of a simple ring of size n, and for double simple ring of size n.

Several Observations can be Made from this Table.

First, the fraction $0.5*(n-1)/n \sim = 0.5$, for small n is somewhat less than 0.5 (as shown). Second, for small n, the double simple ring does not gain as much. For n=8, the gain over the simple ring is only 1.077. This makes sense, in small rings the Shortcuts have limited gain. Third, gains improve for larger values of n, but the rate of improvement flattens out for very large n. This makes sense, because the Shortcuts in this structure are relatively local. To reduce the incremental bandwidth load on for very large values of n, more global Shortcuts links would be added (e.g., not a double simple ring anymore).

Finally, for a ring with 64 LoopDraw chips, the gain of the double simple ring over the simple ring structure is almost a factor of three. And while the bandwidth demands per Loop-Draw chip for VideoPixel and GraphicsCommand Loop packets are relatively independent of n, in order to scale to higher pixel fill rates, the number of unicast DrawPixel Loop packets grows proportional to n, providing greater relief for larger values of n.

Table 3 only shows the results for values of n that are powers of 2. This was done to better illustrate the trends. The general structure also works well for many numbers in between these powers of 2, and the improvement factors scale similarly. For example, for n=48, the simple ring coefficient is 0.490, the double simple ring coefficient is 0.185.

The following paragraphs discuss how higher performance configurations can be used. The discussion so far describes the difference in marginal unicast packet capacity bandwidth cost for different embodiments of interconnections of Loop chips. The choice of a particular connection embodiment affects other system constraints. One way to make use of a given connectivity configuration would be to minimize the maximum bandwidth in distinguishing another embodiment of the LoopLink interface, e.g., reducing the number of pins used to implement the LoopLink interface, and/or using more conservative data clock frequencies.

Averaging, Simulation, and Dynamic Load-Balancing

If the LoopLink interface is not the limiting constraint, then different connectivity configurations might allow higher maximum rendering rates that others do. The relative performances between different configurations have been given under the assumption that the path length (number of Loop-Draw chip nodes hopped) that the Loop packets traverse will fluctuate about the average fast enough that the ring will almost never be in a state of overload or underload, so that all bandwidth will be utilized.

The first question is, how valid is this assumption? For graphics primitives of any significant pixel area, the statistics of the DrawPixel Loop packets will be quite uniformly distributed, and only pathological cases (like one pixel wide, very tall vertical triangles) will differ significantly from the nominal assumption. For graphics primitives with quite small pixel area the limiting factor will not be the delivery of Draw-Pixel Loop packets, but much more likely will be the maximum geometric primitive rate, in which case the point is moot.

Having said this, these sort of systems are quite amenable to fairly simple but accurate numerical simulations. Thus, the question of how closely any given configuration's likely actual performance is predicted by the nominal assumption is fairly easily verifiable prior to building the actual chips.

Finally, to take maximum advantage of the "Shortcuts", in some configurations better performance can be obtained if the algorithm for deciding which unicast Loop packets will take a particular Shortcut is not a simple "shortest-distance" algorithm, but one with static or dynamic tuning parameters.

One example of a static tuning parameter is a bypass percentage value stored in a register, where the value defines the number of eligible Loop packet actually allowed to take a Shortcut. Analysis of a particular connectivity configuration might show that the best overall performance is achieved if, say, only 80% of the eligible Loop packets actually use the Shortcut.

An example of a dynamic tuning parameter is a bypass percentage value, similar to the static tuning parameter example above, where the bypass percentage value varies and is a function of dynamic statistics of the ring traffic flow. This example is also a form of dynamic load-balancing.

LoopDraw Chip Internals

This portion of the document describes some of the internal architecture details of the LoopDraw chip.

An important part of documenting an architecture is describing usefully abstract models for thinking about it. Because the Loop architecture has folded nearly all of the traditional busses and interconnects of traditional 3d rendering architectures into a single ring; a partially unfolded model is a useful guide to understand the new architecture.

Figure 18A:
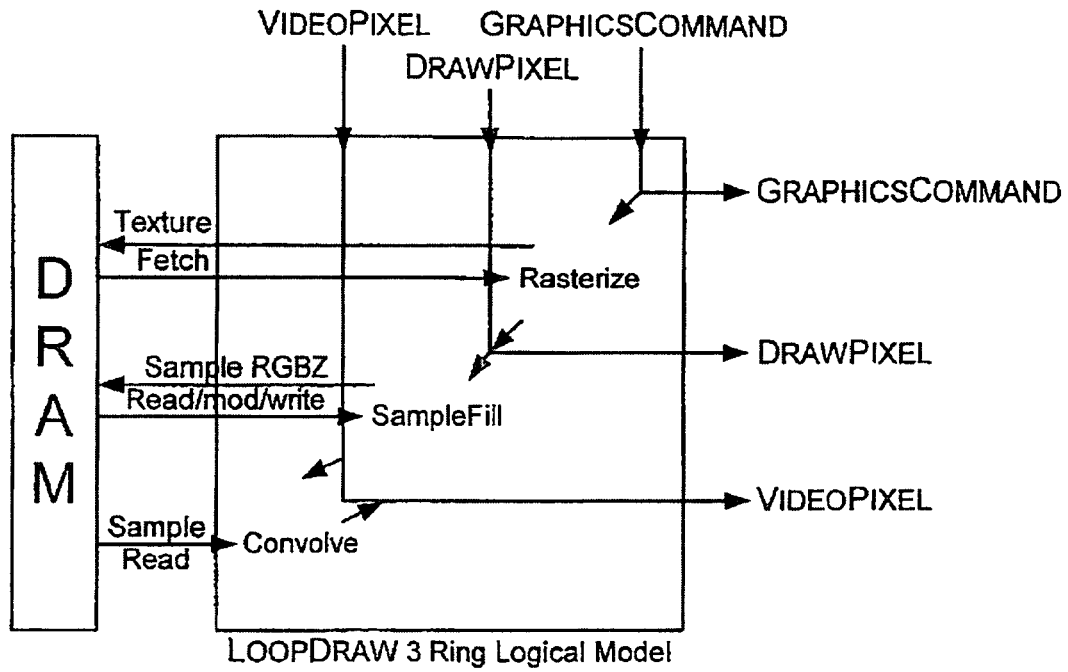
FIG. 18(a) shows a three ring logical model.

FIG. 18(a) portrays the LoopDraw chip internal block diagram as if there were three separate data transport rings running between the chips, each with its own processing section, and own direct port to the attached DRAM memory, for the purposes of clarity.

Figure 18B:
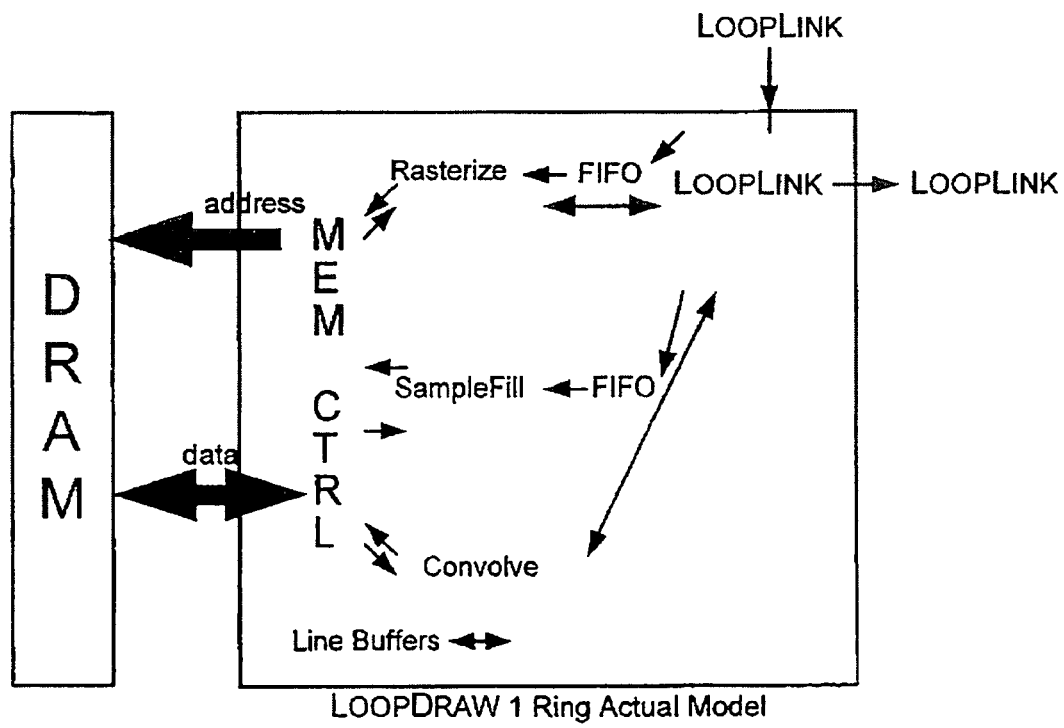
FIG. 18(b) shows a one ring physical model.

FIG. 18(b) is drawn according to the internal connections of one embodiment, with a single physical LoopLinkInputPort and LoopLinkOutputPort bringing all the Loop packets into and out of the LoopDraw chip, and a single DRAM memory controller arbitrating between the needs of the three processing sections.

The Rasterization Pipeline

By the end of the 1990's, applications were striving for more control over the rendering process. They desired to have the lighting operations moved to a per pixel basis during rasterization, and wished for more fixable control of per vertex and per pixel operations (programmable shading). Some of these desired expanded controls are starting to show up in recent products and expanded graphics APIs. So far, though, the amount of control available to applications in the per pixel programmable stage has been extremely limited.

In the coming generations, applications are assuming that much more flexible and powerful control will be available to them at programmable parts of the 3d graphics rendering pipeline.

The Loop architecture is designed to leap-frog the real-time 3d rendering technology that will be available from any source in the near term. In at least one embodiment, LoopDraw chips 3d rasterization pipeline assumes:

High sample density supersampling is always available at no reduction in rendering speed. Higher rendered image quality is delivered through the support of much higher sample densities than competing architectures.

Enough texture access bandwidth is present for several layers of complex texture to be accessed and used by programmable per pixel shaders at no reduction in rendering speed. Competing architectures typically start slowing down after one or at most two layers of simple texture are accessed in a pixel shader. These per-pixel shaders will support a much more realistic effect, and support shaders many times the length and complexity of competing architectures, at no reduction in rendering speed.

Color and geometric data within these shaders will be processed using more accurate and sophisticated numeric formats than competing architectures at no reduction in rendering speed.

The three functional blocks in the LoopDraw chip each implement a section of this pipeline:

The Rasterize block transforms incoming vertex data, and allows per-vertex application programmable operations to be applied. Geometric primitives are clip checked, and fully clipped to the viewport if necessary. After rasterization into pixels, user supplied pixel shaders will be applied to texture and light the pixels.

The sample Fill block samples the shaded pixels against the edges of the geometry, and performs a conditional sample update function on the RGBAZ values into the frame buffer.

The Convolve block applies an application supplied circularly symmetric antialiasing filter to the samples values from the frame buffer on the fly as the video output signal pixel values are being generated. This supports very high quality full screen antialiasing.

In at least one embodiment, the circuitry to implement these three blocks may all be contained within the LoopDraw chip die.

Scaling Issues

This portion discusses the trade-offs involved in supporting various forms of scalability.

Abstract vs. Actual

Sixteen LoopDraw chips in a ring has been assumed in most examples herein to make the discussion and examples simple. For some sets of assumptions about performance and scale of the Loop architecture, putting 16 LoopDraw chips into each local ring may be a reasonable trade-off between cost and performance. One such example of the suitability of 16 LoopDraw chips in each local ring, at reasonable video resolutions (1920×1200) and sample densities (16 samples per pixel), 16 LoopDraw chips supports full 60 Hz video format frame rates, and with an order of magnitude more complex pixel shader support than an equivalent technology single chip based 3d graphics hardware accelerator is likely to be able to.

The following paragraphs discuss the additional benefits and additional infrastructure support requirements if more LoopDraw chips are added into a local ring. To get a feel for the issues, consider the example at the far end of the range: 64 LoopDraw chips in a local ring. Nominally this system has 4× more frame buffer storage, 4× more pixel shader power, 4× more antialiasing output convolution power, but if the pixel fill rate is limited by the LoopLink, there is no increase in pixel fill performance.

By breaking up the pixel fill function into tasks for 4 LoopDraw chips (rather than the one LoopDraw chips assumed in most of the previous examples), each responsible for a quarter of the samples of a pixel, we can increase the usable sample density to 64 samples per pixel with no other trade-offs in performance. The pixel fill rate does not change, but the number of samples filled per pixel go up by 4, as do the number of samples convolved per pixel, as well as the pixel shader power supportable at a given rendering rate.

Alternately, if the sample density is kept at 16 samples per pixel, but the diameter of the antialiasing filter is increased from 4 pixels to 8 pixels, 4× larger area convolution kernels are supportable, and we still also get 4× more pixel shader power. Here, the 4× more convolution power went to increasing the size of the antialiasing filter (at the same sample density), vs. increasing the sample density by 4× but keeping the antialiasing filter diameter the same (the example in the preceding paragraph). The 4× more sample write bandwidth is not used. Antialiasing filters larger than diameter 4 are of diminishing value for ordinary antialiasing purposes, but they can be quite valuable in supporting various forms of blur filters.

To make the 64 LoopDraw chips local ring support increased sample density, we had to divide the samples in a pixel between 4 different LoopDraw chips. Under these circumstances, the DrawPixel Loop packets now are multicast to the appropriate quartet of LoopDraw chips, rather than unicast to a single specific LoopDraw chip. This cannot be done without trade-offs; some very minor additional circuits and modes need to be supported by the LoopDraw chips that are not needed for local ring less than or equal to 16 LoopDraw chips were to be supported.

A slightly larger change is the additional buffering and working contexts needed in the system. Because now each LoopDraw chip could be receiving a DrawPixel from one of 64 rather than 16 LoopDraw chips (including itself in both cases), there must be 64 rather than just 16 graphics primitive drawing contexts. These contexts are not very large; in one embodiment the triangle drawing context consists of 3 fixed point control vertices and floating point plane equation for Z, plus perhaps a few bits for storing current render semantics settings. On the buffering side, the ring system has to be prepared to work within the 4× longer latencies for round trip ring communication. At the implementation level, this means that various internal queues who (optimal) sizes depend on the amount of time a round trip around the local ring takes would have to be made some amount larger.

There are dimensioning returns and growing implementation taxes for a particular implementation of the Loop architecture to have the ability to support rings of sizes much larger than 64 LoopDraw chips. It is quite possible that most systems applications would find that past somewhere in the range of 16 to 64 LoopDraw chips, the application could have higher overall system performance if the additional LoopDraw chips were used to build multiple connected local rings of smaller size, rather than increasing the size of a single ring. It is important to note that this rule is a consequence of the deliberate architectural decision to not support scaling of pixel fill bandwidth within a single ring in one embodiment.

The previous discussion treats the case of moving up to 64 LoopDraw chip rings. The following paragraphs discuss numbers between 16 and 64. If rather than dividing the samples in each pixel four ways, they can be divided two ways or three ways. This supports pixel sample densities of 32 and 48 samples per pixel. Other details and trade-offs within these intermediate size ring systems are similar to those described for the 64 LoopDraw chip size local ring cases discussed previously.

Above, when the phrase "dividing the pixel's samples" by 2, 3, or 4 ways" was used, no fixed assumption about how the dividing is done was implied. For example, the 4 way dividing could partition the 64 samples into 4 equal size non-overlapping quadrants of the pixel. Alternatively, the dividing could have been by sample sequence number, resulting in each LoopDraw chip receiving samples pseudo-randomly positioning anywhere within the boundaries of system. This detail does make some minor difference on how the dividing up interacts with the mechanism that pseudo randomly perturbs assigned subpixel locations of the samples in a pixel.

So far the discussion has been in scaling system up from 16 LoopDraw chips. The following discusses the reverse: scaling down to 8 or 4 LoopDraw chips. The implementation detail implications of supporting a lesser number of LoopDraw chips depend on how these lesser systems are to be used. The system implementation optimization assumption that downward scaling runs into is the layout and batching of the sample memory in DRAM. So long as one knows that the smallest operation that will ever be performed upon the samples in a pixel is the read-modify-write of all the samples, the DRAM memory system can have various page and cache assumptions built into its operation, based on the "known" minimum number of samples in a pixel supported. (These assumptions can't be too severe, as the same memory subsystem has to be also used for texture fetch.) If the optimized "single long cycle" is 4 or 8 rather than 16 samples, then systems with 4 or 8 LoopDraw chips in the ring would be more easily supportable.

Convolution also is a factor in play. With fewer than 16 LoopDraw chips, a local ring can no longer support the same complexity of antialiasing filters. The trade-off can become complex, as one must consider both diameter 4 filters but with a sample density less than 16, as well as lower diameter than 4 filters but with sample densities still as high as 16 or even greater (at lower overall video format pixel rate, e.g., XVGA, NTSC).

Once again there are few "hard" limits, but rather there is a series of trade-offs based on constraints imposed by relatively low level implementation details. There are no absolute arguments for placing a hard lower limit on the number of LoopDraw chips. But gathering the constraints and trade-offs that bear upon the engineering decision of the minimum number of LoopDraw chips local ring configurations to be fully supported in a given embodiment is useful.

From a practical point of view, there are legitimate markets for system with less than 16 LoopDraw chips in a ring. First and foremost, as will be described elsewhere, in some cases a ring with 16 or more LoopDraw chips might be (temporally) partitioned into multiple ring segments each driving a relatively low resolution physical image display device. In addition, there are a few price sensitive market segments that would never the less be willing to pay some premium for a Loop architecture system with 8 or 4 LoopDraw chips: editing and broadcast NTSC and PAL applications are one such market segment.

Scaling Limits in 3d Graphics Architectures

Some technologies scale vary easily. For example, if a toy manufacture needs higher voltage and/or power from the batteries that are power a new version of a toy design, all the manufacture has to do is expand the battery compartment to take eight standard batteries rather than four batteries. The toy manufacture does not have to have a special larger battery custom manufactured and distributed around the world. Thus, one can say that the current (standardize) battery designs (A cell, AA cell, etc.) are highly scalable. Other technologies do not scale as well. For example, a motorcycle manufacture cannot build a more powerful motorcycle by attaching two 250 cc engines to a single motorcycle rather than a single 250 cc engine. Rather, the motorcycle manufacture has to custom design a 500 cc engine, though some sub-parts might be shared with the smaller engine. Historically, 3d graphics hardware accelerators have been more like motorcycle engines then like A cell batteries. This portion discusses some of the constraints on scaling both general purpose computers and 3d graphics hardware accelerators, and points out that the constraints on scaling for 3d graphics hardware accelerators are not as fundamental as one might think (e.g., the teachings of the embodiments of the current invention will allow 3d graphics hardware accelerators to scale more like batteries than motorcycle engines).

How 3d Graphics Differs from General Purpose Computing

Most computer programs written to run on general purpose computers are inherently serial, that is they were written under the assumption that the programs would be sequentially executed at any point in time by a single general purpose processor element within a general purpose computer. This means that such computer programs would not be able to run any faster if the general purpose computer contained not just one, but multiple parallel general purpose processor elements. The act of taking a computer program and modifying it so that it can run faster on a general purpose computer containing multiple parallel general purpose processor elements is called parallelization. If this modification is performed by a human, then one refers to the act as "hand parallelization". If this modification is performed by a computer program, then one refers to the act as "automatic parallelization".

The quality of the parallelization, whether by hand or automatically, can be measured by the ratio of how much faster the modified program runs on a general purpose computer containing n parallel general purpose processor elements relative to n times the speed at which the original, un-modified computer program runs when run on a single one of the general purpose processor elements within the same general purpose computer that contains n parallel general purpose processor elements, for various values of n. This ratio is referred to as the speed ratio. In the perfect case, the speed ratio would be 1.0 for some range of values of n, and in this case the quality of the parallelization is called "full linear" within the given range. In the more realistic (though still rare) case in which the speed ratio is vary close to 1.0 for some range of values of n, then the quality of the parallelization is called "near linear" within the given range. In the more typical case where the speed ratio is lower than and not close to 1.0, the quality of the parallelization is called "sub-linear". (In the rare and special case in which the speed ratio is greater than 1.0, the quality of the parallelization is called "super linear".) For a particular value of n, the speed ratio times the value of n gives the "speed-up" of the computer program possible if it is run on a general purpose computer containing that value of n general purposes processors relative to running the original computer program on a single processor element in the same general purpose computer.

So far automatic parallelization of computer programs has proved to be impossible to achieve in practice for most computer programs. If it is desired for a particular program to run significantly faster on a general purpose computer containing multiple parallel general purpose processor elements, then the original program must in effect be re-written by a human (generally at great expense) with the explicit goal of making the modified program achieve this desire.

Modern integrated circuit chip technology has made it possible to put a relatively high performance general purpose processor element on a single relatively low cost integrated circuit chip. A chip such as this is commonly used as the single general purpose processor element within a relatively low cost general purpose computer. For a more expensive general purpose computer where cost is less of an object, it would be desirable to use general purpose processor elements that are faster than, even if more expensive than, the low cost general purpose processor elements used on the relatively low cost general purpose computers. However, once the integrated circuit chip technology allows an entire relatively high performance general purpose processor element to fit onto one relatively low cost chip, it has proven hard to build even "cost is no object" single general purpose processor elements that are more than only a little bit faster than the less expensive ones. Thus, modern higher cost general purpose computers are built out of n general purpose processor elements that are not much faster than the current low cost general purpose processor elements. These high cost general purpose computers deliver higher value to customers by allowing computer programs that have been successfully parallelized to run faster than they would on a less expensive computer, but also through other non-processor features, such as increased capacity I/O sub-systems, higher over all reliably, supporting much larger amounts of main memory, more flexible configurability, and the ability to run a large number of even non-parallelized computer programs at the same time.

But many customers do not need these extra features. They may not need large amount of I/O or main memory capacity, and may only need to run one program at a time, and most of these programs may not have every been hand parallelized, or worth the cost of hand parallelization.

Thus, the failure of automatic parallelization is one of the reasons why relatively inexpensive general purpose computers containing only a single general purpose processor element are the preferred choice for purchase to run many computer programs; the inherently more expensive general purpose computers containing more than one general purpose processor element will not run many programs any faster.

Running computer programs on general purpose computers containing one or more general purpose processor elements stands in contrast to implementing industry standard 3d graphics rendering pipelines (such as OpenGL™) within a 3d graphics hardware accelerator. It is a natural question if the same parallelization limits exist; e.g., once a relatively high performance standard 3d graphics rendering pipeline can be implemented on a single relatively low cost integrated circuit chip, does it become impossible to build a standard 3d graphics rendering pipeline out of multiple chips that will run the standard 3d graphics rendering pipeline appreciably faster than the low cost single chip solutions, or not?

Indeed, several of the new chips created for running 3d computer games in home consumer devices: the "home gamming" market (either home PC's or dedicated 3d gaming "consoles") are relatively low cost relatively high performance single chip implementations of the standard 3d graphics rendering pipeline. But does the rest of the analogy follow?

The answer is that it does not. The reason is that the equivalent of automatic parallelization for the special case of implementing a standard 3d graphics rendering pipeline is and has been successfully achieved for decades now by computer graphics hardware architectures.

The reason is that it is possible for 3d graphics hardware to automatically chop up the single serial stream of graphics data (the normal input to the standard 3d graphics rendering pipeline) into multiple pieces that are assigned to the next available one of a group of highly parallel graphics processing sub-elements. This parallelization is automatic and invisible to the users of the standard 3d graphics rendering pipeline, and the quality of the parallelization are highly impressive: speed ratios of 0.98 (within 98% of full linear speed-up). Over the years, graphics hardware architects have discovered the conditions under which such near linear speed-ups are possible, and the conditions under which they are not possible.

While most of the most recent new 3d graphics chips are designed for the home gamming market, their internal architectures are nevertheless impressive. These home gamming chips (e.g., in the $40 cost range) have applied a wide variety of performance enhancement techniques to achieve high internal speeds and minimize the use of external pins. But unfortunately these architectures achieve this performance by precluding nearly all of the potential ways of aggregating chips together to higher levels of either quality or performance. Most of the possible techniques for achieving near linear automatic parallelization when using multiple 3d graphics chips in parallel have already been precluded by design choices to optimize the chip for use in their target single 3d graphics chip based home gamming products. These design choices include minimizing the number of pins on the chip (to achieve the low cost), the choice of internal algorithms that have implicit assumptions about their ability to control the order in which graphics data is manipulated (e.g., no other chips get a say), and design choices about the data formats supported for representing graphics data.

In contrast, the customers that comprise the medium to high-end professional markets for 3d graphics hardware accelerators prefer performance and capacity to a sub $1000 price point. Therefore, fundamentally different graphics chip set architectures must be employed. These professional markets require 3d graphics hardware accelerators with 100 times the storage capacities and performance of the home gaming chips.

TABLE 1

Number of LoopDraw chips vs. Performance

| #LOOP DRAW CHIPS | sample density | pixel shader power | pixel shader rate | Maximum video format pixel rate |
|---|---|---|---|---|
| 1 | 1 | 1/16 | 1G | 200M |
| 1 | 2 | 1/8 | 1/2G | 100M |
| 2 | 2 | 1/8 | 1G | 200M |
| 2 | 4 | 1/4 | 1/2G | 100M |
| 4 | 4 | 1/4 | 1G | 200M |
| 4 | 8 | 1/2 | 1/2G | 100M |
| 8 | 8 | 1/2 | 1G | 200M |
| 8 | 16 | 1 | 1/2G | 100M |
| 16 | 16 | 1 | 1G | 200M |
| 16 | 32 | 2 | 1/2G | 100M |
| 32 | 32 | 2 | 1G | 200M |
| 32 | 64 | 4 | 1/2G | 100M |
| 64 | 64 | 4 | 1G | 200M |
| 64 | 128 | 8 | 1/2G | 100M |

TABLE 2

Pixel Shading Rate vs. Performance

| pixel shader rate | depth complexity | physical image display device Size in Pixels | rendering frame rate |
|---|---|---|---|
| 1/2G | 3 | 1920 × 1200 | 76 Hz |
| 1/2G | 3 | 1280 × 1024 | 76+ Hz |
| 1/2G | 6 | 1920 × 1200 | 38 Hz |
| 1/2G | 6 | 1280 × 1024 | 60 Hz |
| 1G | 3 | 1920 × 1200 | 76+ Hz |
| 1G | 3 | 1280 × 1024 | 76+ Hz |
| 1G | 6 | 1920 × 1200 | 76 Hz |
| 1G | 6 | 1280 × 1024 | 76+ Hz |

TABLE 3

Incremental bandwidth scaling coefficient

| n, Number of LOOPDRAW CHIPS | Simple ring coefficient | outer/inner ring coefficient |
|---|---|---|
| 8 | 0.438 | 0.406 |
| 16 | 0.469 | 0.289 |
| 32 | 0.484 | 0.213 |
| 64 | 0.492 | 0.170 |
| 128 | 0.496 | 0.148 |
| 256 | 0.498 | 0.137 |

What is claimed is:

1. A node for use in a 3D graphics hardware accelerator implemented as a plurality of nodes connected to a ring, the node comprising:
  a loop interface for receiving packets from a neighboring node on the ring and for transmitting packets to another neighboring node on the ring;
  a memory port to a local memory sub-system;
  a render stage coupled to the loop interface and to the memory port, the local memory sub-system storing a texture store dedicated to the render stage, the render stage for receiving graphics primitive loop packets via the loop interface, executing the graphics rendering specified in the graphics primitive loop packets including accessing via the memory port the texture store in the local memory sub-system as required by the graphics primitive loop packet, and generating corresponding draw pixel loop packets;
  a sample fill stage coupled to the loop interface and to the memory port, the local memory sub-system storing an interleave of a super-sampled frame buffer dedicated to the sample fill stage, the sample fill stage for receiving draw pixel loop packets via the loop interface and, as specified by the draw pixel loop packets, performing via the memory port a conditional sample update function of samples and/or pixels in the interleave of the super-sampled frame buffer stored in the local memory sub-system; and
  a video output stage coupled to the loop interface and to the memory port, the interleave of the super-sampled frame buffer further dedicated to the video output stage, the video output stage for receiving video pixel loop packets via the loop interface and, as specified by the video pixel loop packets, retrieving via the memory port samples and/or pixels in the interleave stored in the local memory sub-system to modify the video pixel loop packets, and transmitting the modified video pixel loop packets via the loop interface.

2. The node of claim 1, further comprising an interface unit, the interface unit including a host interface for connecting to a host computer, the interface unit receiving graphics driver commands from the host computer and converting the graphics driver commands to loop packets for transmission over the ring to other nodes.

3. The node of claim 2, wherein the interface unit converts the graphics driver commands to graphic commands, assigns the graphics commands to render stages and transmits the graphics commands to the assigned render stages via the loop interface.

4. The node of claim 3, wherein the interface unit that assigns the graphic commands uses a load balancing method.

5. The node of claim 2, wherein the interface unit further receives modified video pixel loop packets via the loop interface and transmits rendered images based thereon to the host computer.

6. The node of claim 2, wherein the interface unit further transmits rendered images to one or more physical images display devices not on the ring.

7. The node of claim 1, wherein the video output stage further performs convolution.

8. The node of claim 1, wherein the video output stage further performs anti-aliasing.

9. The node of claim 1, wherein the render stage includes a clip checking operation.

10. The node of claim 1, wherein the render stage includes a clipping operation if needed.

11. The node of claim 1, wherein the render stage includes vertex shading.

12. The node of claim 1, wherein the render stage includes scan converting.

13. The node of claim 1, wherein the render stage includes programmable shading on vertices.

14. The node of claim 1, wherein the render stage includes programmable shading on pixels.

15. The node of claim 1, wherein the render stage includes programmable shading on micropolygon vertices.

16. The node of claim 1, wherein the render stage includes computation processing including texture operations.

17. The node of claim 1, wherein the render stage includes displacement mapping.

18. The node of claim 1, wherein the render stage includes programmable shading.

19. The node of claim 1, wherein the render stage includes multicasting "projected to screen space boundaries" of the results of tessellating and shading graphics primitives to targeted ones of the interconnected nodes, along with the plane equation of Z.

20. The node of claim 1, wherein the texture store contains a rendered image.

21. The node of claim 1, wherein the render stage applies a texture filtering technique to a texture map stored in the local memory sub-system.

22. The node of claim 21, wherein said texture filtering technique includes one or more of direct access, nearest neighbor access, bi-linear filtering, tri-linear filtering, bi-linear MIP mapping, tri-linear MIP mapping, anisotropic filtering, summed area filtering, procedural textures, bump mapping, displacement mapping, percentage closer shadow filtering, and deep shadow map filtering.

23. The node of claim 1, wherein the render stage includes surface tessellation.

24. The node of claim 23, wherein the surface tessellation includes the tessellation of surface primitives.

25. The node of claim 24, wherein the surface primitives include one or more of polygons, higher order surface primitives, and implicit surfaces.

26. The node of claim 25, wherein the higher order surface primitives includes one or more of conic surfaces, ruled surfaces, surfaces of revolution, Bézier patches, B-Spline patches, NURBS patches, sub-division surfaces, and sub-division surfaces with edge and vertex sharpness control.

27. The node of claim 23, wherein the tessellation includes the application of displacement maps.

28. The node of claim 1, wherein the node uses a single physical connection for all information transfer on the ring.

29. The node of claim 1, wherein the node uses point to point, unidirectional links for all information transfer on the ring.

30. The node of claim 1, wherein the loop interface, render stage, sample fill stage, video output stage, memory port and local memory sub-system are formed of a single processing chip.

31. The node of claim 1, wherein the loop interface, render stage, sample fill stage, video output stage and memory port are formed of a single processing chip and the local memory sub-system is formed of at least one memory chip.

* * * * *